(12) United States Patent
Kobayashi

(10) Patent No.: US 6,516,028 B1
(45) Date of Patent: Feb. 4, 2003

(54) AUTOMATIC DELAY EQUALIZER AND AUTOMATIC DELAY EQUALIZATION METHOD AS WELL AS AUTOMATIC DELAY AND AMPLITUDE EQUALIZER AND AUTOMATIC DELAY AND AMPLITUDE EQUALIZATION METHOD

(75) Inventor: Kenzo Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/219,936

(22) Filed: Dec. 23, 1998

(30) Foreign Application Priority Data

Jul. 17, 1998 (JP) ............................................ 10-203889

(51) Int. Cl.$^7$ ................................................ H03H 7/40
(52) U.S. Cl. ........................ 375/230; 375/235; 375/285
(58) Field of Search ................................. 375/229, 230, 375/232, 233, 235, 261, 345, 285, 346, 371; 333/18, 165

(56) References Cited

U.S. PATENT DOCUMENTS 3,798,576 A * 3/1974 Torpie et al. ................. 333/18
5,309,113 A * 5/1994 Mimura et al. .............. 329/302
5,978,415 A * 11/1999 Kobayashi et al. .......... 375/230
6,175,591 B1 * 1/2001 Iwamatsu .................... 375/232

FOREIGN PATENT DOCUMENTS

JP  8-163005  6/1996

* cited by examiner

*Primary Examiner*—Stephen Chin
*Assistant Examiner*—Chieh M. Fan
(74) *Attorney, Agent, or Firm*—Katten Muchin Zavis Rosenman

(57) ABSTRACT

The invention provides an automatic delay equalizer and an automatic delay equalization method which can detect a delay characteristic (delay distortion) of an input signal and automatically compensate for the delay characteristic. The equalizer includes an inclination delay equalization section for compensating for the delay characteristic of the input signal in accordance with an inclination delay characteristic, and a control section for discriminating a direction of variation of a value of a first one of a pair of digital demodulated signals of the input signal, detecting error information from a second one of the digital demodulated signals which is orthogonal to the first signal and outputting a control signal for the inclination delay equalization section based on a correlation between the error information and the direction of variation of the value of the first signal.

34 Claims, 27 Drawing Sheets

VECTOR REPRESENTATION
ON PHASE PLANE

AUTOMATIC DELAY EQUALIZER AND AUTOMATIC DELAY EQUALIZATION METHOD AS WELL AS AUTOMATIC DELAY AND AMPLITUDE EQUALIZER AND AUTOMATIC DELAY AND AMPLITUDE EQUALIZATION METHOD

BACKGROUND OF THE INVENTION

1) Field of the Invention

This invention relates to an automatic delay equalizer and an automatic delay equalization method as well as an automatic delay and amplitude equalizer and an automatic delay and amplitude equalization method suitable for use to automatically compensate for a delay characteristic (delay distortion) and/or an amplitude characteristic (amplitude distortion) which appear in a communication signal (input signal) from a delay frequency characteristic and/or an amplitude frequency characteristic of a transmission line.

2) Description of the Related Art

It is known that, not only transmission lines for radio communication such as digital multiplex microwave communication, but all transmission lines (including the space) have two different types of linear characteristics of an amplitude frequency characteristic and a delay frequency characteristic, and the characteristic of a transmission line is influenced by the two characteristics.

For example, if the two characteristics are flat with respect to the frequency, then it is basically possible to decode (demodulate) a transmission signal (modulation signal) itself from a reception signal (input signal), but if they are not flat, then a "distortion (linear distortion)" is produced in the demodulation signal and degrades the demodulation characteristic.

In order to equalize and compensate for such a linear distortion as described above, various amplitude equalizers and delay equalizers have been proposed wherein the amount (characteristic) of the linear distortion produced by a characteristic of a transmission line is measured in advance and equalization (compensation) of the reception signal is performed on the assumption that the distortion amount measured does not exhibit a variation (in other words, on the assumption that the linear distortion is a distortion of a fixed amount).

However, an actual transmission line suffers also from a distortion which varies dynamically as fading such as a distortion which is produced in a space transmission line or a distortion which is fluctuated by a variation of the cable length which is caused by a temperature variation or some other variable such as a distortion which is produced in aware transmission line. Therefore, it is a matter of course that the linear distortion described above is not a distortion of a fixed amount. Accordingly, an amplitude equalizer or a delay equalizer which performs equalization on the assumption that the linear distortion is a distortion of a fixed amount cannot sufficiently compensate for the linear distortion.

As regards an amplitude distortion which depends upon, an amplitude frequency characteristic, a technique has been proposed, for example, in Japanese Patent Laid-Open Application No. Heisei 8-163005 wherein the fluctuating distortion amount can be detected on the real time basis so that even the fluctuating distortion can be automatically equalized and compensated for. However, as regards a delay distortion which depends upon a delay frequency characteristic, neither means for detecting the amount of a distortion which currently influences on a reception signal nor means for automatically equalizing the thus detected distortion has been realized as yet.

SUMMARY OF THE INVENTION

It is an object of the present invention to provide an automatic delay equalizer and an automatic delay equalization method which can detect a delay characteristic of an input signal and automatically compensate for the delay characteristic.

It is another object of the present invention to provide an automatic delay and amplitude equalizer and an automatic delay and amplitude equalization method which can detect a delay characteristic and an amplitude characteristic of an input signal and automatically compensate for both of the characteristics.

In order to attain the objects described above, according to an aspect of the present invention, there is provided an automatic delay equalizer for compensating for a delay characteristic of an input signal, comprising an inclination delay equalization section for compensating for the delay characteristic of the input signal in accordance with an inclination delay characteristic, and a control section for discriminating a direction of variation of a value of a first one of a pair of digital demodulated signals of the input signal, detecting error information from a second one of the digital demodulated signals which is orthogonal to the first signal and outputting a control signal for the inclination delay equalization section based on a correlation between the error information and the direction of variation of the value of the first signal.

According to another aspect of the present invention, there is provided an automatic delay equalization method, comprising a detection step of detecting inclination information of a delay characteristic of an input signal, and a compensation step of compensating for the delay characteristic of the input signal based on the inclination information of the delay characteristic of the input signal detected by the detection step.

With the automatic delay equalizer and the automatic delay equalization method, since the inclination information of the delay characteristic of the input signal is detected and the delay characteristic of the input signal is compensated for based on the inclination information of the delay characteristic, the fluctuating delay distortion amount can be detected on the real time basis and the distortion can be equalized and compensated for automatically. Consequently, the accuracy in signal demodulation can be improved significantly.

According to a further aspect of the present invention, there is provided an automatic delay equalizer for compensating for a delay characteristic of an input signal, comprising an inclination delay equalization section for compensating for the delay characteristic of the input signal in accordance with an inclination delay characteristic, and a control section for discriminating a direction of variation of a value of a first one of a pair of digital demodulated-signals of the input signal, detecting error information from a second one of the digital demodulated signals which is orthogonal to the first signal and producing a first correlation signal based on a correlation between the error information and the direction of variation of the value of the first signal, for discriminating a direction of variation of a value of the second signal, detecting error information from the first one of the digital demodulated signals which is orthogonal to the second signal and producing a second correlation signal based on a correlation between the error information and the direction of variation of the value of the second signal and for producing a control signal for the inclination delay equalization section based on the first correlation signal and the second correlation signal and outputting the control signal.

With the automatic delay equalizer, since the direction of variation of the value of a signal and the error information are detected for both of the digital demodulated signals and the control signal for the delay characteristic compensation is produced based on the correlations between them, the detection sensitivity and the accuracy of the control signal can be improved significantly when compared with the automatic delay equalizer according to the first-described aspect of the present invention described above. Consequently, the accuracy of the automatic delay equalizer can be improved further significantly.

According to a still further aspect of the present invention, there is provided an automatic delay and amplitude equalizer for compensating for a delay characteristic and an amplitude characteristic of an input signal, comprising an inclination delay equalization section for compensating for the delay characteristic of the input signal in accordance with an inclination delay characteristic, an inclination amplitude equalization section for compensating for the amplitude characteristic of the input signal in accordance with an inclination amplitude characteristic, and a control section for discriminating a direction of variation of a value of a first one of a pair of digital demodulated signals of the input signal, detecting error information from a second one of the digital demodulated signals which is orthogonal to the first signal and outputting a control signal for the inclination delay equalization section and another control signal for the inclination amplitude equalization section based on a correlation between the error information and the direction of variation of the value of the first signal.

According to a yet further aspect of the present invention, there is provided an automatic delay and amplitude equalization method, comprising a detection step of detecting inclination information of a linear distortion characteristic of an input signal, and a compensation step of compensating for a delay characteristic and an amplitude characteristic of the input signal based on the inclination information of the linear distortion characteristic of the input signal detected by the detection step.

With the automatic delay and amplitude equalizer and the automatic delay and amplitude equalization method, since the inclination information of the linear distortion characteristic of the input signal is detected and the delay characteristic and the amplitude characteristic of the input signal are compensated for based on the inclination information of the linear distortion characteristic, not only the delay distortion but also the amplitude distortion can be detected on the real time basis and the distortions can be equalized and compensated for automatically. Consequently, the accuracy in signal demodulation can be improved further significantly.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

A. Aspects of the Invention

First, several aspects of the present invention are described with reference to the drawings.

Figure 1:
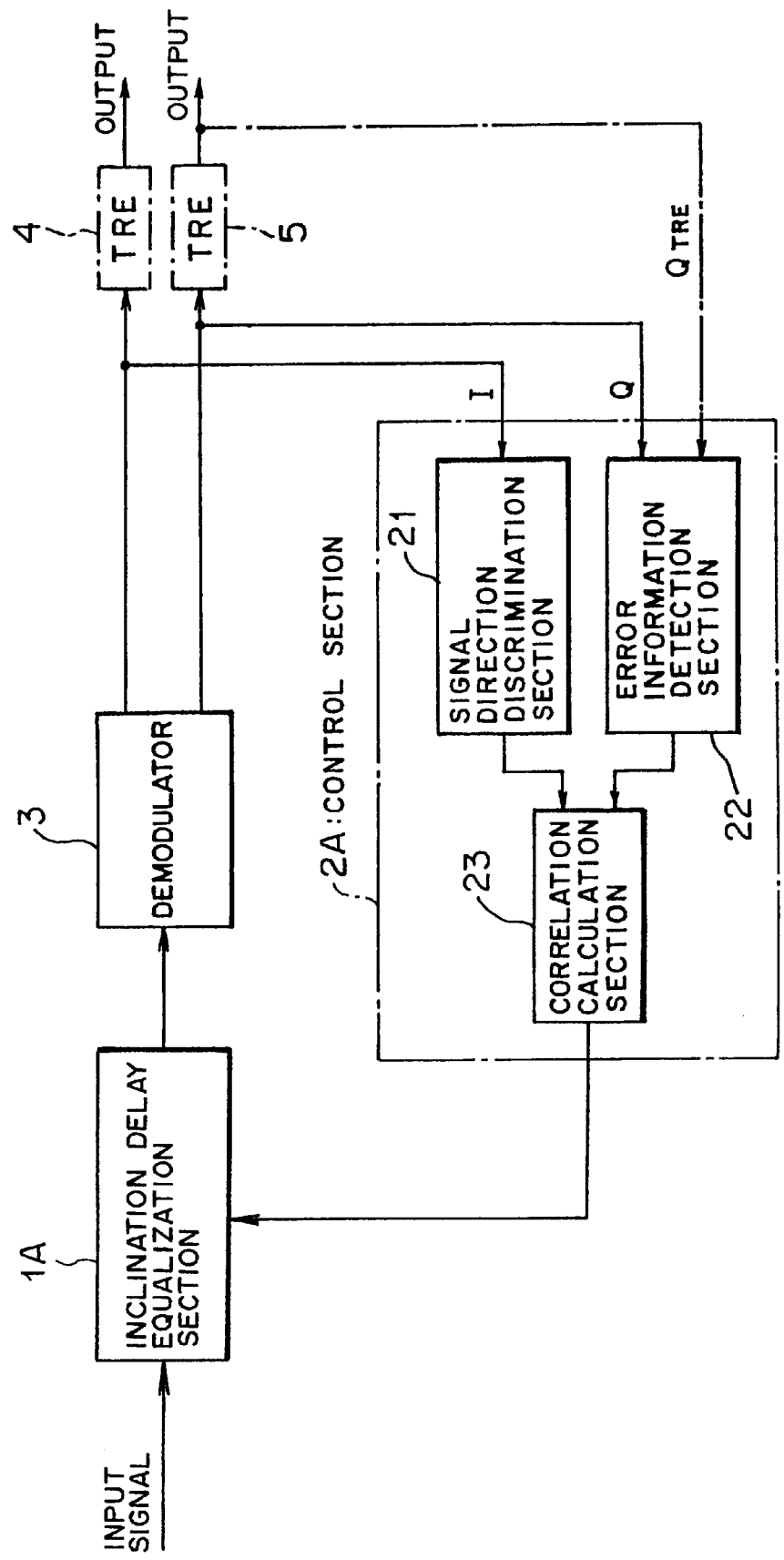
FIGS. 1 to 4 are block diagrams illustrating different aspects of the present invention.

Referring first to FIG. 1, there is shown an automatic delay equalizer according to an aspect of the present invention. The automatic delay equalizer shown includes an inclination delay equalization section 1A, a control section 2A, a demodulator 3, and a pair of transversal equalizers (TRE) 4 and 5.

The inclination delay equalization section 1A compensates for a delay characteristic of an input signal in accordance with a predetermined inclination delay characteristic. The control section 2A discriminates a direction of variation of a value of a first one I (or Q) of a pair of digital demodulated signals I and Q originating from the input signal, detects error information from a second one Q (or I) of the digital demodulated signals I and Q which is orthogonal to the signal I, and outputs a control signal for the inclination delay equalization section 1A based on the correlation between the error information and the direction of variation of the value of the first signal I (or Q).

In the automatic delay equalizer of the first aspect of the present invention having the construction described above, the control section 2A discriminates the direction of variation of the value of the first one I (or Q) of the pair of digital demodulated signals I and Q originating from the input signal and detects error information from the second signal Q (or I) of the digital demodulated signals I and Q which is orthogonal to the signal I (or Q)

Then, the control section 2A outputs the control signal for the inclination delay equalization section 1A based on the correlation between the error information and the direction of variation of the value of the first signal I (or Q) to the inclination delay equalization section 1A. Consequently, the delay characteristic of the input signal is compensated for in accordance with the predetermined inclination delay characteristic by the inclination delay equalization section 1A.

Accordingly, with the automatic delay equalizer of the first aspect of the present invention described above, since the inclination information of the delay characteristic of the input signal is detected and the delay characteristic of the input signal is compensated for based on the inclination information of the delay characteristic, the fluctuating delay distortion amount can be detected on the real time basis and the distortion can be equalized and compensated for automatically. Consequently, the accuracy in signal demodulation can be improved significantly.

The inclination delay equalization section 1A described above may be constructed such that it has the inclination delay characteristic in a frequency domain and compensates for the delay characteristic of the input signal in accordance with the inclination delay characteristic. This construction allows the inclination delay equalization section 1A to compensate for the delay characteristic of the input signal in the frequency domain in accordance with the inclination delay characteristic which the inclination delay equalization section 1A has. Accordingly, since the inclination delay equalization section 1A which compensates for the delay characteristic of the input signal can be implemented with a simple construction, this contributes very much to miniaturization of the automatic delay equalizer.

Preferably, the control section 2A includes, as shown in FIG. 1, a signal direction discrimination section 21, an error information detection section 22, and a correlation calculation section 23. The signal direction discrimination section 21 discriminates the direction of variation of the value of the first one I (or Q) of the digital demodulated signals I and Q. The error information detection section 22 detects the error information from the second signal Q (or I) of the digital demodulated signals I and Q which is orthogonal to the signal I (or Q).

The correlation calculation section 23 outputs the control signal for the inclination delay equalization section 1A based on the correlation between the error information obtained by the error information detection section 22 and the direction of variation of the value of the first signal I (or Q) obtained by the signal direction discrimination section 21.

Where the control section 2A is constructed in such a manner as described above, the direction of variation of the value of the first signal I (or Q) of the digital demodulated signals I and Q is discriminated by the signal direction discrimination section 21, and the error information is detected from the second signal Q (or I) of the digital demodulated signals I and Q which is orthogonal to the first signal I (or Q).

Then, the correlation calculation section 23 produces the control signal for the inclination delay equalization section 1A based on the correlation between the error information obtained by the error information detection section 22 and the direction of variation of the value of the first signal I (or Q) obtained by the signal direction discrimination section 21, and outputs the control signal to the inclination delay equalization section 1A.

Where the automatic delay equalizer includes the control section 2A having the construction described above in this manner, since the direction of variation of the value of the first signal I (or Q) of the digital demodulated signals I and Q is discriminated while the error information is detected from the second signal Q (or I) of the digital demodulated signals I and Q which is orthogonal to the signal I (or Q) and the control signal for the inclination delay equalizer 1A is outputted based on the correlation between the direction of variation of the value of the first signal I (or Q) and the error information obtained in this manner, the control system (control section 2A) for delay equalization can be implemented in a digital circuit. Accordingly, the circuit scale and the cost of the automatic delay equalizer can be reduced significantly and also the accuracy in compensation of the automatic delay equalizer can be improved significantly.

The signal direction discrimination section 21 described above may be constructed such that it samples the first signal I (or Q) in a data clock period or in a period equal to 1/N (N is an integer equal to or larger than 2) the period of the data clock to discriminate the direction of variation of the value of the first signal I (or Q). In this instance, the direction of variation of the value of the first signal I (or Q) can be discriminated simply and readily. Further, since the signal direction discrimination section 21 can be implemented in a digital circuit, the circuit scale and the cost of the automatic delay equalizer can be further reduced, and also the performance of the automatic delay equalizer can be improved significantly. Particularly, where the direction of variation of the value of the first signal I (or Q) is discriminated by sampling the first signal I (or Q) in the period equal to 1/N the period of the data clock, whatever demodulation system has been used to obtain the digital demodulated signals I and Q from the input signal, the direction of variation of the value of the first signal I (or Q) can be discriminated with a high degree of accuracy, and this contributes very much also to improvement in universal application of the automatic delay equalizer.

Meanwhile, the error information detection section 22 may be constructed such that it detects the error information from an error bit of the second signal Q (or I). In this instance, since the error information can be detected only from an error bit of the second signal Q (or I), the circuit scale and the cost of the automatic delay equalizer can be reduced significantly.

Alternatively, the error information detection section 22 may be formed as a difference calculation section which calculates a difference between the second one Q (or I) of the digital demodulated signals I and Q of the input signal and an equalized signal $Q_{TRE}$ (or $I_{TRE}$) obtained by processing the second signal Q (or I) by means of the transversal equalizer 5. Since this allows the error information described hereinabove to be detected with a high degree of accuracy, the accuracy and the performance of the automatic delay equalizer can be improved further significantly.

The demodulator 3 mentioned hereinabove produces the digital demodulated signals I and Q. Here, the inclination delay equalization section 1A is provided at a stage preceding to the demodulator 3 so that the delay characteristic of the input signal can be compensated for prior to demodulation of the input signal. Consequently, the inclination delay equalization section 1A can be implemented with a simpler construction than where compensation is performed after demodulation, and this contributes very much to further reduction in size of the automatic delay equalizer.

Figure 2:
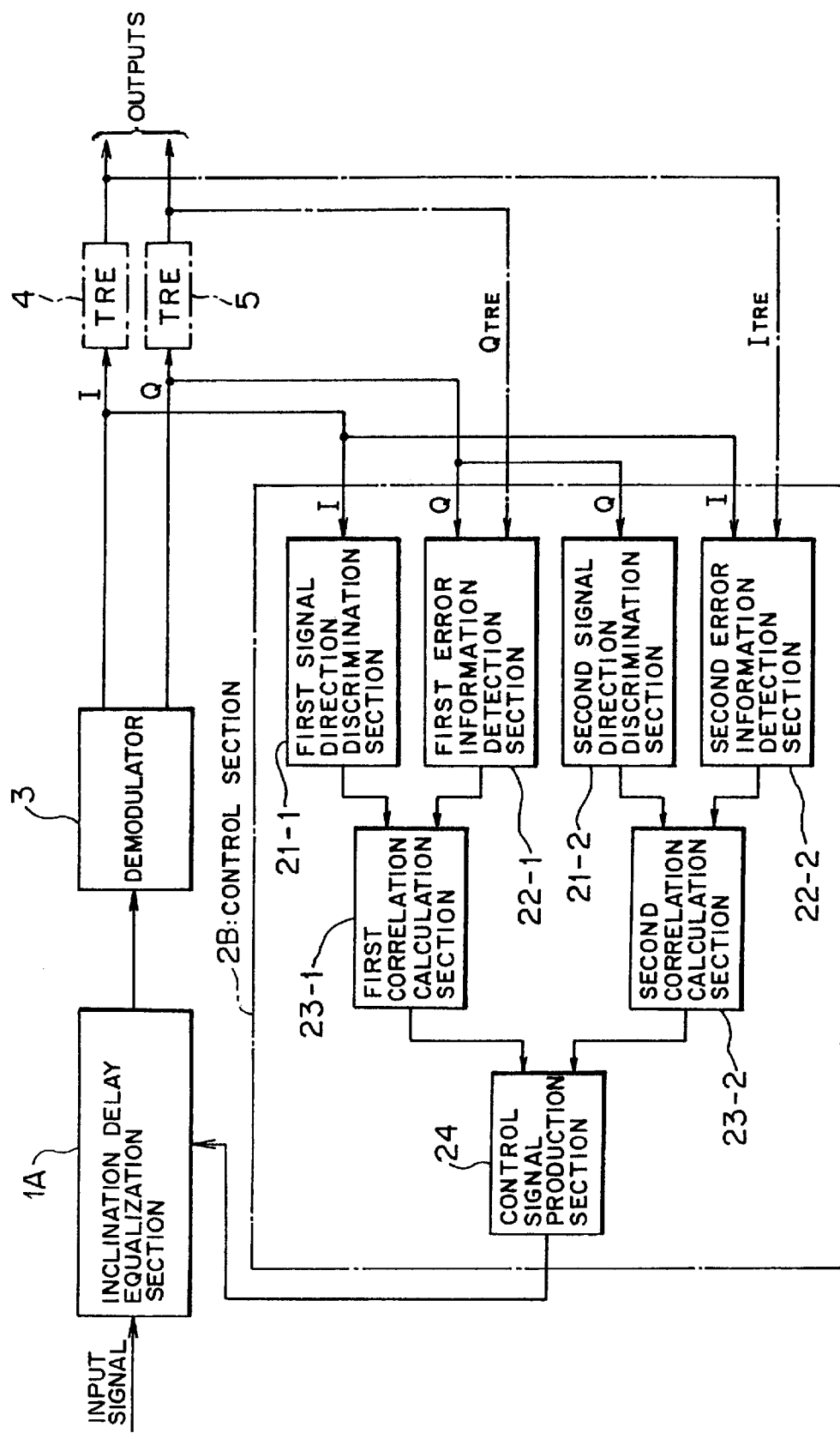

Referring now to FIG. 2, there is shown in block diagram an automatic delay equalizer according to another aspect of the present invention. The automatic delay equalizer shown includes an inclination delay equalization section 1A, a control section 2B, a demodulator 3, and a pair of transversal equalizers (TRE) 4 and 5.

The inclination delay equalization section 1A is similar to that described hereinabove with reference to FIG. 1. The control section 2B discriminates a direction of variation of a value of a first one I of a pair of digital demodulated signals I and Q of an input signal, detects error information from a second one Q of the digital demodulated signals I and Q which is orthogonal to the first signal I and produces a first correlation signal based on a correlation between the error information and the direction of variation of the value of the first signal I. The control section 2B further discriminates a direction of variation of a value of the second signal Q, detects error information from the first one I of the digital demodulated signals I and Q which is orthogonal to the second signal Q and produces a second correlation signal based on a correlation between the error information and the direction of variation of the value of the second signal Q. Further, the control section 2B produces a control signal for the inclination delay equalization section 1A based on the first correlation signal and the second correlation signal and outputs the control signal.

In the automatic delay equalizer having the construction described above, the control section 2B discriminates the direction of variation of the value of the first one I of the digital demodulated signals I and Q of the input signal and detects the error information from the second one Q of the digital demodulated signals I and Q which is orthogonal to the first signal I, and then produces a first correlation signal based on the correlation between the error information and the direction of variation of the value of the first signal I.

Further, the control section 2B discriminates the direction of variation of the value of the second signal Q and detects the error information from the first one I of the digital demodulated signals I and Q which is orthogonal to the second signal Q, and then produces a second correlation signal based on the correlation between the error information and the direction of variation of the value of the second signal Q.

Then, the control section 2B produces a control signal for the inclination delay equalization section 1A based on the first correlation signal and the second correlation signal and outputs the control signal to the inclination delay equalization section 1A. In short, the control section 2B detects the direction of variation of the value of a signal and the error information for both of the digital demodulated signals I and Q and produces the control signal based on the correlation between them.

In this manner, with the automatic delay equalizer of the second aspect of the present invention, since the direction of variation of the value of a signal and the error information are detected for both of the digital demodulated signals I and Q and the control signal for the delay characteristic compensation is produced based on the correlation between them, the detection sensitivity and the accuracy of the control signals can be improved significantly when compared with the automatic delay equalizer according to the first aspect of the present invention described hereinabove with reference to FIG. 1. Consequently, the accuracy of the automatic delay equalizer can be improved further significantly.

Also in this instance, if the inclination delay equalization section 1A described above is constructed such that it has the inclination delay characteristic in a frequency domain and compensates for the delay characteristic of the input signal in accordance with the inclination delay characteristic, then the compensation for the delay characteristic can be realized with a simple construction, and this contributes very much to reduction in size of the automatic delay equalizer.

Preferably, the control section 2B described above includes, as shown in FIG. 2, a first signal direction discrimination section 21-1, a first error information detection section 22-1, a first correlation calculation section 23-1, a second signal direction discrimination section 21-2, a second error information detection section 22-2, a second correlation calculation section 23-2, and a control signal production section 24.

The first signal direction discrimination section 21-1 discriminates the direction of variation of the value of the first one I of the digital demodulated signals I and Q. The first error information detection section 22-1 detects the error information from the second one Q of the digital demodulated signals I and Q which is orthogonal to the first signal I. The first correlation calculation section 23-1 outputs the first correlation signal based on the correlation between the error information obtained by the first error information detection section 22-1 and the direction of variation of the value of the first signal I obtained by the first signal direction discrimination section 21-1.

The second signal direction discrimination section 21-2 discriminates the direction of variation of the value of the second signal Q. The second error information detection section 22-2 detects the error information from the first signal I. The second correlation calculation section 23-2 outputs the second correlation signal based on the correlation between the error information obtained by the second error information detection section 22-2 and the direction of variation of the value of the second signal Q obtained by the second signal direction discrimination section 21-2.

The control signal production section 24 produces the control signal for the inclination delay equalization section 1A from the first correlation signal from the first correlation calculation section 23-1 and the second correlation signal from the second correlation calculation section 23-2.

In the control section 2B constructed in such a manner as described above, the first signal direction discrimination section 21-1 discriminates the direction of variation of the value of the first one I of the digital demodulated signals I and Q while the first error information detection section 22-1 detects the error information from the second one Q of the digital demodulated signals I and Q which is orthogonal to the first signal I. Then, the first correlation calculation section 23-1 produces the first correlation signal based on the correlation between the error information obtained by the first error information detection section 22-1 and the direction of variation of the value of the first signal I obtained by the first signal direction discrimination section 21-1 in this manner.

Meanwhile, the second signal direction discrimination section 21-2 discriminates the direction of variation of the value of the second signal Q while the, second error information detection section 22-2 detects the error information from the first signal I which is orthogonal to the second signal Q. Then, the second correlation calculation section 23-2 produces the second correlation signal based on the correlation between the error information obtained by the second error information detection section 22-2 and the direction of variation of the value of the second signal Q obtained by the second signal direction discrimination section 21-1 in this manner.

Then, the control signal production section 24 produces the control signal for the inclination delay equalization section 1A from the first correlation signal and the second correlation signal and outputs the control signal to the inclination delay equalization section 1A. Consequently, the delay characteristic of the input signal is compensated for in accordance with the predetermined inclination delay characteristic by the inclination delay equalization section 1A.

Accordingly, also in this instance, since the control system (control section 2B) for delay equalization can be implemented in a digital circuit, the circuit scale and the cost of the automatic delay equalizer can be reduced significantly, and also the accuracy in compensation of the automatic delay equalizer can be improved significantly.

The first signal direction discrimination section 21-1 may sample the first signal I in a data clock period or in a period equal to 1/N (N is an integer equal to or larger than 2) the period of the data clock to discriminate the direction of variation of the value of the first signal I, and the second signal direction discrimination section 21-2 may sample the second signal Q in the data clock period or in the period equal to 1/N the period of the data clock to discriminate the direction of variation of the value of the second signal Q.

Where the first signal direction discrimination section 21-1 and the second signal direction discrimination section 21-2 are constructed in such a manner as described above, the first signal direction discrimination section 21-1 can sample the first signal I in the data clock period or in the period equal to 1/N the period of the data clock to discriminate the direction of variation of the value of the first signal I, and the second signal direction discrimination section 21-2 can sample the second signal Q in the data clock period or in the period equal to 1/N the period of the data clock to discriminate the direction of variation of the value of the second signal Q. Consequently, the signal direction discrimination sections 21-1 and 21-2-for the digital demodulated signals I and Q can be implemented in digital circuits, and accordingly, the circuit scale and the cost of the automatic delay equalizer can be reduced significantly, and also the performance of the automatic delay equalizer can be improved remarkably. Particularly where the signal direction discrimination sections 21-1 and 21-2 sample the signals I and Q in the period equal to 1/N the period of the data clock to discriminate the directions of variation of the values of the signals I and Q, respectively, whatever demodulation system has been used to obtain the digital demodulated signals I and Q from the input signal, the directions of variation of the values of the digital demodulated signals I and Q can be discriminated with a high degree of accuracy, and this contributes very much also to improvement in universal application of the automatic delay equalizer.

The automatic delay equalizer may be constructed such that the first error information detection section 22-1 detects the error information from an error bit of the first signal I, and the second error information detection section 22-2 detects the error information from an error bit of the second signal Q. This construction allows the error information detection sections 22-1 and 22-2 to detect the error information simply and readily from the error bits of the signals I and Q, respectively.

Consequently, the circuit scale and the cost of the automatic delay equalizer can be reduced further significantly.

Alternatively, the automatic delay equalizer may be constructed such that the first error information detection section 22-1 is formed as a first difference calculation section which calculates a difference between the second one Q of the digital demodulated signals I and Q of the input signal and an equalized signal $Q_{TRE}$ obtained by processing the second signal Q by means of the transversal equalizer 5, and the second error information detection section 22-2 is formed as a second difference calculation section which calculates a difference between the first signal I and an equalized signal $I_{TRE}$ obtained by processing the first signal I by means of the transversal equalizer 4.

Where the error information detection sections 22-1 and 22-2 are constructed in such a manner as described above, they calculate the differences between the digital demodulated signals Q and I and the equalized signals $Q_{TRE}$ and TRE obtained by processing the signals Q and I by means of the transversal equalizers 5 and 4, respectively. Consequently, the error information of the digital demodulated signals I and Q can be detected using the equalized signals $Q_{TRE}$ and $I_{TRE}$ obtained by processing the signals Q and I by means of the transversal equalizers 5 and 4, respectively. As a result, since the error information obtained from the digital demodulated signals I and Q are improved in accuracy, the accuracy and the performance of the automatic delay equalizer can be improved further significantly.

Also the present automatic delay equalizer can compensate for the delay characteristic of the input signal prior to demodulation as the inclination delay equalization section 1A is provided at a stage preceding to the demodulator 3 as seen in FIG. 2. Consequently, the inclination delay equalization section 1A can be implemented in a simpler construction than where compensation is performed prior to demodulation, and this contributes very much to further reduction in size of the automatic delay equalizer.

In summary, according to the present invention, it is possible to detect inclination information of a delay characteristic of an input signal (detection step) and compensate for the delay characteristic of the input signal based on the inclination information of the delay characteristic (compensation step).

Figure 3:
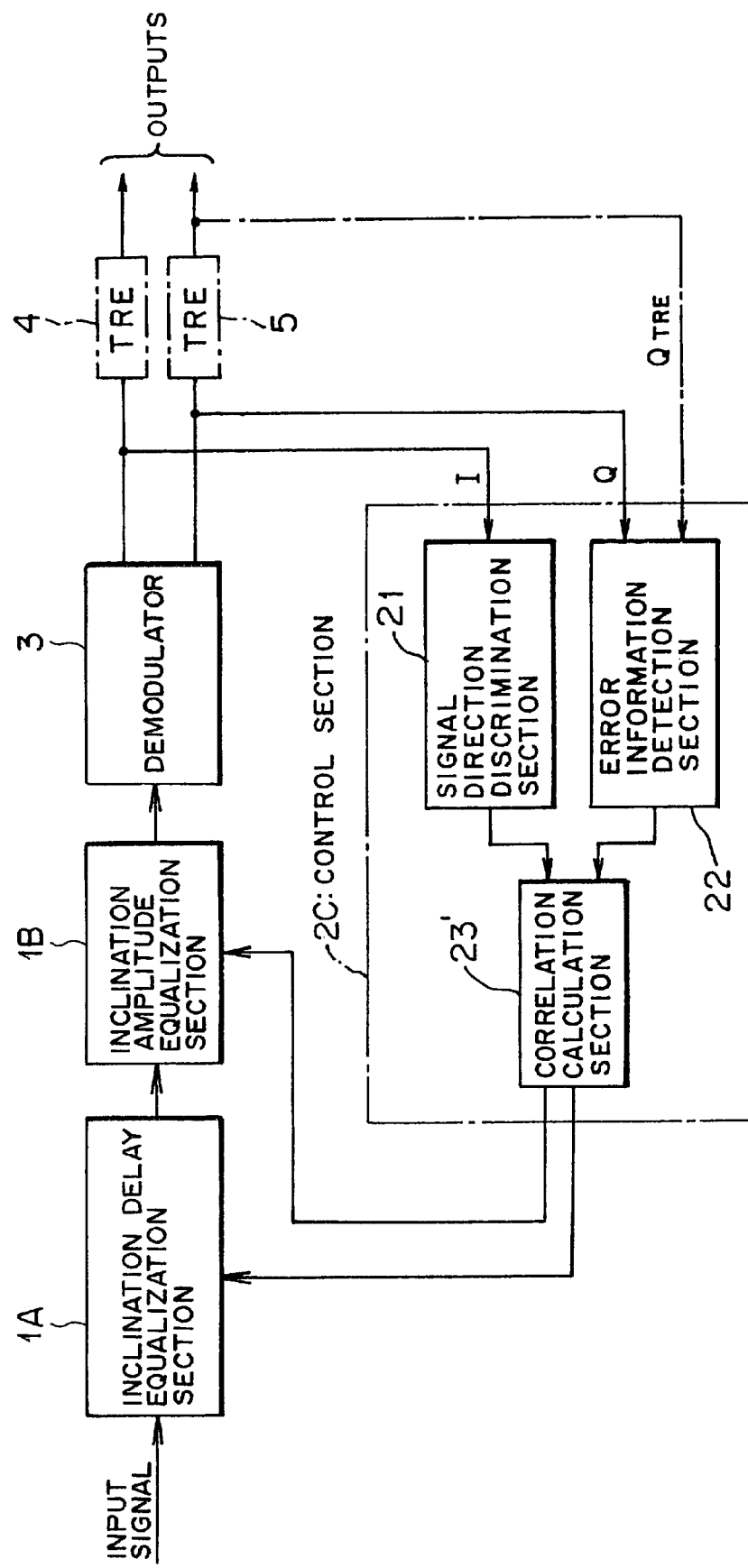

Referring now to FIG. 3, there is shown an automatic delay and amplitude equalizer according to a further aspect of the present invention. The automatic delay and amplitude equalizer shown includes an inclination delay equalization section 1A, an inclination amplitude equalization section 1B, a control section 2C, a demodulator 3, and a pair of transversal equalizers (TRE) 4 and 5.

Also the inclination delay equalization section 1A compensates for the delay characteristic of the input signal in accordance with a predetermined inclination delay characteristic. Meanwhile, the inclination amplitude equalization section 1B compensates for the amplitude characteristic of the input signal in accordance with a predetermined inclination amplitude characteristic.

The control section 2C discriminates a direction of variation of a value of a first one I (or Q) of a pair of digital demodulated signals I and Q of the input signal, detects error information from a second one Q (or I) of the digital demodulated signals I and Q which is orthogonal to the first signal I and outputs a control signal for the inclination delay equalization section 1A and another control signal for the inclination amplitude equalization section 1B based on a correlation between the error information and the direction of variation of the value of the first signal I (or Q).

In the automatic delay and amplitude equalizer having the construction described above, the control section 2C, which is provided commonly for the equalization sections 1A and 1B, discriminates the direction of variation of the value of the first one I (or Q) of the digital demodulated signals I and Q of the input signal and detects error information from the second one Q (or I) of the digital demodulated signals I and Q which is orthogonal to the first signal I (or Q).

Then, the control section 2C outputs a control signal for the inclination delay equalization section 1A to the inclination delay equalization section 1A and outputs another control signal for the inclination amplitude equalization section 1B to the inclination amplitude equalization section 1B, both based on the correlation between the error information and the direction of variation of the value of the first signal I (or Q). Consequently, both of the delay characteristic and the amplitude characteristic of the input signal are compensated for by the equalization sections 1A and 1B, respectively.

In this manner, with the automatic delay and amplitude equalizer according to the third aspect of the present invention described above, since inclination information of linear distortion characteristics of an input signal is detected and the delay characteristic and the amplitude characteristic of the input signal are compensated for individually based on the inclination information of the linear distortion characteristics, not only the delay distortion but also the amplitude distortion can be detected on the real time basis and the distortions can be equalized and compensated for automatically. Consequently, the accuracy in signal demodulation can be improved further significantly.

Further, in this instance, since the control signals for the inclination delay equalization section 1A which compensates for the delay characteristic and the inclination amplitude equalization section 1B which compensates for the amplitude characteristic are produced by the control section 2C which is common to the equalization sections 1A and 1B, the automatic delay and amplitude equalizer can be implemented in a very small size.

Preferably, the automatic delay and amplitude equalizer is constructed such that the inclination delay equalization section 1A has the inclination delay characteristic in a frequency domain and compensates for the delay characteristic of the input signal in accordance with the inclination delay characteristic and the inclination amplitude equalization section 1B has the inclination amplitude characteristic in the frequency domain and compensates for the amplitude characteristic of the input signal in accordance with the inclination amplitude characteristic. This construction allows the equalization sections 1A and 1B to compensate for the delay characteristic and the amplitude characteristic of the input signal in accordance with the inclination delay characteristic and the inclination amplitude characteristic of them, respectively. Consequently, the equalization sections 1A and 1B can be implemented in individually simple constructions, and this contributes very much to further reduction in size of the automatic delay and amplitude equalizer.

Preferably, the control section 2C includes, for example, as shown in FIG. 3, a signal direction discrimination section 21, an error information detection section 22, and a correlation calculation section 23'. The signal direction discrimination section 21 discriminates the direction of variation of the value of the first one I (or Q) of the digital demodulated signals I and Q. The error information detection section 22 detects the error information from the second one Q (or I) of the digital demodulated signals I and Q which is orthogonal to the first signal I (or Q).

The correlation calculation section 23' outputs a control signal for the inclination delay equalization section 1A and another control signal for the inclination amplitude equalization section 1B based on the correlation between the error information obtained by the error information detection section 22 and the direction of variation of the value of the first signal I (or Q) obtained by the signal direction discrimination section 21.

In the control section 2C having the construction described above, the direction of variation of the value of the first one I (or Q) of the digital demodulated signals I and Q is discriminated by the signal direction discrimination section 21, and the error information from the second one Q (or I) of the digital demodulated signals I and Q which is orthogonal to the first signal I (or Q) is detected by the error information detection section 22.

Then, a control signal for the inclination delay equalization section 1A and another control signal for the inclination amplitude equalization section 1B are produced by the correlation calculation section 23' based on the correlation between the error information obtained by the error information detection section 22 and the direction of variation of the value of the first signal I (or Q) obtained by the signal direction discrimination section 21 in this manner and are outputted to the inclination delay equalization section 1A and the inclination amplitude equalization section 1B respectively.

Accordingly, also in this instance, since the control section 2C can be implemented in a digital circuit, the circuit scale and the cost of the automatic delay and amplitude equalizer can be reduced significantly, and also the accuracy in compensation of the automatic delay and amplitude equalizer can be improved significantly.

Also the signal direction discrimination section 21 can discriminate the direction of variation of the value of the first signal I (or Q) where it is constructed such that it samples the first signal I (or Q) in a data clock period or in a period equal to 1/N the period of the data clock to discriminate the direction of variation of the value of the first signal I (or Q). Consequently, also in this instance, since the signal direction discrimination section 21 can be implemented in a digital circuit, the circuit scale and the cost of the automatic delay and amplitude equalizer can be reduced further significantly, and also the performance of the automatic delay and amplitude equalizer can be improved remarkably. Particularly where the signal direction discrimination section 21 sample the first signal I (or Q) in the period equal to 1/N (N is an integer equal to or larger than 2) the period of the data clock to discriminate the direction of variation of the value of the first signal I (or Q), whatever demodulation system has been used to obtain the digital demodulated signals I and Q from the input signal, the direction of variation of the value of each of the signals I and Q can be discriminated with a high degree of accuracy, and this contributes very much also to improvement in universal application of the automatic delay and amplitude equalizer.

Meanwhile, also where the automatic delay and amplitude equalizer is constructed such that the error information detection section 22 detects the error information from an error bit of the second signal Q (or I), the error information can be detected only from the error bit of the second signal Q (or I). Alternatively where the error information detection section 22 is formed as a difference calculation section which calculates a difference between the second one Q (or I) of the digital demodulated signals I and Q of the input signal and an equalized signal $Q_{TRE}$ (or $I_{TRE}$) obtained by processing the second signal Q (or I) by means of the transversal equalizer 5, the error information can be detected further accurately. Consequently, the circuit scale and the cost of the automatic delay and amplitude equalizer can be reduced significantly, and the accuracy and the performance of the automatic delay and amplitude equalizer can be improved further significantly.

Further, the present automatic delay and amplitude equalizer can compensate for the delay characteristic and the amplitude characteristic of the input signal prior to demodulation as the inclination delay equalization section 1A and the inclination amplitude equalization section 1B are provided at a stage or stages preceding to the demodulator 3 as seen in FIG. 3. Consequently, the inclination delay equalization section 1A and the inclination amplitude equalization section 1B can be implemented in a simpler construction than where compensation is performed prior to demodulation, and this contributes very much to further reduction in size of the automatic delay and amplitude equalizer.

Figure 4:
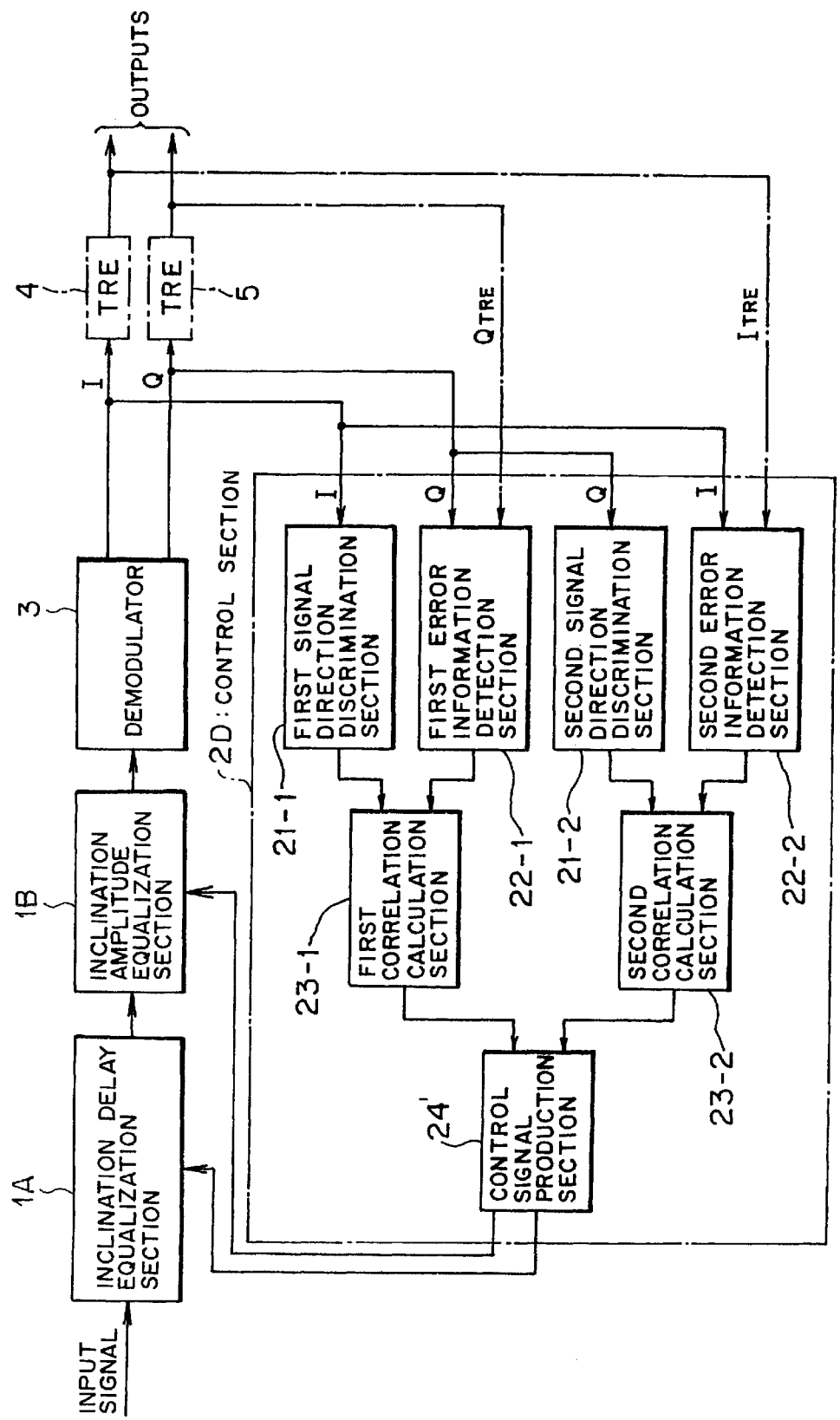

Referring now to FIG. 4, there is shown an automatic delay and amplitude equalizer according to a still further aspect of the present invention. The automatic delay and amplitude equalizer shown includes an inclination delay equalization section 1A, an inclination amplitude equalization section 1B, a control section 2D, a demodulator 3, and a pair of transversal equalizers (TRE) 4 and 5.

The inclination delay equalization section 1A and the inclination amplitude equalization section 1B are individually similar to those described hereinabove with reference to FIG. 3. The control section 2D discriminates a direction of variation of a value of a first one I of a pair of digital demodulated signals I and Q of the input signal, detects error information from a second one Q of the digital demodulated signals I and Q which is orthogonal to the first signal I and produces a first correlation signal based on a correlation between the error information and the direction of variation of the value of the first signal I. The control section 2D further discriminates a direction of variation of a value of the second signal Q, detects error information from the first one I of the digital demodulated signals I and Q which is orthogonal to the second signal Q and produces a second correlation signal based on a correlation between the error information and the direction of variation of the value of the second signal Q. Further, the control section 2D produces a control signal for the inclination delay equalization section 1A and another control signal for the inclination amplitude equalization section 1B based on the first correlation signal and the second correlation signal and outputs the control signals.

In the automatic delay and amplitude equalizer having the construction described above, the control section 2D discriminates the direction of variation of the value of the first one I of the digital demodulated signals I and Q of the input signal and detects the error information from the second signal Q of the digital demodulated signals I and Q which is orthogonal to the first signal I, and then produces a first correlation signal based on a correlation between the error information and the direction of variation of the value of the first signal I.

Further, the control section 2D discriminates the direction of variation of the value of the second signal Q and detects the error information from the first signal I of the digital demodulated signals I and Q which is orthogonal to the second signal Q, and then produces a second correlation signal based on a correlation between the error information and the direction of variation of the value of the second signal Q.

Then, the control section 2D produces a control signal for the inclination delay equalization section 1A and another control signal for the inclination amplitude equalization section 1B based on the first correlation signal and the second correlation signal and outputs the control signals to the inclination delay equalization section 1A and the inclination amplitude equalization section 1B, respectively. In short, the control section 2D detects the direction of variation of the value of a signal and the error information for both of the digital demodulation signals I and Q and produces the control signals based on the correlations between them.

Consequently, with the automatic delay and amplitude equalizer of the fourth aspect of the present invention, since the direction of variation of the value of a signal and the error information are detected for both of the digital demodulated signals I and Q and the control signal for the inclination delay equalization section 1A and the control signal for the inclination amplitude equalization section 1B can be produced based on the correlations between them, the detection sensitivity and the accuracy of each of the control signals can be improved significantly when compared with the automatic delay and amplitude equalizer according to the third aspect of the present invention described hereinabove with reference to FIG. 3. Consequently, the accuracy of the automatic delay and amplitude equalizer can be improved further significantly.

Also in this instance, where the automatic delay and amplitude equalizer is constructed such that the inclination delay equalization section 1A has the inclination delay characteristic in a frequency domain and compensates for the delay characteristic of the input signal in accordance with the inclination delay characteristic and the inclination amplitude equalization section 1B has the inclination amplitude characteristic in the frequency domain and compensates for the amplitude characteristic of the input signal in accordance with the inclination amplitude characteristic, the equalization sections 1A and 1B can be implemented with a simple construction, and this contributes very much to reduction in size of the automatic delay and amplitude equalizer.

Preferably, also the control section 2D includes, as shown in FIG. 4, a first signal direction discrimination section 21-1, a first error information detection section 22-1, a first correlation calculation section 23-1, a second signal direction discrimination section 21-2, a second error information detection section 22-2, a second correlation calculation section 23-2, and a control signal production section 24'.

The first signal direction discrimination section 21-1 discriminates the direction of variation of the value of the first one I of the digital demodulated signals. The first error information detection section 22-1 detects the error information from the second one Q of the digital demodulated signals which is orthogonal to the first signal. The first correlation calculation section 23-1 outputs the first correlation signal based on the correlation between the error information obtained by the first error information detection section 22-1 and the direction of variation of the value of the first signal I obtained by the first signal direction discrimination section 21-1.

Further, the second signal direction discrimination section 21-2 discriminates the direction of variation of the value of the second signal Q. The second error information detection section 22-2 detects the error information from the first signal I. The second correlation calculation section 23-2 outputs the second correlation signal based on the correlation between the error information obtained by the second error information detection section 22-2 and the direction of variation of the value of the second signal obtained by the second signal direction discrimination section 21-2.

The control signal production section 24' produces the control signal for the inclination delay equalization section 1A and the control signal for the inclination amplitude equalization section 1B from the first correlation signal from the first correlation calculation section 23-2 and the second correlation signal from the second correlation calculation section 23-2.

In the control section 2D having the construction described above, the first signal direction discrimination section 21-1 discriminates the direction of variation of the value of the first one I of the digital demodulated signals I and Q while the first error information detection section 22-1 detects the error information from the second one Q of the digital demodulated signals I and Q which is orthogonal to the first signal I, and the first correlation calculation section 23-1 outputs the first correlation signal based on the correlation between the error information obtained by the first error information detection section 22-1 and the direction of variation of the value of the first signal I obtained by the first signal direction discrimination section 21-1.

Simultaneously, the second signal direction discrimination section 21-2 discriminates the direction of variation of the value of the second signal Q while the second error information detection section 22-2 detects the error information from the first signal I which is orthogonal to the second signal Q, and the second correlation calculation section 23-2 outputs the second correlation signal based on the correlation between the error information obtained by the second error information detection section 22-2 and the direction of variation of the value of the second signal Q obtained by the second signal direction discrimination section 21-2.

Then, the control signal production section 24' produces the control signal for the inclination delay equalization section 1A and the control signal for the inclination amplitude equalization section 1B from the first correlation signal and the second correlation signal, and outputs the control signals to the corresponding equalizations 1A and 1B, respectively. Consequently, the delay characteristic and the amplitude characteristic of the input signal are compensated for in accordance with the predetermined inclination delay characteristic and inclination amplitude characteristic by the equalization sections 1A and 1B, respectively.

Accordingly, also in this instance, the control system (control section 2D) for delay equalization and amplitude equalization can be implemented in a digital circuit. Consequently, the circuit scale and the cost of the automatic delay and amplitude equalizer can be reduced significantly, and also the accuracy in compensation of the automatic delay and amplitude equalizer can be improved significantly.

Also the automatic delay and amplitude equalizer may be constructed such that the first signal direction discrimination section 21-1 samples the first signal I in a data clock period or in a period equal to 1/N (N is an integer equal to or larger than 2) the period of the data clock to discriminate the direction of variation of the value of the first signal I and the second signal direction discrimination section 21-2 samples the second signal Q in the data clock period or in the period equal to 1/N the period of the data clock to discriminate the direction of variation of the value of the second signal Q.

Consequently, the first signal direction discrimination section 21-1 can discriminate the direction of variation of the value of the first signal I by sampling the first signal I in the data clock period or in the period-equal to 1/N the period of the data clock, and the second signal direction discrimination section 21-2 can discriminate the direction of variation of the value of the second signal Q by sampling the second signal Q in the data clock period or in the period equal to 1/N the period of the data clock.

Accordingly, also in this instance, the signal direction discrimination sections 21-1 and 21-2 for the digital demodulated signals I and Q can be implemented in digital circuits. Consequently, the circuit scale and the cost of the automatic delay and amplitude equalizer can be reduced significantly, and also the performance of the automatic delay and amplitude equalizer can be improved remarkably. Further, whatever demodulation system has been used to obtain the digital demodulated signals I and Q from the input signal, the direction of variation of the value of each of the digital demodulated signals I and Q can be discriminated with a high degree of accuracy, and this contributes very much also to improvement in universal application of the automatic delay and amplitude equalizer.

The automatic delay and amplitude equalizer may be constructed such that the first error information detection section 22-1 detects the error information from an error bit of the first signal I and the second error information detection section 22-2 detects the error information from an error bit of the second signal Q. This allows the error information detection sections 22-1 and 22-2 to detect the error information from the error bits of the signals I and Q simply and readily. Accordingly, the circuit scale and the cost of the automatic delay and amplitude equalizer can be reduces significantly.

Alternatively, the automatic delay and amplitude equalizer may be constructed such that the first error information detection section 22-1 is formed as a first difference calculation section which calculates a difference between the second one Q of the digital demodulated signals I and Q of the input signal and an equalized signal $Q_{TRE}$ obtained by processing the second signal Q by means of the transversal equalizer 5 and the second error information detection section 22-2 is formed as a second difference calculation section which calculates a difference between the first signal I and an equalized signal $I_{TRE}$ obtained by processing the first signal I by means of the transversal equalizer 4.

In the automatic delay and amplitude equalizer having the construction just described, the error information detection sections 22-1 and 22-2 can detect the error information of the digital demodulated signals I and Q using the equalized signals $I_{TRE}$ and $Q_{TRE}$ obtained by equalization processing by the transversal equalizers 4 and 5 by calculating the differences between the digital demodulated signals I and Q and the equalized signals $I_{TRE}$ and $Q_{TRE}$ obtained by processing the signals I and Q by means of the transversal equalizers 4 and 5. Accordingly, also in this instance, the accuracy of the error information obtained from the digital demodulated signals I and Q is improved, and consequently, the accuracy and the performance of the automatic delay and amplitude equalizer can be improved further significantly.

Also the present automatic delay and amplitude equalizer can compensate for the delay characteristic and the amplitude characteristic of the input signal before demodulation by providing the inclination delay equalization section 1A and the inclination amplitude equalization section 1B at a stage or stages preceding to the demodulator 3. Consequently, the equalization sections 1A and 1B can be implemented in a simpler construction than where compensation is performed prior to demodulation, and this contributes very much to further reduction in size of the automatic delay and amplitude equalizer.

In summary, according to the present invention, it is possible to detect inclination information of a linear distortion characteristic of an input signal (detection step) and compensate for a delay characteristic and an amplitude characteristic of the input signal based on the inclination information of the linear distortion characteristic (compensation step).

B. Description of Embodiments

In the following, several embodiments of the present invention are described with reference to the drawings.

B-1. First Embodiment of Automatic Delay Equalizer

Figure 5:
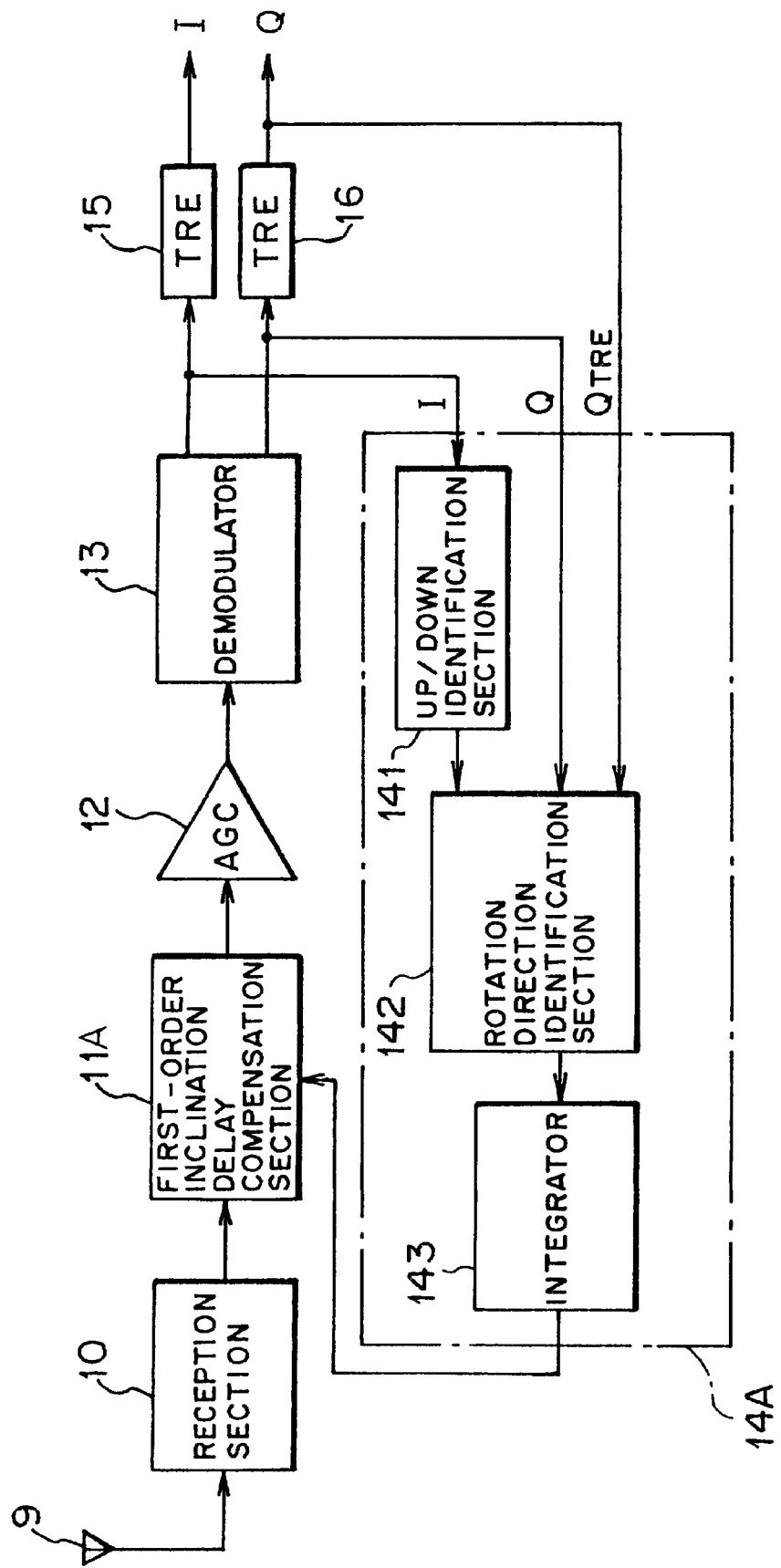
FIG. 5 is a block diagram showing a first embodiment of an automatic delay equalizer according to the present invention.

Referring now to FIG. 5, there is shown in block diagram an automatic delay equalizer according to the present invention. The automatic delay equalizer shown includes an antenna 9, a reception section 10, a first-order inclination delay compensation section 11A, an automatic gain control section (AGC) 12, a demodulator 13, a control section 14A, and a pair of transversal equalizers (TRE) 15 and 16.

The reception section 10 frequency converts (down converts) an RF (radio frequency) signal received by the antenna 9 into an IF (intermediate frequency) signal and outputs the IF signal to the first-order inclination delay compensation section 11A. The first-order inclination delay compensation section (inclination delay equalization section) 11A has an inclination delay characteristic in the frequency-domain and compensates for the delay characteristic of the IF signal (input signal) from the reception section 10 in accordance with the inclination delay characteristic. In the present embodiment, the first-order inclination delay compensation section 11A is provided at a stage preceding to the demodulator 13, that is, at a position at which the IF signal is inputted to and outputted from the first-order inclination delay compensation section 11A.

The automatic gain control section 12 controls the gain of the output signal of the first-order inclination delay compensation section 11A fixed and outputs a resulting signal to the demodulator 13. The demodulator 13 demodulates the signal from the first-order inclination delay compensation section 11A outputted through the automatic gain control section 12 into two orthogonal base band signals and converts the orthogonal base band signals from analog to digital signals to obtain digital demodulated signals I and Q.

Figure 18:
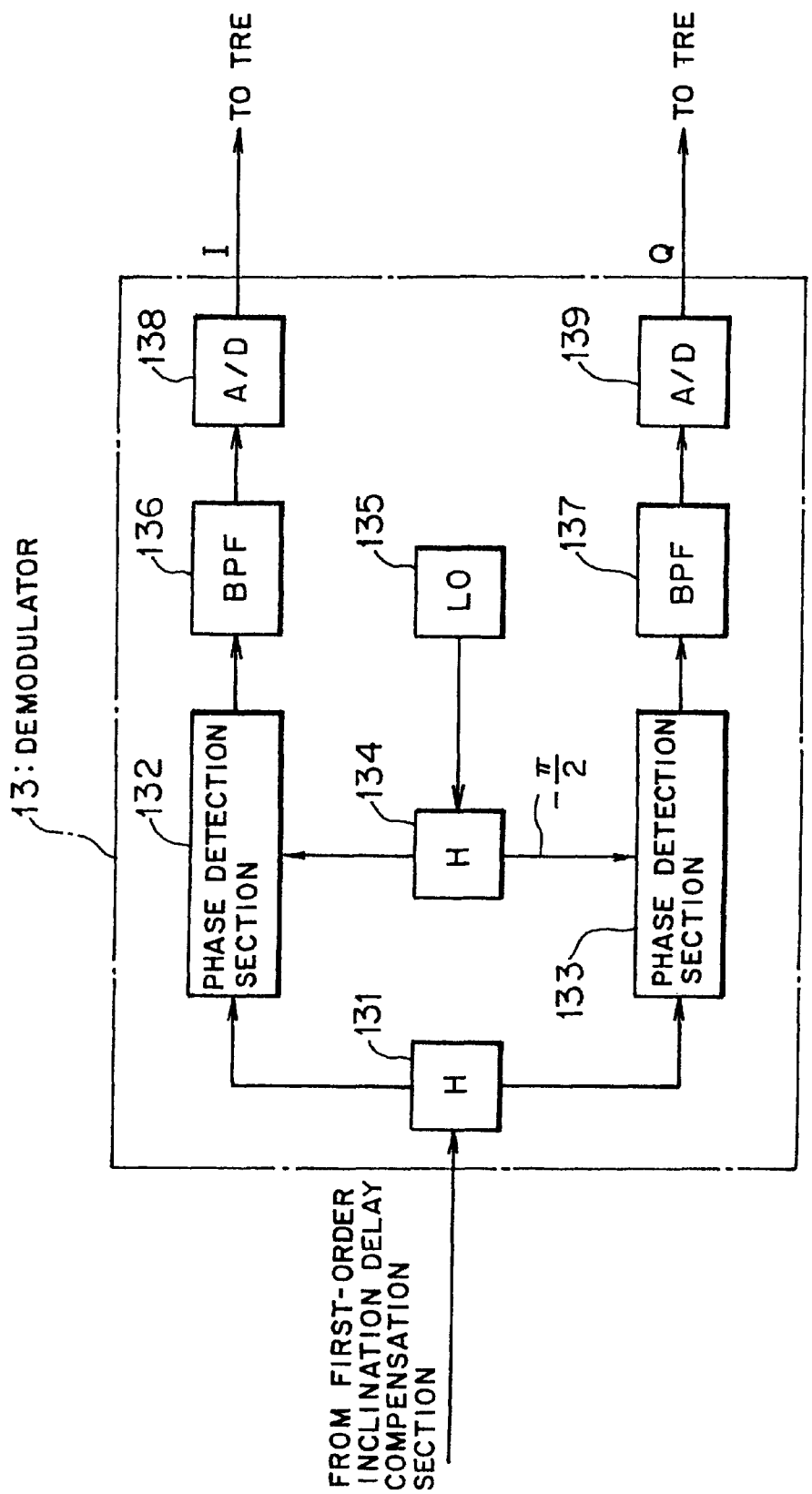
FIG. 18 is a block diagram showing an example of a construction of a demodulator of the automatic delay equalizer of FIG. 5.

To this end, the demodulator 13 in the present embodiment includes, for example, as shown in FIG. 18, a pair of hybrid circuits (H) 131 and 134, a pair of phase detection sections 132 and 133, a local oscillator (LO) 135, a pair of band pass filters (BPF) 136 and 137, and a pair of analog to digital converters (A/D) 138 and 139.

Each of the hybrid circuits 131 and 134 branches an input signal thereto into two waves. The phase detection sections 132 and 133 perform orthogonal detection of an IF signal from the hybrid circuit 131 in response to a carrier reproduction signal from the local oscillator 135 all described below to obtain demodulated base band signals I and Q orthogonal to each other, respectively. The local oscillator 135 produces a carrier reproduction signal synchronized in phase with a carrier.

The band pass filters 136 and 137 filter the demodulated base band signals I and Q obtained from the phase detection sections 132 and 133 to remove noise components from the demodulated base band signals I and Q, respectively, while allowing only signal components of a required frequency band to pass therethrough. The analog to digital converters 138 and 139 perform analog to digital conversion of the demodulated base band signals I and Q from the band pass filters 136 and 137 to obtain digital demodulated signals I and Q, respectively.

Consequently, in the demodulator 13 described above, an IF signal from the automatic gain control section 12 (refer to FIG. 5) is branched into two waves by the hybrid circuit 131, and the two output signals of the hybrid circuit 131 are outputted to the phase detection sections 132 and 133. Meanwhile, a carrier reproduction signal synchronized in phase with the carrier is produced by the local oscillator 135 and is branched into two waves having phases different by $\pi/2$ from each other by the hybrid circuit 134. The two waves from the hybrid circuit 134 are outputted to the phase detection sections 132 and 133.

As a result, the demodulated base band signals I and Q orthogonal to each other are obtained from the phase detection sections 132 and 133, respectively. The demodulated base band signals I and Q are inputted through the band pass filters 136 and 137 to the analog to digital converters 138 and 139, by which they are converted from analog into digital signals to obtain digital demodulated signals I and Q having phases different by 90 degrees from each other (orthogonal to each other), respectively.

The control section 14A detects a linear (first-order inclination) distortion [delay characteristic (delay amount $\tau$)] of the IF signal obtained from the demodulator 13 from the digital demodulated signals I and Q of the IF signal, and outputs thus detected information as a control signal for controlling the (first-order) inclination delay characteristic of the first-order inclination delay compensation section 11A. The transversal equalizers 15 and 16 equalize the digital demodulated signals I and Q obtained by the demodulator 13 in the time-domain, respectively.

In the automatic delay equalizer shown in FIG. 5 and having the construction described above, an RF signal received by the antenna 9 is down converted into an IF signal by the reception section 10 and is orthogonally detected by the demodulator 13 so that a pair of digital demodulated signals I and Q of a base band are obtained.

Then, the control section 14A detects a first-order inclination distortion (delay amount $\tau$) of the IF signal using the digital demodulated signals I and Q and an equalized signal $Q_{TRE}$ obtained by equalization processing of the digital demodulated signal Q by means of the transversal equalizer 16. The control section 14A outputs a control signal for the first-order inclination delay compensation section 11A based on a result of such detection to the first-order inclination delay compensation section 11A. The first-order inclination delay compensation section 11A compensates for the first-order inclination (delay) distortion of the IF signal by controlling the first-order inclination delay characteristic of the first-order inclination delay compensation section 11A in accordance with the control signal from the control section 14A as hereinafter described.

By the way, the delay amount $\tau$ mentioned above is given by frequency differentiation ($\tau=d\theta/d\omega$) of the phase characteristic of the transmission line. Normally, with: an ideal transmission line having no linear distortion, since the phase $\theta$ varies linearly with respect to the frequency f (the phase frequency characteristic is linear) as seen from FIG. 6, the delay amount $\tau$ is given as $\tau=d\theta/d\omega$=constant as seen from FIG. 7 and no delay distortion is produced.

Actually, however, since the phase frequency characteristic described above does not exhibit a linear variation and the delay amount $\tau=d\theta/d\omega$ varies in response to the frequency f, a delay distortion is produced.

Figure 6:
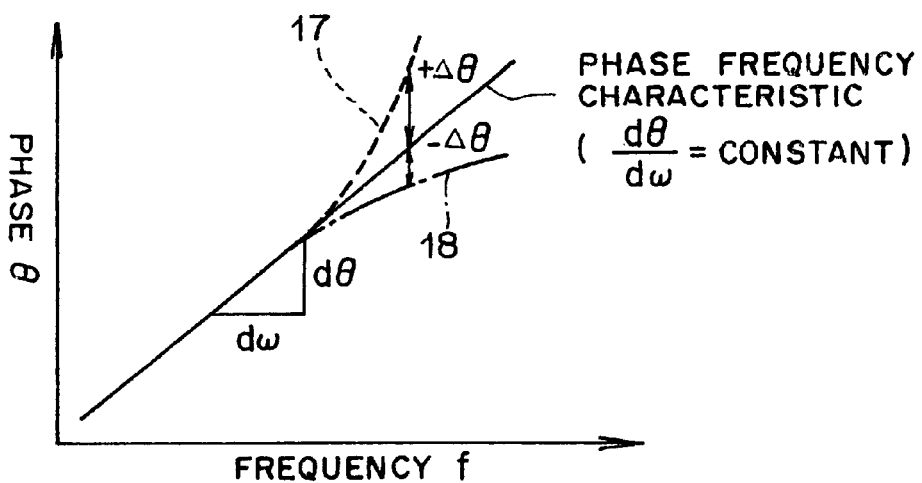
FIGS. 6 to 8 are diagrams illustrating different delay distortions.
Figure 7:
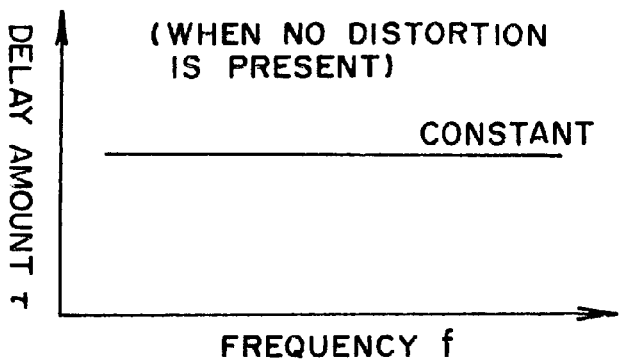
Figure 8:
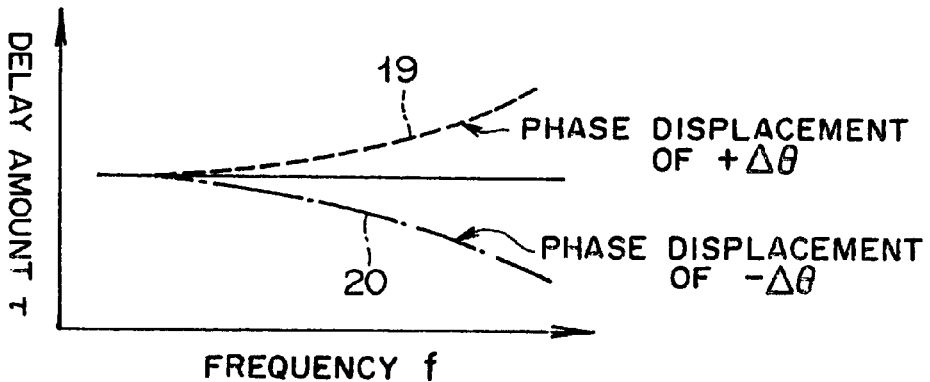

For example, if the phase frequency characteristic is displaced upwardly by $+\Delta\theta$ as the frequency f increases as indicated by a broken line curve 17 in FIG. 6, then the delay amount $\tau$ varies in response to the frequency f as indicated by a broken line 19 in FIG. 8 and a delay distortion which increases rightwardly in FIG. 8 (has a positive inclination) is produced. On the other hand, if the phase frequency characteristic is displaced downwardly by $-\Delta\theta$ as the frequency f increases as indicated by an alternate long and short dash line 18 in FIG. 6, then the delay amount $\tau$ varies in response to the frequency f as indicated by an alternate long and short dash line 20 in FIG. 8 and a delay distortion which decreases rightwardly in FIG. 8 (has a negative inclination) is produced.

In the following, the principle of detecting a delay distortion (delay characteristic) described above is described in detail with reference to FIGS. 9 to 17.

Figure 9:
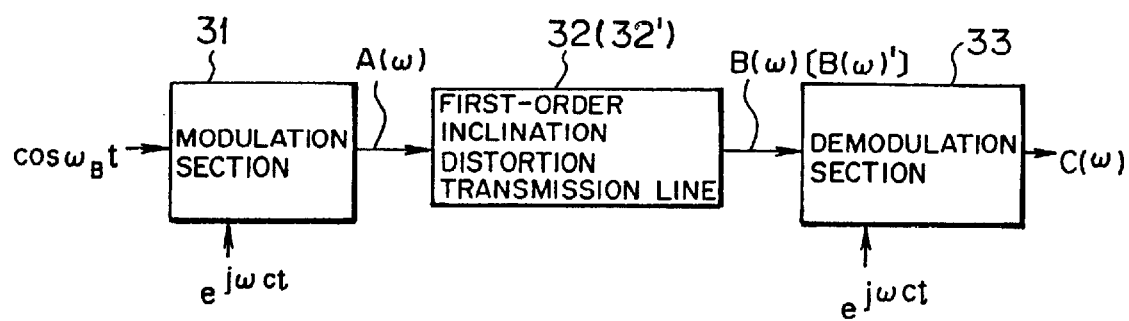
FIG. 9 is a block diagram illustrating a concept of a signal transmission system and illustrating a principle of detection of a delay distortion by the automatic delay equalizer of FIG. 5.
Figure 10:
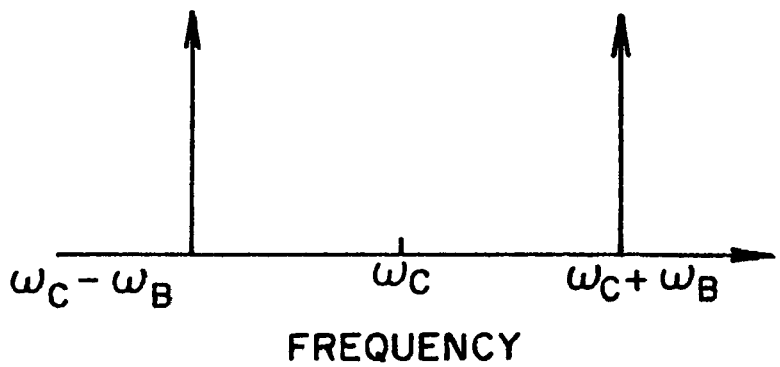
FIGS. 10 to 17 are diagrams illustrating the principle of detection of a delay distortion by the automatic delay equalizer of FIG. 5.

Referring first to FIG. 9, there is illustrated a perception of a signal transmission system. The signal transmission system shown includes a modulation section 31, a first-order inclination distortion (delay distortion) transmission line 32 and a demodulation section 33. In FIG. 9, reference symbol $\omega_B$ denotes a signal (base band) frequency, $\omega_C$ a carrier frequency, $A(\omega)$ a modulated signal, $B(\omega)$ a modulated signal having undergone a delay distortion as a first-order inclination distortion by the first-order inclination distortion transmission line 32, and $C(\omega)$ a demodulated signal.

For example, where a transmission signal is represented as $\cos \omega_B t$, if, for example, the transmission signal $\cos \omega_B t$ is modulated by the modulation section 31 using the modulation carrier $\exp(j\omega_C t)$, then the modulated signal $A(\omega)$ from the modulation section 31 is represented in the following manner:

$$A(\omega)=\cos \omega_B t \times \exp(j\omega_C t) \qquad (1)$$

Here, since, from the Euler's formula, $$\cos \theta = [\exp(j\theta)+\exp(-j\theta)]/2$$

the modulated signal $A(\omega_B)$ is given as $$A(\omega)=[\exp(j\omega_B t)$$
$$+\exp(-j\omega_B t)]$$
$$\times \exp(j\omega_C t)/2=$$
$$[\exp[j(\omega_C+\omega_B)t]$$
$$+\exp[j(\omega_C-\omega_B)t]$$
$$]/2 \qquad (2)$$

Figure 11:
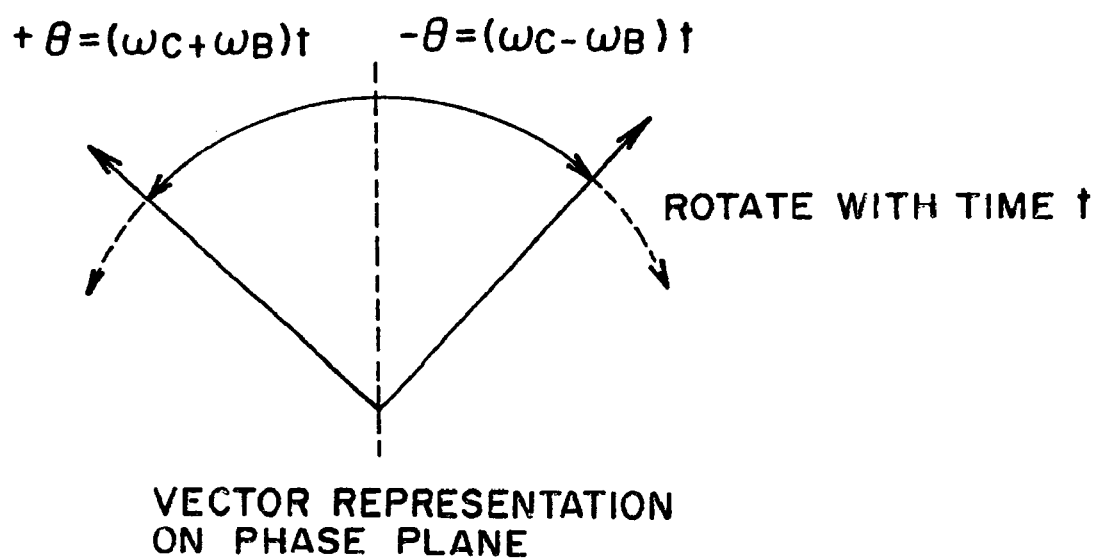

The expression (2) indicates that two frequency components $(\omega_C+\omega_B)$ and $(\omega_C-\omega_B)$ are present in the modulated signal $A(\omega)$. Where the frequency components $(\omega_C+\omega_B)$ and $(\omega_C-\omega_B)$ are represented in vector on a phase plane, they are represented in such a manner as illustrated in FIG. 11. As seen from FIG. 11, the vectors $(\omega_C+\omega_B)$ and $(\omega_C-\omega_B)$ rotate in the counterclockwise direction ($+\theta$ direction) and the clockwise direction ($-\theta$ direction), respectively, as time t passes.

Figure 12:
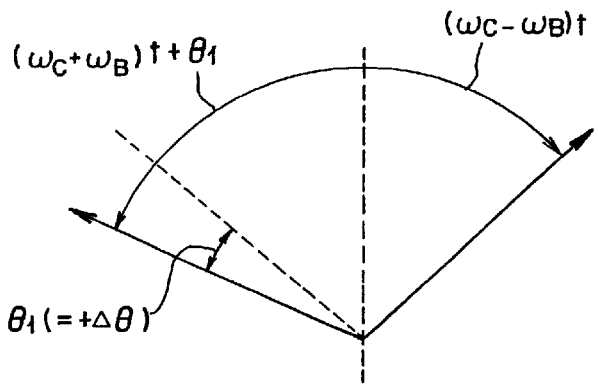

Here, for example, a case is examined wherein the modulated signal $A(\omega)$ mentioned above is influenced by the delay characteristic of the transmission line 32 and a delay distortion of a positive inclination (phase displacement of $\theta_1=+\Delta\theta$) is produced in the modulated signal $A(\omega)$. In this instance, the signal $B(\omega)$ having the delay distortion provided thereto is represented in such a manner as given by the following expression (3):

$$B(\omega)=[\exp j((\omega_B$$
$$+\omega_C)t+\theta_1)+\exp j$$
$$(\omega_C-\omega$$
$$_B)t]/2=\exp j\omega_C t \times$$
$$[\exp j(\omega_B+\theta_1)+$$
$$\exp j(-\omega_B)t]/2 \qquad (3)$$

Where the expression (3) is represented in vector similarly to FIG. 11, it is represented in such a manner as seen in FIG. 12. Then, it is examined to orthogonally demodulate the signal $B(\omega)$ by means of the demodulation section 33. In this instance, since the demodulated signal $C(\omega)$ is obtained by $C(\omega)=B(\omega)/\exp(j\omega t)$, it is represented by the following expression (4):

$$C(\omega)=\exp j(\omega_B t+\theta_1)+\exp(-\omega_B t)/2=$$
$$[\cos(\omega_B t+\theta_1)+j \sin(\omega_B t+\theta_1)+\cos \omega_B t-$$
$$j \sin \omega_B t]/2=[(\cos(\omega_B t+\theta_1)+\cos \omega_B t)+j$$
$$(\sin(\omega_B t+\theta_1)-\sin \omega_B t]/2 \qquad (4)$$

Accordingly, if the demodulated signal $C(\omega)$ is orthogonally demodulated, then $$I \text{ axis component: } I=[(\cos(\omega_B t+\theta_1)+\cos \omega_B t)]/2 \qquad (5)$$

$$Q \text{ axis component: } Q=[(\sin(\omega_B t+\theta_1)-\sin \omega_B t)]/2 \qquad (6)$$

are obtained. Here, when $\theta_1=0$, that is, when the demodulated signal $C(\omega)$ has no delay distortion (when the inclination of the delay distortion is zero), $I=\cos \omega_B t$ and $Q=0$ are obtained from the expressions (5) and (6). Thus, it can be seen that the transmission signal itself has been demodulated.

Figure 13:
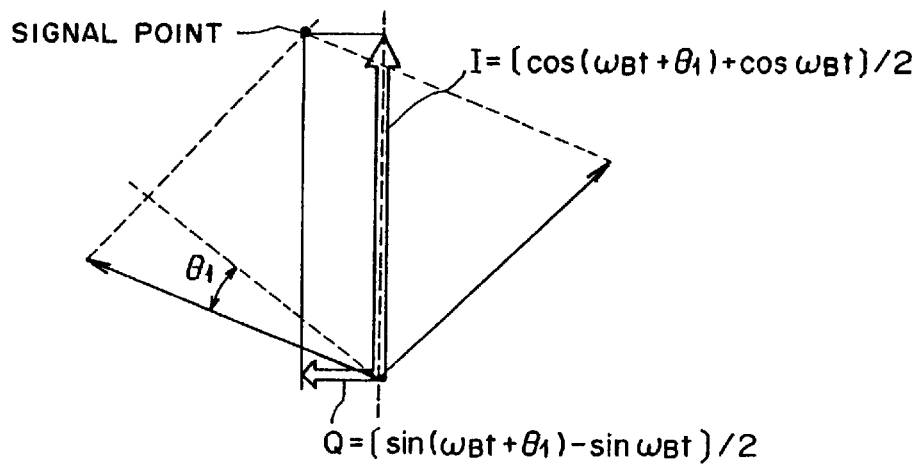
Figure 14:
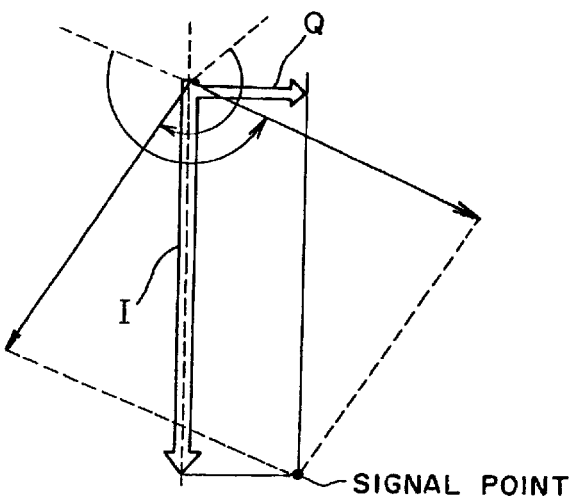

On the other hand, where $\theta_1=+\Delta\neq0$ as described hereinabove, an orthogonal interference component is produced on the Q axis (in the negative direction) as seen, for example, from FIG. 13. Then, if time t passes under the same distortion environment and the vector of the frequency components described above rotates, for example, in such a manner as seen in FIG. 14, then an orthogonal interference component is produced now in the positive direction of the Q axis.

In short, if the signal point (value of the signal) moves (varies) in the downward direction (negative direction of the I axis: ↓) in a condition wherein the transmission line 32 has a delay characteristic of a positive inclination, an orthogonal interference component is produced in the positive direction of the Q axis, but if the signal point moves in the upward direction (positive direction of the I axis: ↑), then an orthogonal interference component is produced in the negative direction of the Q axis.

Figure 15:
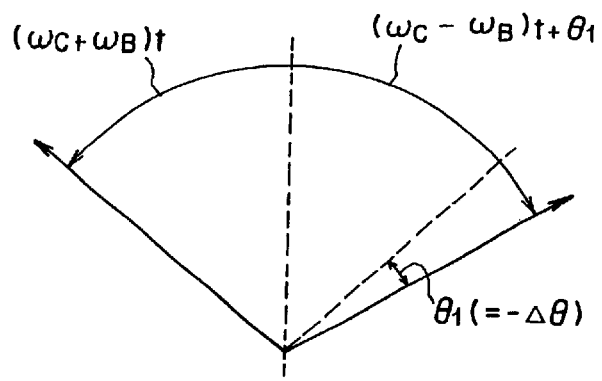
Figure 16:
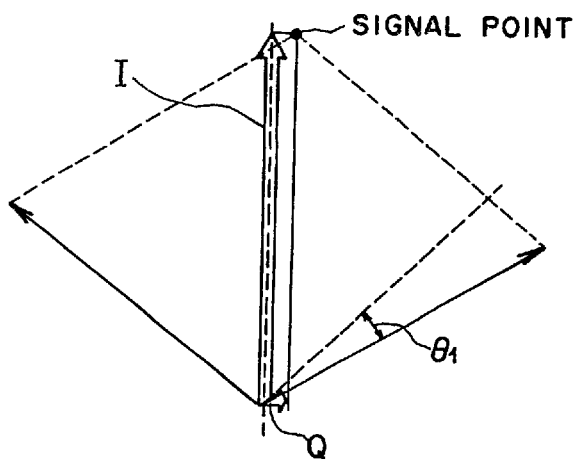
Figure 17:
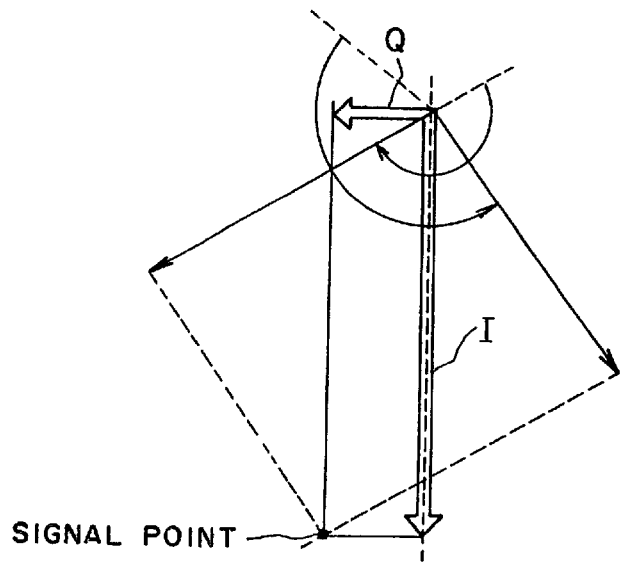

On the other hand, if the modulated signal $A(\omega)$ is influenced by the delay characteristic of the transmission line 32 and a delay distortion of a negative inclination (phase displacement of $\theta_1=-\Delta\theta\neq 0$) is produced conversely, for example, as seen in FIG. 15, then an orthogonal interference component is produced on the Q axis (positive direction) as seen in FIG. 16. Then, if time t passes under the same distortion environment and the vector of the frequency components described above rotates, for example, in such a manner as seen in FIG. 17, then an orthogonal interference component is now produced in the negative direction of the Q axis.

In short, if the signal point (value of the signal) moves (varies) in the downward direction (negative direction of the I axis: ↓) in a condition wherein the transmission line 32 has a delay characteristic of a negative inclination, then an orthogonal interference component is produced in the negative direction of the Q axis, but if the signal point moves in the upward direction (positive direction of the I axis: ↑), then an orthogonal interference component is produced in the positive direction of the Q axis.

Accordingly, if the orthogonal interference components of the positive and negative directions are regarded as error voltages (error information) ±E at the demodulation section 33, then if the direction of the variation of the value of the digital demodulated signal I (or Q) is discriminated and the error voltage ±E of the digital demodulated signal Q (or I) then as seen from Table 1 below, then inclination information of a positive inclination, a negative inclination or the like of the first-order inclination distortion (delay distortion) of the input signal can be detected based on the relationship of them.

TABLE 1

Relationship among motion of signal, error information and delay distortion

| Motion of signal I | Error information of signal Q | Discrimination of Inclination of delay |
|---|---|---|
| ↓ | −E | Delay distortion of |
| ↑ | +E | Positive inclination |
| ↓ | +E | Delay distortion of |
| ↑ | −E | Negative inclination |

To this end, referring back to FIG. 5, the control section 14A in the present embodiment includes an up/down identification section 141, a rotation direction identification section 142 and an integrator 143. The up/down identification section (signal direction discrimination section) 141 discriminates the direction in which one of a pair of digital demodulated signals I and Q obtained by the demodulator 13, that is, the signal I (which may be hereinafter referred to as digital I channel signal I), moves, that is, in which direction, for example, between the upward direction (↑) and the downward direction (↓), the value of the digital demodulated signal I moves (varies) on the I axis as described hereinabove.

The rotation direction identification section (error information detection section, correlation calculation section) 142 detects an error voltage (error information) ±E with respect to the digital demodulated signal I from the digital demodulated signal Q (which may be hereinafter referred to as digital Q channel signal Q) obtained similarly by the demodulator 13 and an equalized signal $Q_{TRE}$ obtained by equalization of the digital demodulated signal Q by means of the transversal equalizer 16 (refer to FIG. 5). The rotation direction identification section 142 then detects a delay distortion (positive/negative inclination distortion) of the received signal based on the correlation (refer to Table 1) between the error voltage ±E and the direction of motion of the signal I obtained by the up/down identification section 141.

The integrator 143 integrates the detection signal of the delay distortion obtained by the rotation direction identification section 142 to remove noise components included in the detection signal and outputs a resulting signal as a control signal for the first-order inclination delay compensation section 11A.

Consequently, in the control section 14A, the direction in which the digital demodulated signal I moves (direction of the variation of the value of the signal) is discriminated by the up/down identification section 141, and the error voltage ±E of the digital demodulated signal Q is detected by the rotation direction identification section 142. Further, inclination information of the delay distortion of the IF signal is detected from the direction of movement of the digital demodulated signal I and the error voltage ±E of the digital demodulated signal Q.

The up/down identification section 141 and the rotation direction identification section 142 described above are described in more detail.

Figure 19:
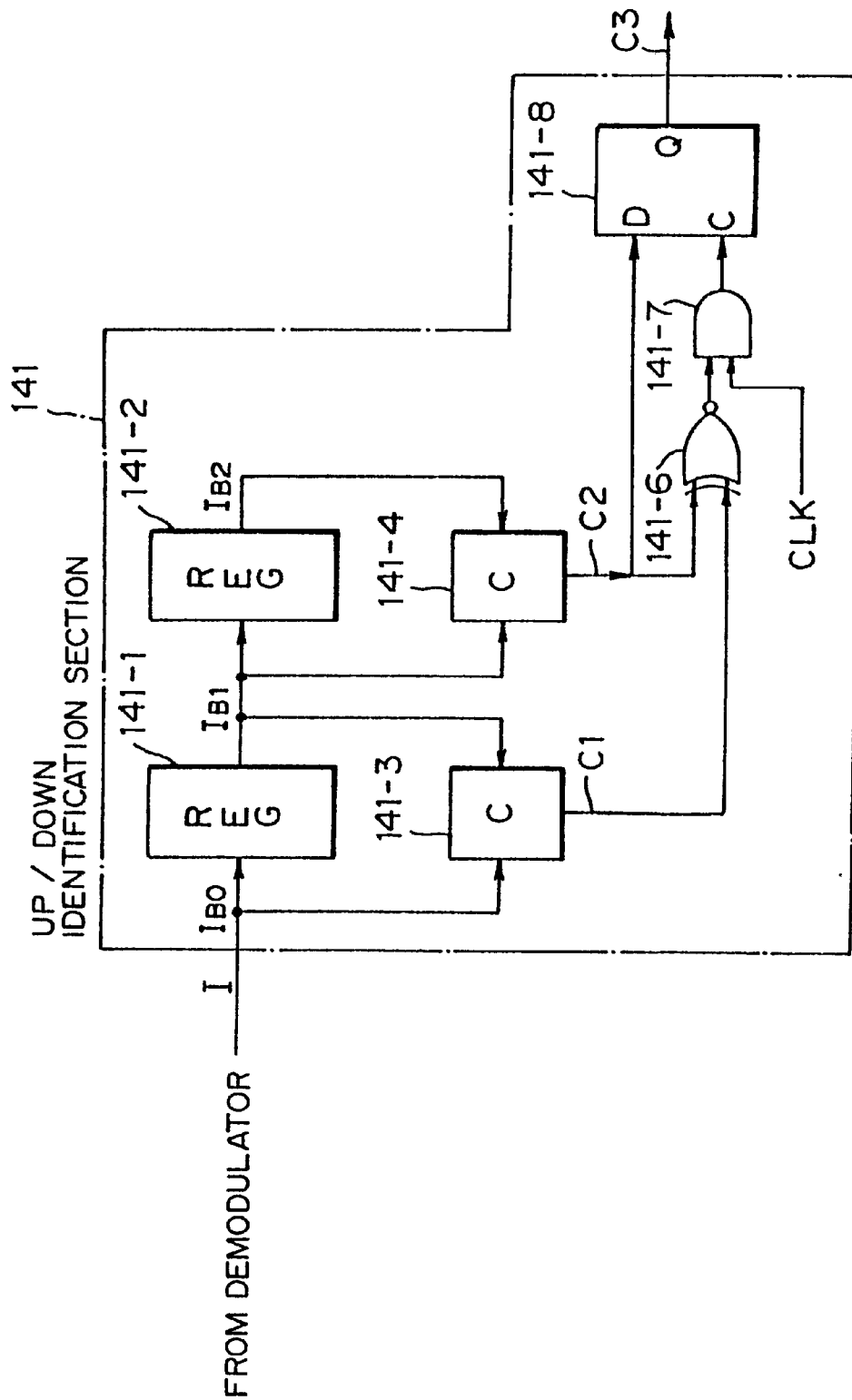
FIG. 19 is a block diagram showing an example of a construction of an up/down identification section of the automatic delay equalizer of FIG. 5.

The up/down identification section 141 in the present embodiment includes, for example, as shown in FIG. 19, a pair of registers (REG) 141-1 and 141-2, a pair of comparators (C) 141-3 and 141-4, an EX-NOR gate (Exclusive NOR element) 141-6 of the output inversion type, an AND gate 141-7, and a flip-flop circuit 141-8.

The register 141-1 delays the digital demodulated signal I from the demodulator 13 by a required time, and the register 141-2 further delays the digital demodulated signal I after delayed by the register 141-1 by a time equal to the delay time by the register 141-1. Consequently, data $I_{B0}$, $I_{B1}$ and $I_{B2}$ of the digital demodulated signal I are sampled out in time series by the registers 141-1 and 142-2.

The comparator 141-3 compares the data $I_{B0}$ and the data $I_{B1}$ of the digital demodulated signal I before and after delayed by the register 141-1 while the comparator 141-4 compares the data $I_{B1}$ and the data $I_{B2}$ of the digital demodulated signal I before and after delayed by the register 141-2.

The EX-NOR gate 141-6 of the output inversion type exclusive NORs results of comparison by the comparators 141-3 and 141-4 and outputs an inverted result of the comparison. The AND gate (logical AND element) 141-7 logically ORs a result of calculation from the EX-NOR gate 141-6 and a timing clock pulse which exhibits a high level for each data clock period T. The flip-flop circuit 141-8 outputs a signal corresponding to the direction of the variation of the value of the digital demodulated signal I inputted thereto based on a result of comparison by the comparator 141-4 and a result of operation by the AND gate 141-7.

In the up/down identification section 141 having the construction described above, data $I^{B0}$, $I_{B1}$ and $I_{B2}$ of the digital demodulated signal I are first sampled out in time series in a data clock period T by the registers 141-1 and 141-2, and then the data $I_{B0}$ and the data $I_{B1}$ are compared with each other by the comparator 141-3. A result of the comparison is outputted as a detection signal C1 from the comparator 141-3. The detection signal C1 exhibits one of three cases of $I_{B0}>I_{B1}$, $I_{B0}=I_{B1}$, and $I_{B0}<I^{B2}$.

Further, the data $I_{B1}$ from the register 141-1 and the further delayed data $I_{B2}$ from the register 141-2 are compared with each other by the comparator 141-4, and a result of the comparison is outputted as a detection signal C2 from the comparator 141-4. The detection signal C2 exhibits one of three cases Of $I_{B1}>I_{B2}$, $I_{B1}=I_{B2}$, and $I^{B1}>I_{B2}$.

Then, for example,. when the detection signal C1 is $C1=I_{B0}>I_{B1}$, and the detection signal C2 is $C2=I_{B1}>I_{B2}$, that is, when the digital demodulated signal I exhibits data which increases in signal level as time passes, it is discriminated that the direction in which the digital demodulated signal I moves is the upward direction. On the contrary when the detection signal C1 is $C1=I_{B0}<I_{B2}$ and the detection signal C2 is $C2=I_{B1<IB2}$, it is discriminated that the direction in which the digital demodulated signal I moves is the downward direction.

Now, if it is defined that C1=1 when the result of comparison by the comparator 141-3 is $I_{B0}>I_{B1}$ and C2=1 when the result of comparison by the comparator 141-4 is $I_{B1}>I_{B2}$, then the truth table of the values C1 to C3 is such as shown in Table 2 below.

TABLE 2

Truth table of up/down identification section

| C1 | C2 | C3 |
|---|---|---|
| 0 | 0 | 0 |
| 0 | 1 | X (maintains state prior by one bit) |
| 1 | 0 | X (maintains state prior by one bit) |
| 1 | 1 | 1 |

In particular, in this instance, from the up/down identification section 141, the value "1" is outputted when the direction in which the digital demodulated signal I moves is the upward direction, but the value "0" is outputted when the direction is the downward direction. It is to be noted that, as seen from Table 2, in any other case than when both of the detection signals C1 and C2 are equal to "0" or equal to "1", the direction in which the signal I moves cannot be discriminated at the point of time, and consequently, a result of discrimination in the last cycle (a value prior by 1 bit) is maintained.

While the up/down identification section 141 samples the digital demodulated signal I in the data clock period T, the digital demodulated signal I may otherwise be sampled in a period T/N (N is an integer equal to or greater than 2) of the data clock signal to discriminate the direction in which the digital demodulated signal I moves. In the alternative just described, the direction in which the digital demodulated signal I moves can be discriminated in a similar manner also where the signal is obtained by demodulation of a signal which has been modulated by such a modulation method as, for example, quadriphase PSK (Phase Shift Keying) or multi-value QAM (Quadrature Amplitude Modulation).

Consequently, by whichever modulation method a transmission signal has been modulated (by whichever modulation method a signal from which the digital demodulated signal Q is originated has been modulated), the direction of the variation of the value of the digital demodulated signal I can be discriminated with a high degree of accuracy, and accordingly, the up/down identification section 141 can cope with any modulation system flexibly and contributes very much to improvement of the flexibility of the present automatic delay equalizer.

Figure 20:
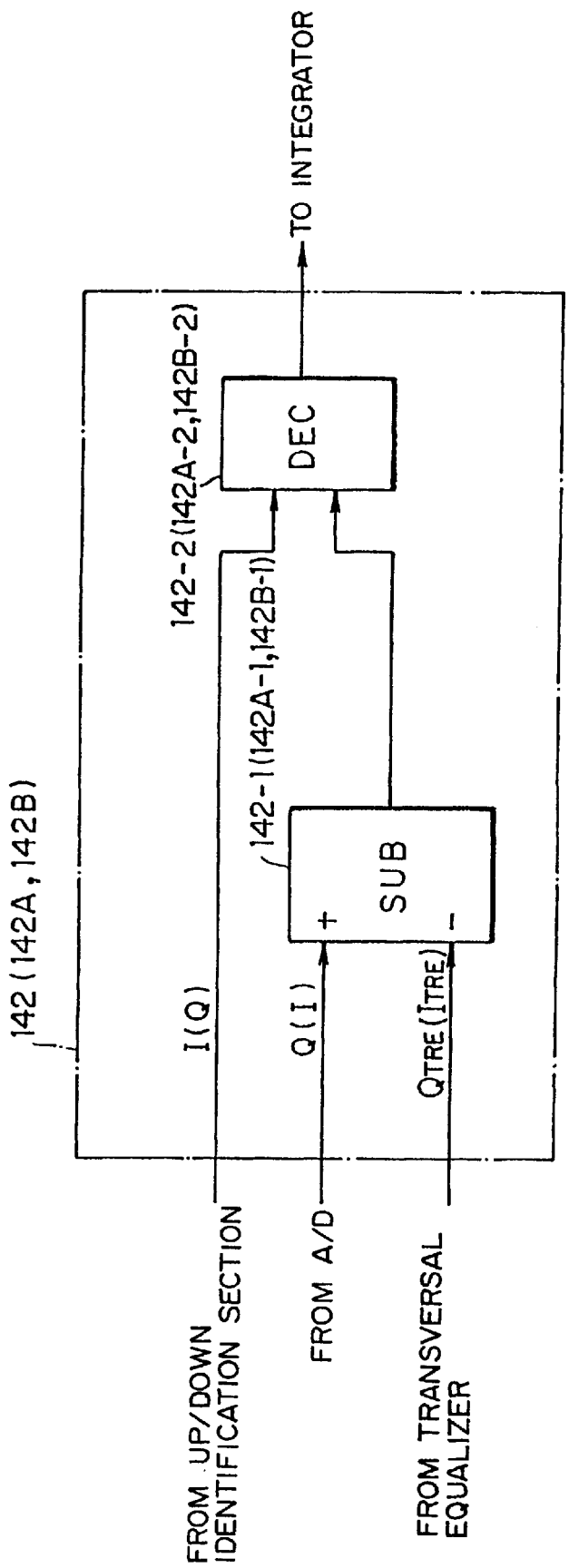
FIG. 20 is a block diagram showing an example of a construction of a rotation direction identification section of the automatic delay equalizer of FIG. 5.

Meanwhile, the rotation direction identification section 142 described hereinabove includes, for example, as shown in FIG. 20, a subtractor (SUB) 142-1 and a decoder (DEC) 142-2.

The subtractor (error information detection section) 142-1 detects, from the signal Q of the digital demodulated signals I and Q which is orthogonal to the other signal I, an error voltage ±E which makes an orthogonal interference component with the signal I. In this instance, the subtractor 142-1 is constructed as a difference calculation section which calculates a difference between the digital demodulated signal Q before equalization by the transversal equalizer 16 and the equalized signal $Q_{TRE}$ after equalization to detect an error voltage ±E.

Meanwhile, the decoder (correlation calculation section) 142-2 detects inclination information of a delay distortion based on the correlation (refer to Table 1) between the error voltage ±E obtained by the subtractor 142-1 and the direction of movement of the signal I obtained by the up/down identification section 141 as described hereinabove. The decoder 142-2 thus outputs a resulting signal as a control signal for the first-order inclination delay compensation section 11A.

Consequently, in the rotation direction identification section 142, the difference between the signal Q and the signal $Q_{TRE}$ before and after equalized by the transversal equalizer 16 is calculated by the subtractor 142-1 to detect an error voltage ±E of the signal Q, and a signal corresponding to the inclination information of the delay distortion of the IF signal detected is detected based on the correlation between the error voltage ±E of the signal Q and the direction of movement of the signal I identified by the up/down identification section 141 and is outputted as a control signal for the first-order inclination delay compensation section 11A from the decoder 142-2.

The control signal is integrated by the integrator 143 and outputted to the first-order inclination delay compensation section 11A.

It is to be noted that, although the error voltage ±E described above can otherwise be detected only from part (an error bit) of data of the digital demodulated signal Q before equalized by the transversal equalizer 16 as will be hereinabove described, in this instance, if an error such as a bit error is produced in the digital demodulated signal Q before equalization, then no accurate data of the error voltage ±E may possibly be obtained.

Therefore, in the present embodiment, data of the digital signal $Q_{TRE}$ after equalization by the transversal equalizer 16 is subtracted from data of the digital signal Q before equalization as described above so that data of the error voltage ±E can be detected with a higher degree of accuracy.

Figure 21:
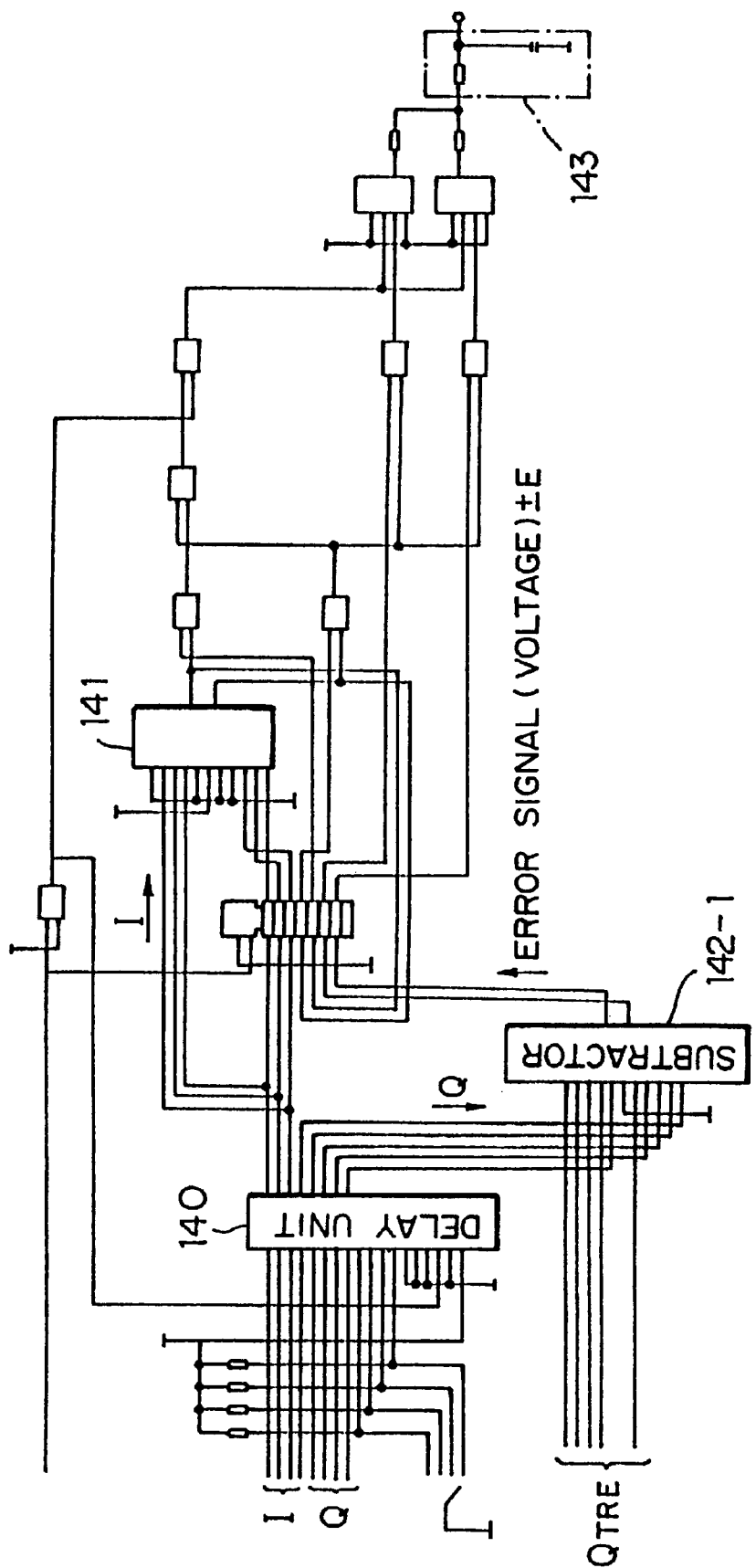
FIG. 21 is a circuit diagram of an example of a construction of a control section of the automatic delay equalizer of FIG. 5 where the control section is formed from practically used circuits.

FIG. 21 shows an example of the control section 14A described above where it is constructed from practically used circuits, and an outline of operation of the circuit shown is described below. Referring to FIG. 21, the digital I channel signal I is first outputted through a delay unit 140 to the up/down identification section 141, by which the direction in which the digital I channel signal I moves is discriminated. Meanwhile, the digital Q channel signal Q is delayed by the delay unit 140 so that the input timing thereof to the subtractor 142-1 may be the same as that of the equalized signal $Q_{TRE}$ after equalized by the transversal equalizer 16.

Thereafter, the difference between the data of the signal Q and the equalized signal $Q_{TRE}$ is calculated by the subtractor 142 to detect an error voltage ±E of the signal Q. Then, a correlation between the error voltage E of the signal Q and the direction of movement of the digital signal I obtained by the up/down identification section 141 is detected, and a resulting signal, that is, a control signal for the first-order inclination delay compensation section 11A, is outputted to the first-order inclination delay compensation section 11A through the integrator 143.

Figure 22:
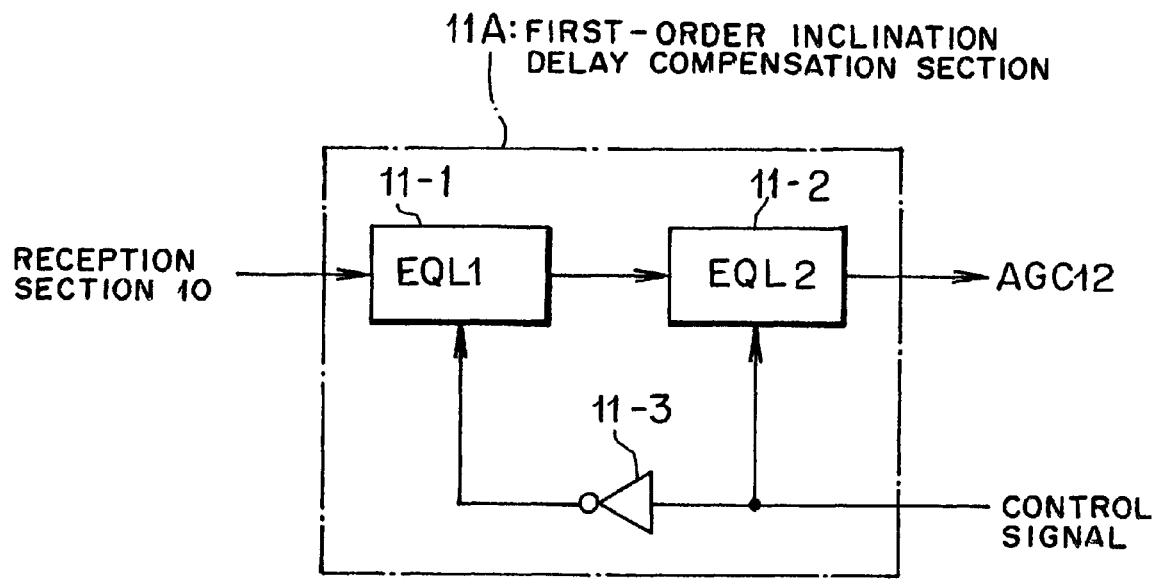
FIG. 22 is a block diagram showing an example of a construction of a first-order inclination delay compensation section of the automatic delay equalizer of FIG. 5.
Figure 23:
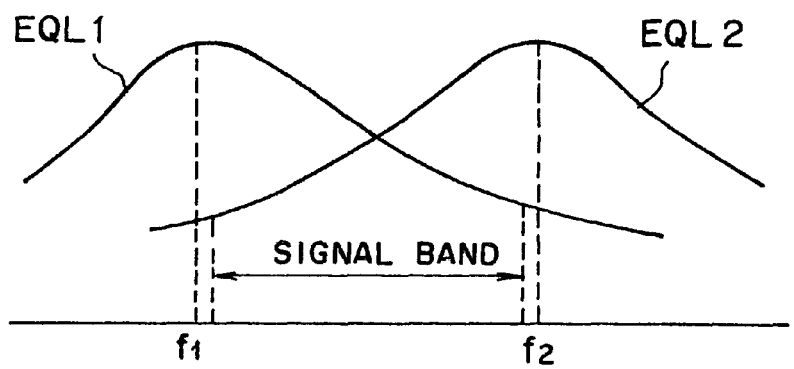
FIGS. 23 and 24 are diagrams illustrating a delay characteristic of the first-order inclination delay compensation section of the automatic delay equalizer of FIG. 5.

Subsequently, the first-order inclination delay compensation section 11A shown in FIG. 5 is described in detail. FIG. 22 shows an example of a construction of the first-order inclination delay compensation section 11A. Referring to FIG. 22, the first-order inclination delay compensation section 11A in the present embodiment shown includes a pair of equalizers (EQL1 and EQL2) 11-1 and 11-2 connected in cascade connection and individually having such convex frequency pass (resonance) characteristics different from each other as illustrated in FIG. 23, and an inversion gate 11-3 for inverting a control signal (control voltage) supplied from the control section 14A and supplying the inverted control signal to the equalizer 11-1.

Figure 24:
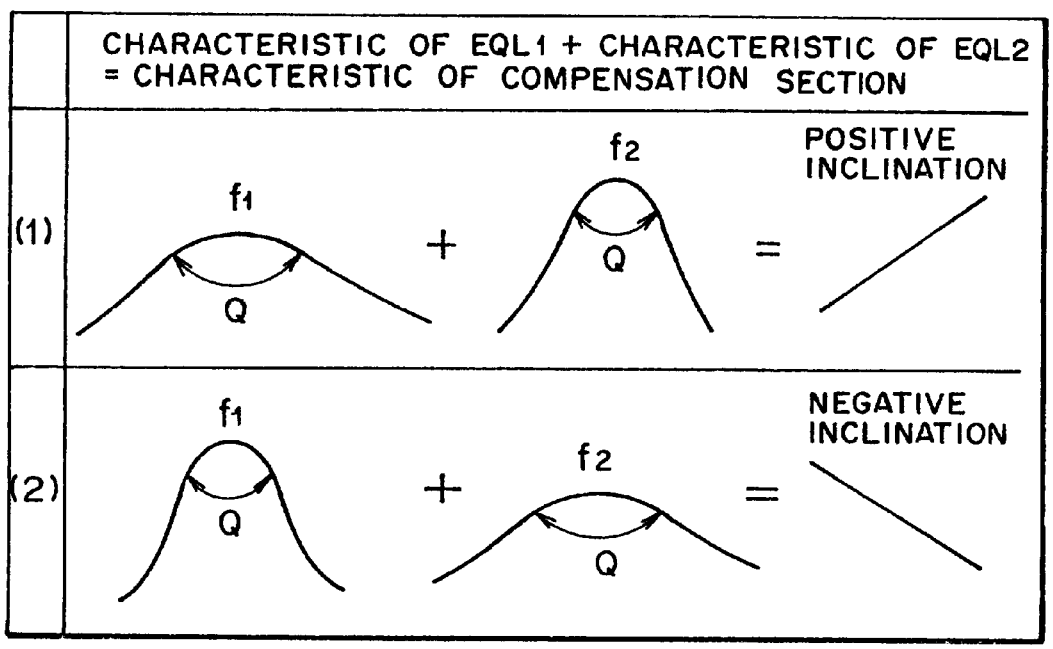

The first-order inclination delay compensation section 11A has a delay characteristic which is a composite of the resonance characteristics of the equalizers 11-1 and 11-2. Here, the sharpness degrees Q of the resonance characteristics of the equalizers 11-1 and 11-2 are varied, for example, as schematically illustrated in FIG. 24, in response to the control signal described above so that an arbitrary inclination (positive inclination or negative inclination) delay characteristic of the first-order inclination delay compensation section 11A may be produced on the signal band.

Figure 25:
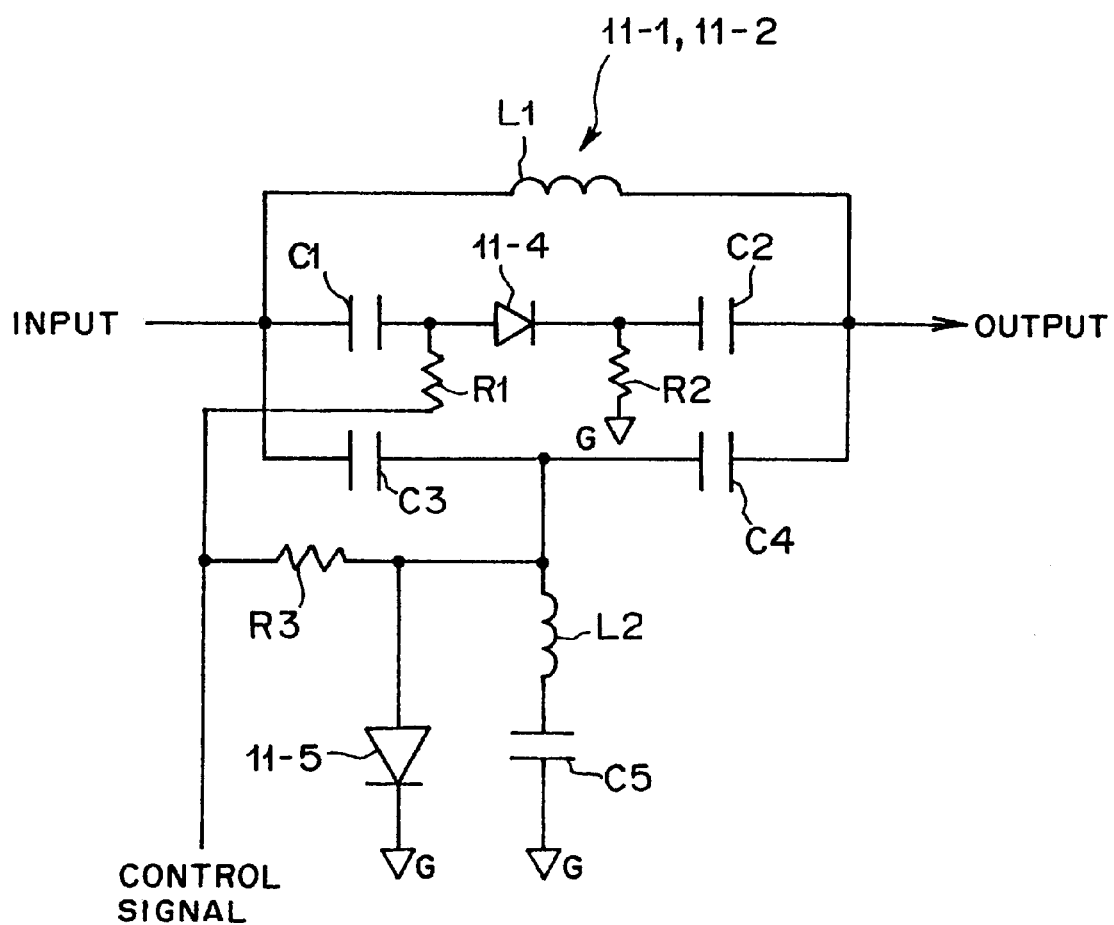
FIG. 25 is a circuit diagram showing an example of a detailed construction of an equalizer of the first-order inclination delay compensation section of the automatic delay equalizer of FIG. 5.

To this end, each of the equalizers 11-1 and 11-2 is formed as an LCR circuit which includes, for example, as shown in FIG. 25, coils L1 and L2, capacitors C1 to C5 and resistors R1 to R3. Here, the resistance values of PIN diodes 11-4 and 11-5 of the variable resistance type vary in response to the control signal from the control section 14A to vary the sharpness degree Q mentioned above.

In the first-order inclination delay compensation section 11A having the construction described above, as the sharpness degrees Q of the equalizers 11-1 and 11-2 vary in response to the control signal (inclination detection signal) from the control section 14A, a reverse characteristic resonance (delay) characteristic which can cancel an inclination delay distortion detected in such a manner as described above by the control section 14A, and the delay distortion (delay characteristic) of the input signal is equalized and compensated for with the inverse characteristic resonance (delay) characteristic. However, if the inclination is zero, then since the resonance characteristics of the sharpness degrees Q which are equal to each other between the equalizers 11-1 and 11-2 are composed, the resonance characteristic of the compensation section 11A becomes flat and no equalization of the input signal is performed by the compensation section 11A.

In short, the automatic delay equalizer (automatic delay equalization method) of the present embodiment described above has a detection step by the control section 14A of detecting inclination information (a positive inclination or a negative inclination) of the delay characteristic (delay distortion) of an input signal, and a compensation step by the first-order inclination delay compensation section 11A of compensating for the delay characteristic of the input signal based on the inclination information of the delay characteristic of the input signal detected by the detection step.

Accordingly, with the automatic delay equalizer (automatic delay equalization method) of the present embodiment, since a delay distortion amount which fluctuates in the actual transmission line 32 (refer to FIG. 9) can be detected on the real time basis and the delay distortion can be automatically equalized and compensated for, the input signal can always be demodulated with a high degree of accuracy irrespective of the state (delay characteristic) of the transmission line 32, and the accuracy in signal demodulation can be improved remarkably.

Further, since, in the embodiment described above, the direction in which the digital demodulated signal I moves is discriminated by the up/down identification section 141 while the error voltage ±E of the digital demodulated signal Q is detected by the rotation direction identification section 142 and then inclination information of the delay distortion of the input signal is detected based on the correlation between the direction of movement of the signal I and the error voltage ±E of the signal Q and a detection signal of the inclination information is outputted as a control signal for the first-order inclination delay compensation section 11A, the delay distortion detection system (control section 14A) can be implemented as a digital circuit. Accordingly, the circuit scale and the cost of the present automatic delay equalizer can be reduced significantly and also the compensation capacity is improved significantly.

Further, since the automatic delay equalizer of the present embodiment described above includes the equalizers 11-1 and 11-2 (connected in cascade connection) having different (variable) resonance characteristics so that an arbitrary inclination characteristic may be produced and the delay characteristic of the input signal is compensated for in accordance with the inclination delay characteristic, the compensation section 11A can be implemented with a simple construction. Consequently, the compensation section 11A contributes very much to further reduction in size of the automatic delay equalizer.

Further, in the up/down identification section 141 in the present embodiment, the signal I is sampled in the data clock period T by the registers 141-1 and 141-2 (refer to FIG. 19), and the data $I_{B0}$, $I_{B1}$ and $I_{B2}$ obtained by the sampling are compared with each other by the comparators 141-3 and 141-4 to discriminate the direction in which the signal I moves. Consequently, the circuitry of the up/down identification section 141 can be implemented readily as digital circuitry. Accordingly, the circuit scale and the cost can be reduced remarkably, and the direction in which the digital demodulated signal I moves can be discriminated with a higher degree of accuracy.

Further, since the up/down identification section 141 can discriminate the direction of movement of the signal I also by sampling the digital demodulated signal I in a period T/N which is equal to 1/N the data clock period T, by whichever modulation method (for example, QPSK) a signal from which the digital demodulated signal I is originated is modulated, the direction in which the digital demodulated signal I moves can be discriminated. Consequently, the automatic delay equalizer is improved very much in universal applicability.

Further, with the automatic delay equalizer of the present embodiment, since the delay distortion of the IF signal is compensated for at the stage (in the IF band) preceding to the demodulator 13 by providing the first-order inclination delay compensation section 11A at the preceding stage to the demodulator 13, the first-order inclination delay distortion compensation section 1A can be implemented with a simpler construction than that where such compensation is performed after demodulation of the input signal at the stage (in the base band) following the demodulator 13. Consequently, the construction just described contributes very much to further reduction in size of the present automatic delay equalizer.

It is to be noted that, while, in the present embodiment described above, the direction of movement of a signal is discriminated from the digital demodulated signal I and an error voltage (error information) ±E is detected from the digital demodulated signal Q, even if the direction of movement of a signal is discriminated from the digital demodulated signal Q and an error voltage ±E is detected from the digital demodulated signal I conversely to that described above, the delay distortion of the input signal can be detected similarly.

B-1'. Modification to First Embodiment of Automatic Delay Equalizer

Figure 26:
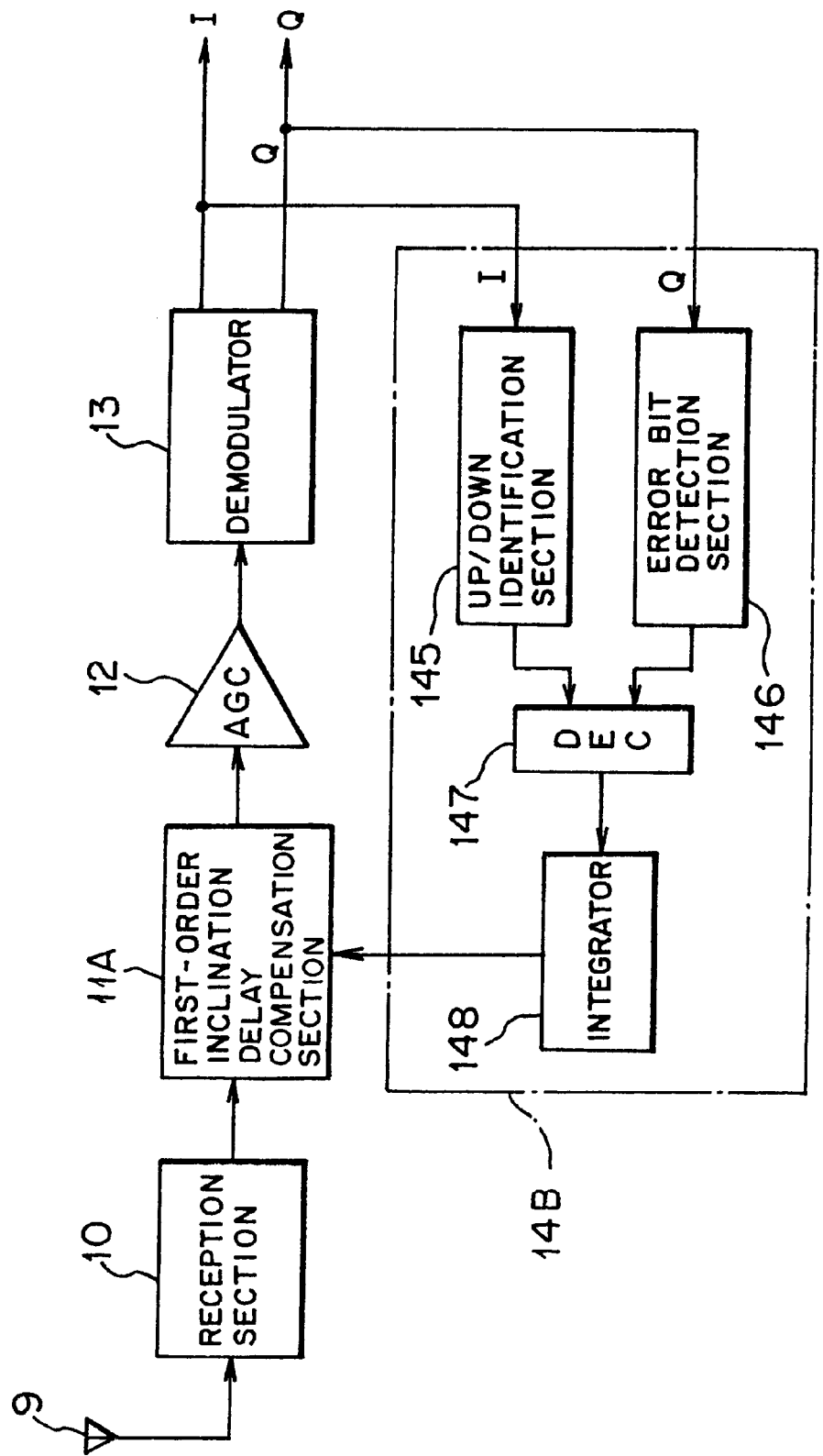
FIG. 26 is a block diagram showing a modification to the automatic delay equalizer of FIG. 5.

FIG. 26 shows in block diagram a modification to the automatic delay equalizer of the first embodiment described hereinabove. Referring to FIG. 26, also the modified automatic delay equalizer shown includes an antenna 9, a reception section 10, a first-order inclination delay compensation section 11A, an automatic gain control section (AGC) 12 and a demodulator 13 which are all similar to those of the automatic delay equalizer described hereinabove with reference to FIG. 5. The automatic delay equalizer further includes a control section 14B.

The control section 14B detects a delay distortion of an input signal only from digital demodulation signals I and Q obtained from the demodulator 13 [in the first embodiment, a delay distortion of an input signal is detected from digital demodulated signals I and Q and an equalized signal $Q_{TRE}$ ($I_{TRE}$)] to produce and output a control signal for the first-order inclination delay compensation section 11A. The control section 14B includes, as shown in FIG. 26, an up/down identification section 145, an error bit detection section 146, a decoder (DEC) 147 and an integrator 148.

The up/down identification section 145 is similar to the up/down identification section 141 (refer to FIG. 19) of the automatic delay equalizer of the first embodiment, and samples one of the digital signals I and Q obtained by the demodulator 13, that is, the signal I, in a data clock period T and compares such sample data of the digital signal I with each other to discriminate the direction in which the signal I moves. The error bit detection section (error information detection section) 146 detects an error voltage (error information) ±E of the signal Q, which is an orthogonal interference component with the signal I, only from part (an error bit) of data of the digital demodulated signal Q.

The decoder 147 produces a control signal for controlling the inclination delay characteristic of the first-order inclination delay compensation section 11A based on the correlation between a result of discrimination obtained by the up/down identification section 145 and error information ±E obtained by the error bit detection section 146. The integrator 148 integrates the control signal obtained by the decoder 147 to average the control signal to remove noise components included in the control signal and outputs a resulting signal to the first-order inclination delay compensation section 11A.

Also in this instance, the up/down identification section 145 may otherwise sample, similarly as in the first embodiment, the digital demodulated signal I in a period T/N (N is an integer equal to or greater than 2) equal to 1/N the data clock period to discriminate the direction in which the digital demodulated signal I moves.

In the control section 14B constructed in such a manner as described above, the direction in which the digital demodulated signal I moves is discriminated by the up/down identification section 145, and error information ±E is detected only from part (an error bit) of data of the digital demodulated signal Q by the error bit detection section 146. Then, from the correlation between the direction in which the signal I moves and the error information ±E of the signal Q, characteristic information (a positive inclination or a negative inclination) of the delay distortion of the input signal is detected.

In short, in the automatic delay equalizer of the present modification, the error information ±E of the digital demodulated signal Q is detected not by calculating a difference between the digital signal Q obtained by the demodulator 13 and the equalized signal $Q_{TRE}$ obtained by equalization of the digital signal Q by means of the transversal equalizer 16 as described hereinabove in connection with the first embodiment, but only from part (an error bit) of data of the digital demodulated signal Q obtained by the demodulator 13.

Then, the detection signal is converted into a signal corresponding to the inclination information of the delay distortion by the decoder 147 to produce a control signal for the first-order inclination delay compensation section 11A, and the control signal is outputted to the first-order inclination delay compensation section 11A through the integrator 148. Consequently, in the first-order inclination delay compensation section 11A, the characteristics (sharpness degrees Q) of the equalizers 11-1 and 11-2 are varied in response to the control signal so that the first-order inclination delay compensation section 11A has an inclination delay characteristic having an inclination of the opposite characteristic to that of the inclination of the delay distortion as described hereinabove with reference to FIGS. 22 to 25. Consequently, the delay distortion of the input signal is equalized and compensated for by the first-order inclination delay compensation section 11A.

As described above, the automatic delay equalizer of the modification to the first embodiment is advantageous in that, since the error information ±E of the digital signal Q can be detected only from part (an error bit) of data of the digital demodulated signal Q by the error bit detection section 146, similar advantages to those achieved by the automatic delay equalizer described hereinabove in connection with the first embodiment can be achieved, and besides, the circuit scale and the cost can be further reduced.

It is to be noted that, while, also in the present modification, the direction in which a signal moves is discriminated from the digital demodulated signal I while the error information ±E is detected from the digital demodulated signal Q, alternatively the direction in which a signal moves may be discriminated from the digital demodulated signal Q while the error information ±E is detected from the digital demodulated signal I conversely to that described above.

B-2. Second Embodiment of Automatic Delay Equalizer

Figure 27:
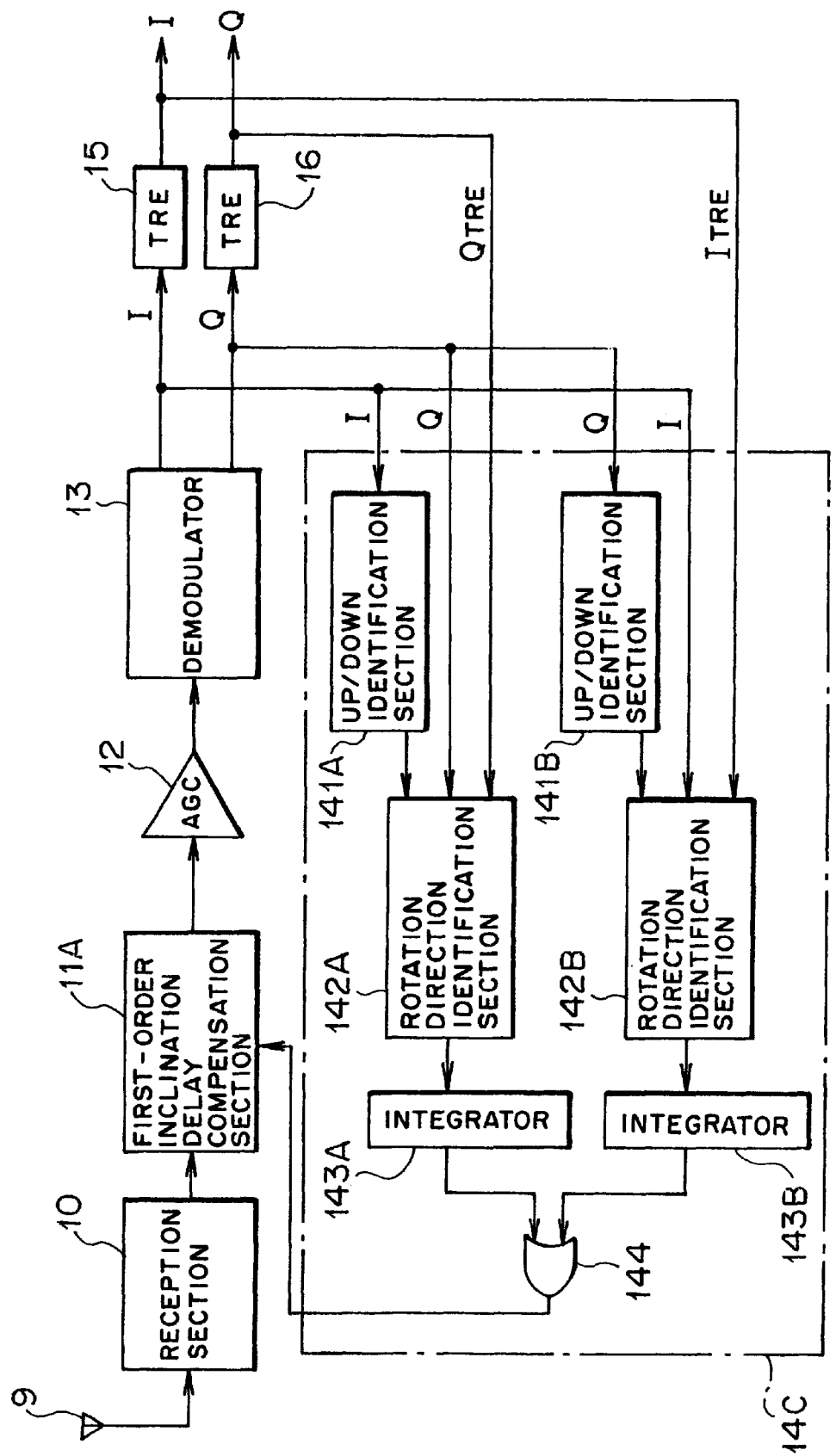
FIG. 27 is a block diagram showing a second embodiment of an automatic delay equalizer according to the present invention.

FIG. 27 shows in block diagram a second embodiment of an automatic delay equalizer according to the present invention. Referring to FIG. 27, also the automatic delay equalizer shown includes an antenna 9, a reception section 10, a first-order inclination delay compensation section 11A, an automatic gain control section (AGC) 12, a demodulator 13, and a pair of transversal equalizers and 16 all similar to those described hereinabove with reference to FIG. 5. The automatic delay equalizer further includes a control section 14C. Also in the present automatic delay equalizer, the first-order inclination delay compensation section 11A is provided at the preceding stage to the demodulator 13.

Similarly to the control section 14A described hereinabove in connection with the first embodiment, the control section 14C detects a characteristic (inclination information) of a delay distortion of an IF signal (input signal) obtained from the demodulator 13 from digital demodulated signals I and Q of the IF signal and equalized signals $I_{TRE}$ and $Q_{TRE}$ obtained by processing the digital demodulated signals I and Q by means of the transversal equalizers 15 and 16, respectively, and outputs a control signal for the first-order inclination delay compensation section 11A. In this instance, the control section 14C detects the direction of movement of the signal and the error voltage (error information) ±E from each of the digital demodulated signals I and Q.

In particular, the control section 14C discriminates the direction in which one of the digital demodulated signals I and Q, that is, the signal I, moves (the direction of variation of the value of the signal I) detects error information ±E from the other digital demodulated signal Q orthogonal to the signal I, and obtains a detection signal (first correlation signal) corresponding to an inclination of the delay distortion of the input signal based on the correlation between the error information ±E and the direction of movement of the signal I. Further, the control section 14C discriminates the direction in which the other signal Q moves, detects error information ±E from the signal I orthogonal to the signal Q, and obtains a detection signal (second correlation signal) corresponding to an inclination of the delay distortion similarly based on the correlation between the error information ±E and the direction of movement of the signal Q. Then, the control section 14C produces and outputs a control signal for the first-order inclination delay compensation section 11A from the two detection signals.

To this end, the control section 14C includes, as shown in FIG. 27, a pair of up/down identification sections 141A and 141B, a pair of rotation direction identification sections 142A and 142B and a pair of integrators 143A and 143B which are similar to the up/down identification section 141, the rotation direction identification section 142 and the integrator 143 shown in FIG. 19, respectively, and further includes an OR gate (logical OR element) 144.

The up/down identification section (first signal direction discrimination section) 141A discriminates the direction in which one of the digital demodulated signals I and Q obtained by the demodulator 13, that is, the signal I, moves. The rotation direction identification section 142A detects, from the other signal Q of the digital demodulated signals I and Q which is orthogonal to the signal I, error information ±E which makes an orthogonal interference component with the signal I, and outputs a first correlation signal based on the correlation between the error information ±E of the signal Q and the direction of movement of the signal I obtained by the up/down identification section 141A. The integrator 143A integrates the first correlation signal obtained by the rotation direction identification section 142A.

In contrast, the up/down identification section (second signal direction discrimination section) 141B discriminates the direction in which the other one of the digital demodulated signals I and Q obtained by the demodulator 13, that is, the signal Q, moves. The rotation direction identification section 142B detects, from the signal I of the digital demodulated signals I and Q, error information ±E which makes an orthogonal interference component with the signal Q, and outputs a second correlation signal based on the correlation between the error information ±E of the signal I and the direction of movement of the signal Q obtained by the up/down identification section 141B. The integrator 143B integrates the second correlation signal obtained by the rotation direction identification section 142B.

The OR gate (control signal production section) 144 logically ORs the outputs of the integrators 143A and 143B to produce and output a control signal for the first-order inclination delay compensation section 11A.

It is to be noted that the rotation direction identification sections 142A and 142B are individually similar to the rotation direction identification section 142 shown in FIG. 5 and are each constructed, as shown in FIG. 20, including a pair of subtractors (SUB) 142A-1 and 142B-1 and a pair of decoders (DEC) 142A-2 and 142B-2.

Also with the automatic delay equalizer shown in FIG. 27 having the construction described above, the inclination delay characteristic of the first-order inclination delay compensation section 11A is controlled in accordance with a control signal from the control section 14C to equalize and compensate for the delay distortion of the IF signal. This operation will be described in detail below.

First, in the control section 14C, similarly as in the control section 14A shown in FIG. 5, the direction in which the signal I of the digital demodulated signals I and Q moves is discriminated by the up/down identification section 141A by sampling the signal I in a data clock period T, and error information ±E which makes an orthogonal interference component with the signal I is detected by the rotation direction identification section 142A from the other signal Q of the digital demodulated signals I and Q which is orthogonal to the signal I.

In particular, in the rotation direction identification section 142A, the difference between the digital demodulated signal Q and the equalized signal $Q_{TRE}$ obtained by equalization of the digital demodulated signal Q by means of the transversal equalizer 16 is calculated by the subtractor 142A-1 to detect error information ±E of the digital demodulated signal Q.

Then, based on the correlation between the error information ±E of the signal Q and the direction of movement of the signal I, inclination information of the delay distortion of the input signal is detected, and a first correlation signal is outputted from the decoder 142A-2 based on the thus detected inclination information.

Meanwhile, in this instance, in the signal direction discrimination section 141B, the other digital demodulated signal Q of the digital demodulated signals I and Q is sampled in the data clock period T to discriminate the direction in which the signal Q moves, and error information ±E which makes an orthogonal interference component with the signal Q is detected by the rotation direction identification section 142B from the digital demodulated signal I orthogonal to the digital demodulated signal Q.

In particular, in the rotation direction identification section 142B, the difference between the digital demodulated signal I and the equalized signal $Q_{TRE}$ obtained by equalization of the digital demodulated signal I by means of the transversal equalizer 15 is calculated by the subtractor 142B-1 to detect error information ±E of the digital demodulated signal I.

Then, based on the correlation between the error information ±E of the signal I and the direction of movement of the signal Q, inclination information of the delay distortion of the input signal is detected, and a second correlation signal is outputted from the decoder 142B-2 based on the thus detected inclination information of the delay distortion.

Thereafter, the correlation signals obtained in such a manner as described above are integrated by the integrators 143A and 143B, respectively, and then logically ORed by the OR gate 144 to obtain a control signal for the first-order inclination delay compensation section 11A which corresponds to the inclination information of the delay distortion of the input signal. The control signal for the first-order inclination delay compensation section 11A thus obtained is outputted to the first-order inclination delay compensation section 11A.

Consequently, by the first-order inclination delay compensation section 11A, the delay distortion of the IF signal is compensated for in accordance with the control signal at the preceding stage to the demodulator 13 in a similar manner as in the first embodiment.

In this manner, in the automatic delay equalizer of the second-embodiment of the present invention, since the characteristic (inclination information) of the delay distortion of the IF signal is detected not only based on the correlation between the direction in which the signal I moves and the error information ±E of the signal Q but also based on the correlation between the direction in which the signal Q moves and the error information ±E of the signal I, the sensitivity and the accuracy in detection of a control signal for the first-order inclination delay compensation section 11A can be improved very much. Consequently, similar effects or advantages to those of the automatic delay equalizer of the first embodiment can be achieved. Besides, the performance of the automatic delay equalizer exhibits a great degree of improvement.

It is to be noted that, also in the automatic delay equalizer of the present embodiment, similarly as in the delay amplitude equalizer of the first embodiment, the digital demodulated signal I may alternatively be sampled by the up/down identification section 141A in a period T/N (N is an integer equal to or greater than 2) which is equal to 1/N the data clock period T while the digital demodulated signal Q is sampled by the up/down identification section 141B in the period T/N which is equal to 1/N the data clock period T to discriminate the directions of movement of the digital demodulates signals I and Q, respectively.

B-2'. Modification to Second Embodiment of Automatic Delay Equalizer

Figure 28:
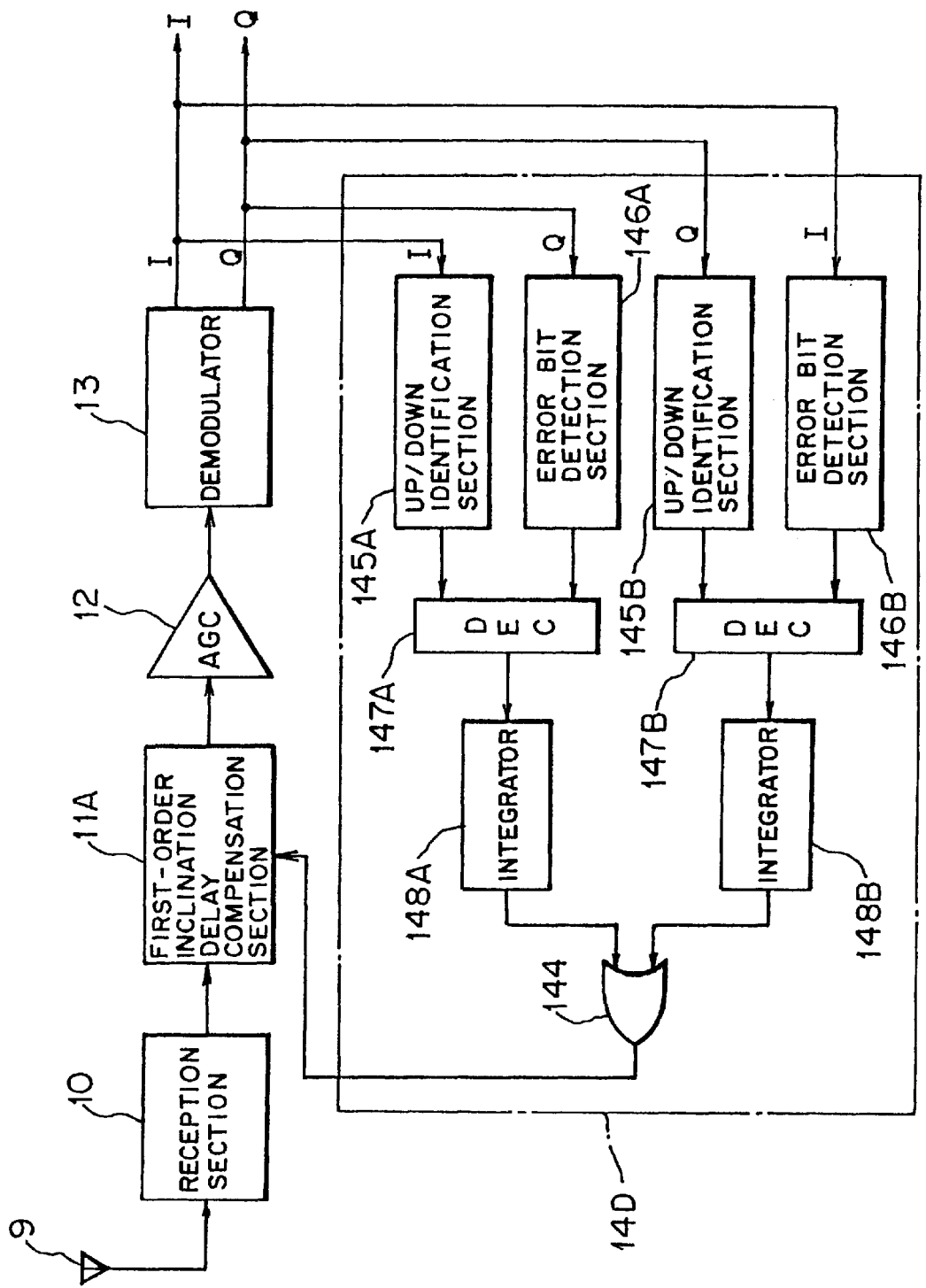
FIG. 28 is a block diagram showing a modification to the automatic delay equalizer of FIG. 27.

FIG. 28 shows in block diagram a modification to the second embodiment of the automatic delay equalizer described above. Referring to FIG. 28, also the modified automatic delay equalizer shown includes an antenna 9, a reception section 10, a first-order inclination delay compensation section 11A, an automatic gain control section (AGC) 12 and a demodulator 13 which are all similar to those of the automatic delay equalizer described hereinabove with reference to FIG. 5. The automatic delay equalizer further includes a control section 14D.

The control section 14D includes an OR gate 144, a pair of up/down identification sections 145A and 145B, a pair of error bit detection sections 146A and 146B, a pair of decoders (DEC) 147A and 147B, and a pair of integrators 148A and 148B.

Roughly speaking, the control section 14D is a modification to the control section 14C (refer to FIG. 27) described above in that the rotation direction identification section 142A of the control section 14C is formed from the error bit detection section (first error information detection section) 146A and the decoder (first correlation calculation section) 147A, and the rotation direction identification section 142B is formed from the error bit detection section (second error information detection section) 146B and the decoder (second correlation calculation section) 147B.

Accordingly, also in this instance, a digital demodulated signal I obtained by the demodulator 13 is sampled in a data clock period T by the up/down identification section 145A and sample data obtained by such sampling are compared with each other by the up/down identification section 145A to discriminate the direction in which the signal I moves, and error information ±E of a digital demodulated signal Q is detected from only part (an error bit) of data of the digital demodulated signal Q by the error bit detection section 146A.

Then, based on the correlation between the direction of movement of the signal I and the error information ±E of the signal Q obtained in this manner, a signal corresponding to a characteristic (inclination information) of the delay distortion of the input signal is outputted as a first correlation signal from the decoder 147A.

Further, in this instance, the digital demodulated signal Q obtained by the demodulator 13 is sampled in the data clock period T and sample data obtained by such sampling are compared with each other by the up/down identification section 145B to discriminate the direction in which the signal Q moves. Meanwhile, error information ±E of the digital demodulated signal I is detected from only part (an error bit) of data of the signal I by the error bit identification section 146B.

Then, based on the correlation between the direction of movement of the digital signal Q and the error information ±E of the digital signal I obtained in this manner, a signal corresponding to a characteristic (inclination information) of the delay distortion of the input signal is outputted as a second correlation signal from the decoder 147B.

Thereafter, the correlation signals outputted from the decoders 147A and 147B are integrated by the integrators 148A and 148B, respectively, and are logically ORed by the OR gate 144. Consequently, if a delay distortion is detected from at least one of the digital demodulated signals I and Q, then a control signal for the first-order inclination delay compensation section 11A is outputted to the first-order inclination delay compensation section 11A.

Thereafter, the delay distortion of the input signal is compensated for by the first-order inclination delay compensation section 11A at the preceding stage to the demodulator 13 as described hereinabove in connection with the first embodiment.

As described above, with the automatic delay equalizer of the modification to the second embodiment, since the error information ±E of the digital signal Q (or I) can be detected only from part (an error bit) of data of the digital signal Q (or I), similar effects or advantages to those of the automatic delay equalizer described hereinabove in connection with the second embodiment can be achieved. The automatic delay equalizer of the modification is advantageous also in that the circuit scale and the cost can be further reduced.

It is to be noted that, also in the present modification, the up/down identification section 141A may otherwise sample the digital demodulated signal I in a period T/N (N is an integer equal to or greater than 2) equal to 1/N the data clock period while the up/down identification section 141B samples the digital demodulated signal Q in the period T/N equal to 1/N the data clock period.

B-3. First Embodiment of Automatic Delay and Amplitude Equalizer

Figure 29:
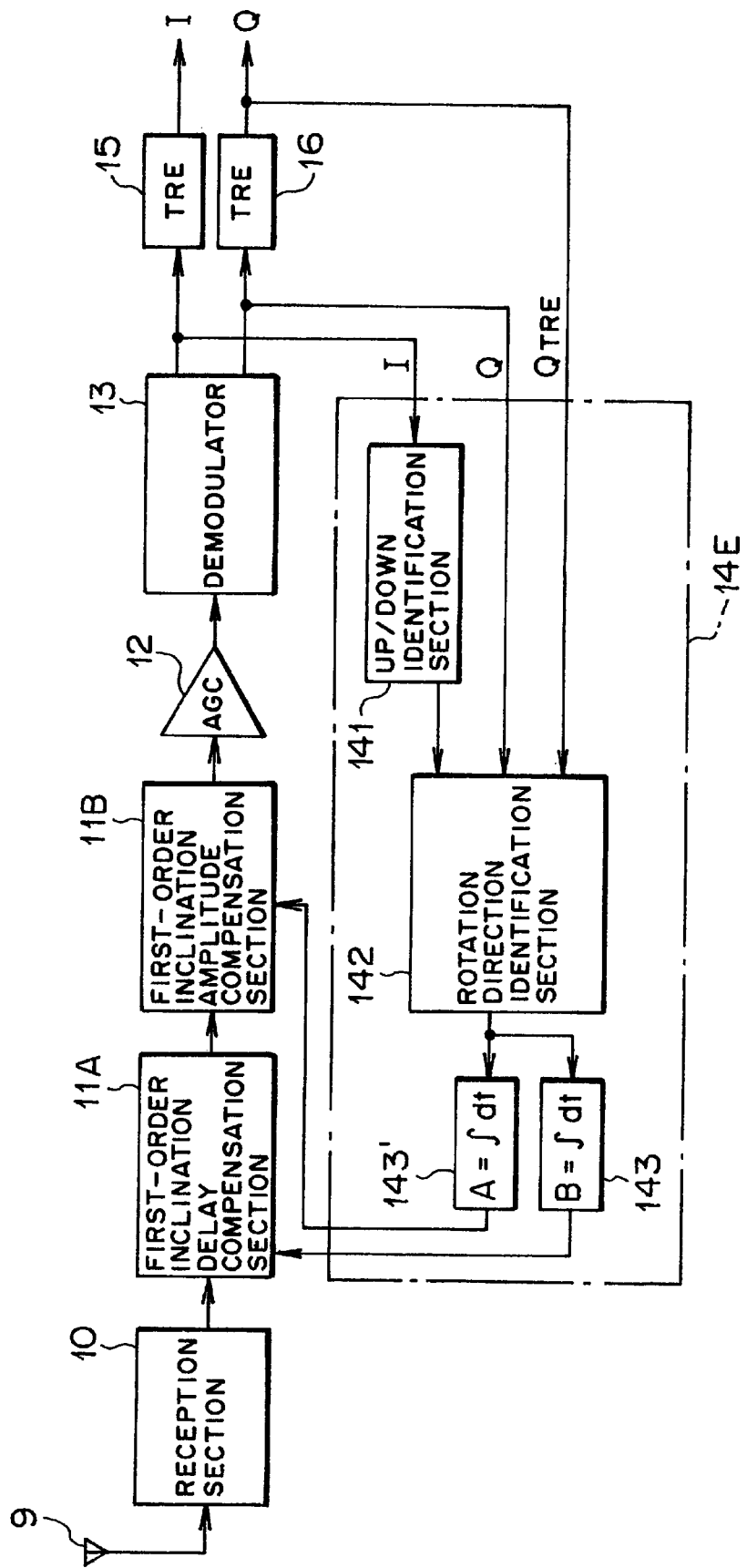
FIG. 29 is a block diagram showing a first embodiment of an automatic delay and amplitude equalizer according to the present invention.

FIG. 29 shows in block diagram a first embodiment of an automatic delay and amplitude equalizer of the present invention. Referring to FIG. 29, the automatic delay and amplitude equalizer shown includes an antenna 9, a reception section 10, a first-order inclination delay compensation section 11A, an automatic gain control section (AGC) 12, a demodulator 13, and a pair of transversal equalizers 15 and 16 all similar to those described hereinabove with reference to FIG. 5. The automatic delay and amplitude equalizer further includes a first-order inclination amplitude compensation section 11B provided at the stage following the first-order inclination delay compensation section 11A, and a control section 14E.

Figure 30:
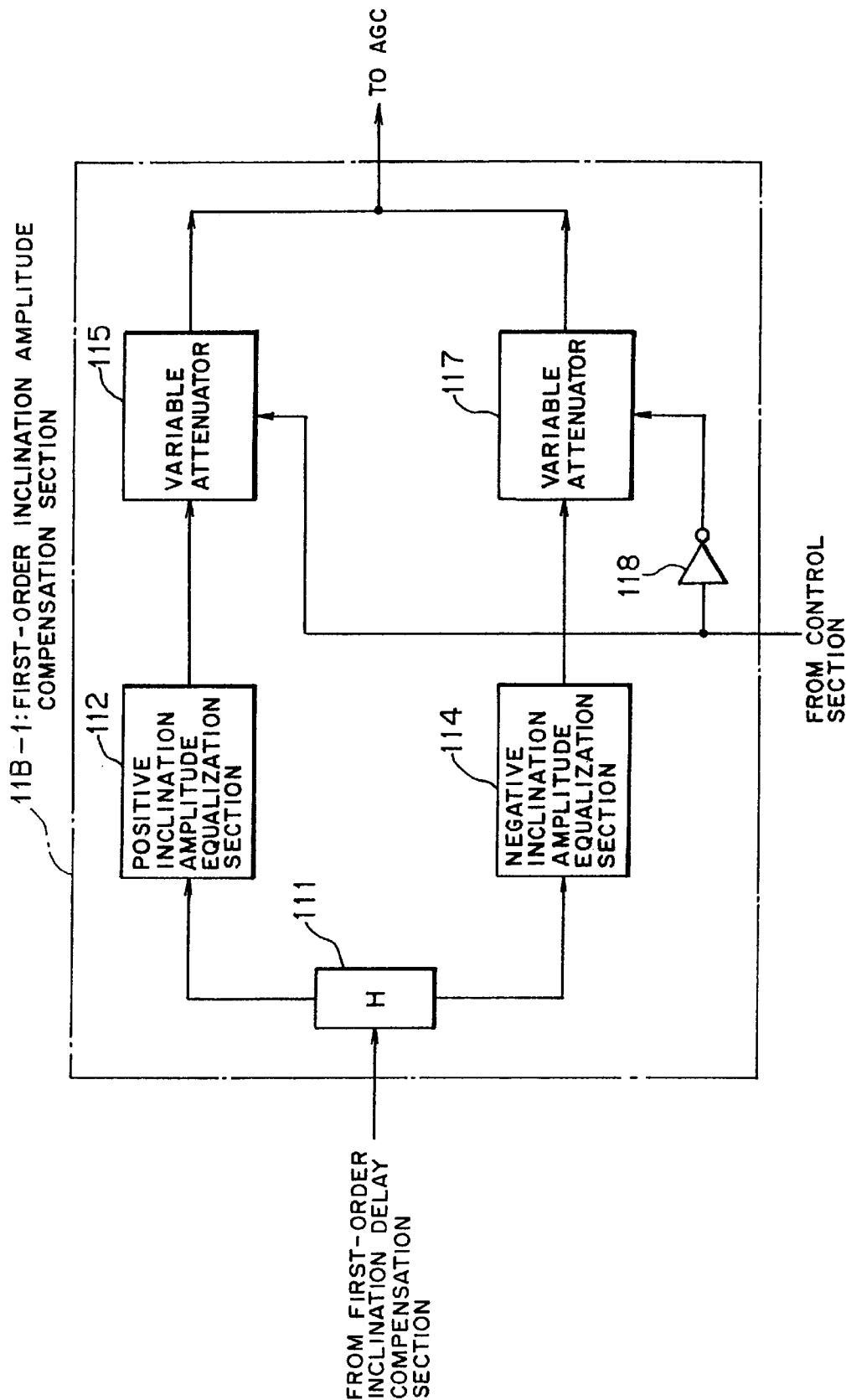
FIG. 30 is a block diagram showing an example of a construction of a first-order inclination amplitude compensation section of the automatic delay and amplitude equalizer of FIG. 29.

The first-order inclination amplitude compensation section (inclination amplitude equalization section) 11B has a first-order inclination amplitude characteristic in the frequency-domain and compensates for the amplitude characteristic (amplitude distortion of a first-order inclination type which will be hereinafter described) of an IF signal (input signal) in accordance with the first-order inclination amplitude characteristic. In the present embodiment, the first-order inclination amplitude compensation section 11B includes, for example, as shown in FIG. 30, a hybrid circuit (H) 111, a positive inclination amplitude equalization section 112, a negative inclination amplitude equalization section 114, a pair of variable attenuators 115 and 117, and an inversion gate 118.

The first-order inclination amplitude compensation section 11B can produce an amplitude characteristic of an arbitrary inclination by varying the composition ratio of the amplitude characteristic of a positive inclination of the positive inclination amplitude equalization section 112 and the amplitude characteristic of a negative inclination of the negative inclination amplitude equalization section 114 in accordance with a control signal from the control section 14D by means of the variable attenuators 115 and 117. Due to the amplitude characteristic thus produced, the first-order inclination amplitude compensation section 11B can cancel the amplitude distortion of any inclination of the input signal by compensation.

The control section 14E detects a delay distortion described hereinabove and an amplitude distortion, which will be hereinafter described, as first-order inclination distortions of an IF signal from digital demodulated signals I and Q of the IF signal obtained by the demodulator 13 and outputs the detected information as a control signal for controlling the inclination delay characteristic of the first-order inclination delay compensation section 11A and another signal for controlling the first-order inclination amplitude characteristic of the first-order inclination amplitude compensation section 11B.

In the following, the principle of detecting an amplitude distortion of an IF signal described above is described in detail with reference to FIGS. 9 and 31 to 33.

First, where a transmission signal is represented as $\cos \omega_B t$ as described hereinabove with reference to FIG. 9, if the amplitudes of two frequency components ($\omega_C+\omega_B$) and ($\omega_C-\omega_B$) included in the modulated signal $A(\omega)$ when the transmission signal $\cos \omega_B t$ is modulated by the modulation section 31 [refer to expression (2) given hereinabove] are represented as $P(\omega_C+\omega_B)$ and $P(\omega_{C-\omega B})$, respectively, and the amplitude ratio between them is represented by $\gamma$, then $\gamma$ is given as:

$$\gamma = P(\omega_C+\omega_B)/P(\omega_C-\omega_B) \tag{7}$$

Figures 32A, 32B:
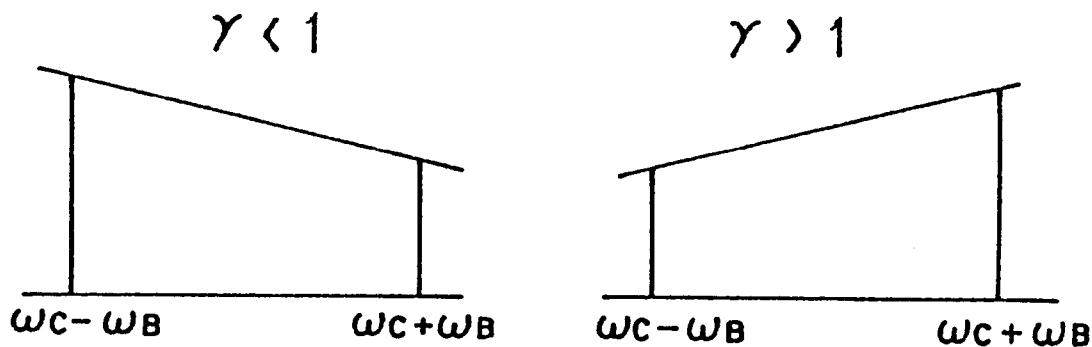
FIGS. 32A, 32B and 33 are diagrams illustrating a principle of detection of an amplitude distortion by the automatic delay and amplitude equalizer of FIG. 29.

Here, the amplitude ratio $\gamma$ signifies, when $\gamma<1$, a negative inclination distortion (rightwardly downwardly inclined slope) as seen in FIG. 32A, but signifies, when $\gamma>1$, a positive inclination distortion (rightwardly upwardly inclined slope) as seen in FIG. 32B. It is to be noted that $\gamma=1$ (not shown) signifies a zero inclination distortion (no distortion).

Using the amplitude ratio $\gamma$, a modulated signal $B(\omega)'$ which has undergone an inclination distortion by a first-order inclination distortion (amplitude distortion) transmission line 32' (refer to FIG. 9) is represented as the following expression (8):

$$B(\omega)'=[\exp[j(\omega_C-\omega_B)t]+\gamma \exp[j(\omega_C-\omega_B)t]]/2=[\exp(j\omega_C t)\times((\exp(j\omega_B t)+\gamma \exp(-j\omega_B t))]/2 \tag{8}$$

Then, if the modulated signal $B(\omega)'$ is demodulated by the demodulation section 33, then the demodulated signal $C(\omega)'$ from the demodulation section 33 is given as the following expression (9):

$$C(\omega)'=[\exp(j\omega_B t)+\gamma \exp(-j\omega_B t)]/2=(\cos \omega_B t+j \sin \omega_B t-\cos \omega_B t-j\gamma \sin \omega_B t)/2=[(1+\gamma)\cos \omega_B t+j(1-\gamma)\sin \omega_B t]/2 \tag{9}$$

In this instance, since actually the modulated signal $B(\omega)'$ has been orthogonally detected by the demodulation section 33, the following orthogonal demodulated outputs (demodulated signals) I and Q are obtained:

$$I=[(1+\gamma)\cos \omega_B t]/2 \tag{10}$$

$$Q=[(1-\gamma)\cos \omega_B t]/2 \tag{11}$$

Here, if $\gamma=1$, that is, if no inclination distortion is present, then $I=\cos \omega_B t$ and $Q=0$, and the transmission signal ($\cos \omega_B t$) itself is demodulated. However, if $\gamma>1$ or $\gamma<1$, then since the demodulated signal Q is not equal to "0", an amplitude component of the demodulated signal Q will appear centered at "0" in accordance with an increase or a decrease in amplitude of the demodulated signal I. In short, it can be seen that, when $\gamma>1$ or $\gamma<1$, an orthogonal interference component is produced by the demodulated signal Q.

Figure 31:
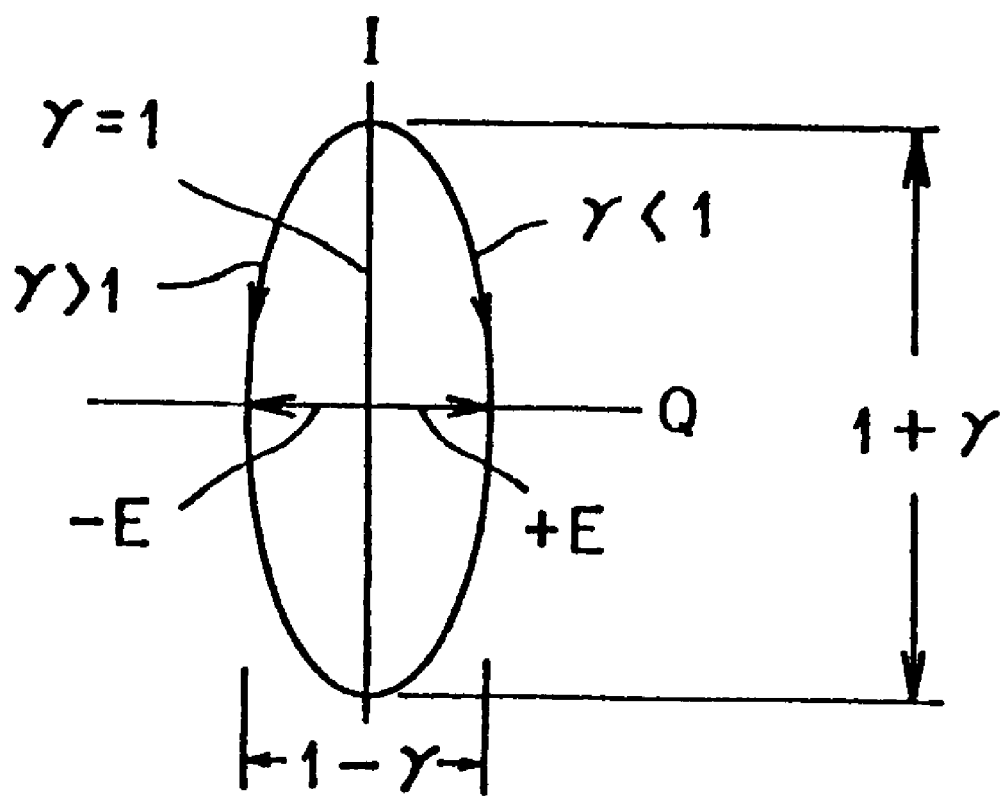
FIG. 31 is a diagram illustrating a principle of detection of an amplitude distortion by the automatic delay and amplitude equalizer of FIG. 29.

FIG. 31 illustrates the demodulated signals I and Q represented by the expressions (10) and (11) above in the form of vectors on a rectangular coordinate system I-Q. As seen from FIG. 31, the vector of the signal I moves in accordance with $\cos \omega_B t$ with the amplitude of $(1+\gamma)/2$ on the I axis while the vector of the signal Q moves in accordance with $\sin \omega_B t$ with the amplitude of $(1-\gamma)/2$ on the Q axis. Consequently, the composite vector of the signals I and Q will draw an ellipse with the major axis on the I axis since $(1+\gamma)>(1-\gamma)$ always stands.

Here, when $\gamma>1$, that is, when the inclination distortion has a positive inclination, since the digital demodulated signals I and Q are given as $I=\cos \omega_B t$ and $Q=-\sin \omega_B t$, respectively, the composite vector of the signals I and Q rotates in the counterclockwise direction in FIG. 31. As a result, an error voltage (error information) $-E$ by the signal Q appears on the Q axis.

On the contrary, when $\gamma<1$, or in other words, when the inclination distortion has a negative inclination, since the signals I and Q are given as $I=\cos \omega_B t$ and $Q=\sin \omega_B t$, respectively, the composite vector of the signals I and Q now rotates in the clockwise direction in FIG. 31, and an error voltage $+E$ appears on the Q axis. It is to be noted that, when $\gamma=1$, that is, when no inclination distortion is present, since $Q=0$ in the expression (11), the composite vector of the signals I and Q is present on the I axis.

Table 3 below indicates a relationship (correlation) among the direction of rotation of the composite vector of the signals I and Q, the movement of the signal I (direction of variation of the value of the signal I), the error voltage E of the signal Q and the first-order inclination distortion ($\gamma$) described above.

TABLE 3

Relationship to motion of signal, error information and amplitude distortion

| Direction of rotation of composite vector | Motion of signal I | Error information of signal Q | Amplitude distortion ($\gamma$) |
|---|---|---|---|
| Counterclockwise | ↓ | $-E$ | Positive |
|  | ↑ | $+E$ | inc. ($\gamma > 1$) |
| Clockwise | ↑ | $+E$ | Negative |
|  | ↓ | $-E$ | inc. ($\gamma < 1$) |

TABLE 3-continued

Relationship to motion of signal, error information and amplitude distortion

| Direction of rotation of composite vector | Motion of signal I | Error information of signal Q | Amplitude distortion (γ) |
|---|---|---|---|
| No rotation | X | 0 | Zero inc. (γ = 1) |

Note: "Inc." is an abbreviation of "inclination".

As seen from Table 3 above, when the composite vector of the signals I and Q rotates in the counterclockwise direction in FIG. 31, the inclination distortion has a positive inclination. Accordingly, if the time when the signal I changes to the downward direction ↓(+→−) in FIG. 31 and the error voltage of the signal Q exhibits the value −E or the time when the signal I changes to the upward direction ↑(−→+) in FIG. 31 and the error voltage of the signal Q exhibits the value +E is detected, then it can be detected readily that the first-order inclination distortion of the input signal has a positive inclination.

On the other hand, when the composite vector of the signals I and Q rotates in the clockwise direction in FIG. 31, the inclination distortion has a negative inclination. Accordingly, if the time when the signal I changes to the downward direction ↓(+→−) in FIG. 31 and the error voltage of the signal Q exhibits the value +E or the time when the signal I changes to the upward direction ↑(−→+) in FIG. 31 and the error voltage of the signal Q exhibits the value −E is detected, then it can be detected readily that the inclination distortion of the input signal has a negative inclination.

It is to be noted that the fact that the inclination distortion of the input signal has a zero inclination (when γ=1) can be detected effectively from the fact that, the error voltage ±E of the demodulated signal Q is "0", that is, an error voltage ±E is not detected. In this instance, however, the movement of the signal I is not required for such detection.

Figure 33:
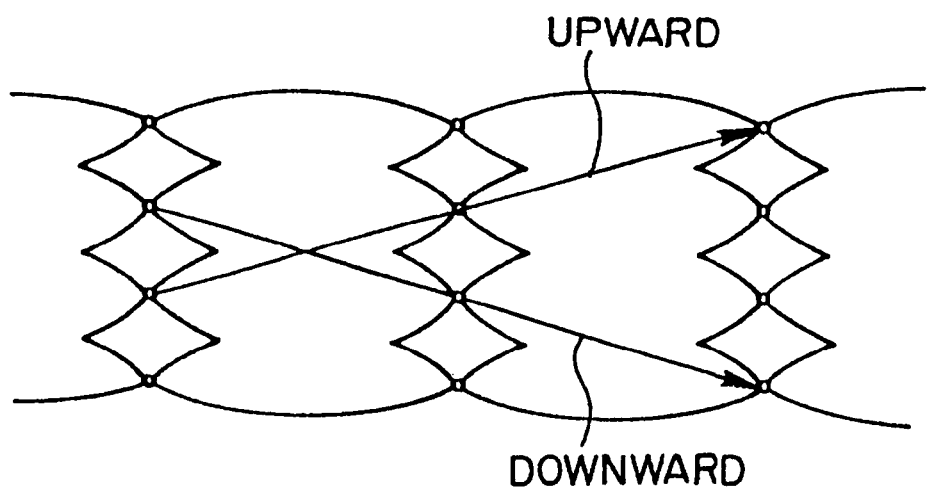

It is to be noted that FIG. 33 is a diagram showing a received eye pattern on the I axis when the demodulated signal A(ω) described above is not A(ω)=cos $ω_B$t but a signal which has undergone such modulation as PSK (Phase Shift Keying) or QAM (Quadrature Amplitude Modulation), and also in this instance, if an inclination distortion (a first-order or higher order inclination distortion) is included in the received demodulated signal B(ω)', then when the demodulated signal I moves in the upward or downward direction, the error voltage ±E of an orthogonal interference component appears in the demodulated signal Q. Consequently, if a movement of the signal I is detected and the error voltage ±E by the signal Q is detected as described above, then the inclination characteristic of the inclination distortion can be detected effectively.

In short, as can be seen from comparison between Table 3 above and Table 1 presented in the description of the first embodiment hereinabove, inclination information (a positive inclination or a negative inclination) of an amplitude distortion can be detected by a quite same technique as the detection technique for inclination information of a delay distortion described hereinabove. Accordingly, the detection system for an amplitude distortion and the detection system for a delay distortion can be utilized commonly or formed as a common system only if it is taken into consideration that the timing constant for amplitude distortion compensation and the time constant for delay distortion compensation are different from each other.

Thus, the control section 14E in the present embodiment is constructed such that it discriminates the direction of variation of the value of one of digital demodulated signals I and Q of an input signal, that is, the signal I, and detects error information ±E from the other signal Q orthogonal to the signal I, and outputs a control signal for the first-order inclination delay compensation section 11A and another control signal for the, first-order inclination amplitude compensation section 11B based on the correlation between the error information ±E and the direction of variation of the value of the,signal I.

In particular, the control section 14E includes, as shown in FIG. 29, an up/down identification section 141, a rotation direction identification section 142 and an integrator 143 which are similar to those shown in FIG. 5, and further includes another integrator 143' having a time constant (for example, time constant A) different from the time constant (for example, time constant B) of the integrator 143. The time constants A and B are set so as to have values much different from each other (A <<B or A>>B).

The up/down identification section (signal direction discrimination section) 141 also in this instance discriminates the direction in which one of the digital demodulated signals I and Q obtained by the demodulator 13, that is, the signal I, moves, that is, in which one of the upward direction (↑) and the downward direction (↓) the value of the digital demodulated signal I moves (varies) on the I axis. In order to discriminate the direction in which the signal I moves, the up/down identification section 141 samples the signal I in a data clock period T.

The rotation direction identification section (error information detection section, correlation calculation section) 142 detects, from the digital demodulated signal Q obtained similarly by the demodulator 13 and an equalized signal $Q_{TRE}$ obtained by equalization of the digital demodulated signal Q by means of the transversal equalizer 16 (refer to FIG. 5), an error voltage (error information) ±E with respect to the digital demodulated signal I, and detects an amplitude distortion (positive/negative inclination distortion) of the reception signal based on the correlation (refer to Table 1) between the error information ±E and the direction of movement of the signal I obtained by the up/down identification section 141. Also in this instance, the rotation direction identification section 142 is formed as a difference calculation section which calculates a difference between the digital demodulated signal Q before equalization by the transversal equalizer 16 and the equalized signal $Q_{TRE}$ after equalization to detect an error voltage ±E.

The integrator 143 integrates a detection signal of the delay distortion obtained by the rotation direction identification section 142 with the time constant B to remove noise components included in the detection signal and outputs a resulting signal as a control signal for the first-order inclination delay compensation section 11A. The integrator 143' integrates a detection signal of the delay distortion obtained by the rotation direction identification section 142 with the time constant A to remove noise components included in the detection signal and outputs a resulting signal as a control signal for the first-order inclination amplitude compensation section 11B.

Thus, in the control section 14E, the direction in which the digital demodulated signal I moves (the direction of variation of the value of the signal) is discriminated by the up/down identification section 141, and an error voltage ±E of the digital demodulated signal Q is detected by the rotation direction identification section 142. Then, from the direction in which the digital demodulated signal I moves and the error voltage ±E of the digital demodulated signal Q. inclination information of the delay distortion and the amplitude distortion of the IF signal is detected and control signals for the compensation sections 11A and 11B are produced by the integrators 143 and 143', respectively.

In the first-order inclination delay compensation section 11A, the inclination delay characteristic thereof (composition ratio of the characteristics of the equalizers 11-1 and 11-2) is controlled in accordance with a control signal from the control section 14E to compensate for the delay distortion of the IF signal, while, in the first-order inclination amplitude compensation section 11B, the inclination amplitude characteristic thereof (composition ratio of the characteristics of the equalization sections 112 and 114) is controlled in accordance with another control signal from the control section 14E to compensate for the amplitude distortion of the IF signal.

In short, the automatic delay and amplitude equalizer (automatic delay and amplitude equalization method) described above has a detection step by the control section 14E of detecting inclination information of linear distortion characteristics of an input signal, and a compensation step by the compensation sections 11A and 11B of compensating for the delay characteristic and the amplitude characteristic of the input signal, respectively, based on the inclination information of the linear distortion characteristic detected by the detection step.

Accordingly, with the automatic delay and amplitude equalizer of the present embodiment, since not only a delay distortion but also an amplitude distortion of the transmission line 32 (32') (FIG. 9) can be detected on the real time basis and the distortions can individually be equalized and compensated for automatically, the accuracy in signal demodulation can be improved further remarkably when compared with the alternative case wherein only the delay distortion is compensated for as described hereinabove.

Further, since, in the embodiment described above, the control section 14E (detection system for the delay distortion and detection system for the amplitude distortion) is provided and used commonly for the two compensation sections 11A and 11B, the scale of the apparatus can be reduced significantly when compared with the alternative case wherein different control sections are provided individually for the different detection systems.

Further, since, also in the control section 14E described above, inclination information of the delay distortion and the amplitude distortion of the input signal is detected based on the correlation between the direction in which the digital demodulated signal I moves and the error voltage ±E of the digital demodulated signal Q to produce and output a control signal for the compensation section 11A and another control signal for the compensation section 11B, the detection systems (control section 14E) for the delay distortion and the amplitude distortion can be implemented as a digital circuit. Accordingly, the circuit scale and the cost of the present automatic delay and amplitude equalizer can be reduced significantly and also the compensation capacity is improved significantly.

Further, since, in the embodiment described above, the first-order inclination amplitude compensation section 11B is constructed in such a manner as shown in FIG. 30 so that it can produce an arbitrary inclination characteristic and compensate for the amplitude characteristic of the input signal in accordance with the inclination amplitude characteristic, also the compensation section 11B is implemented with a simple construction together with the first-order inclination delay compensation section 11A, and this contributes very much to further reduction in size of the present automatic delay and amplitude equalizer.

Further, also in the up/down identification section 141 in the present embodiment, the signal I is sampled in the data clock period T by the registers 141-1 and 141-2 (refer to FIG. 19), and the data $I_{B0}$, $I_{B1}$ and $I_{B2}$ obtained by the sampling are compared with each other by the comparators 141-3 and 141-4 to discriminate the direction in which the signal I moves. Consequently, the circuitry of the up/down identification section 141 can be implemented as digital circuitry. Accordingly, the circuit scale and the cost can be reduced remarkably, and the direction in which the digital demodulated signal I moves can be discriminated with a higher degree of accuracy.

Further, since also the up/down identification section 141 can discriminate the direction of movement of the signal I also by sampling the digital demodulated signal I in a period TIN which is equal to 1/N the data clock period T, by whichever modulation method (for example, quadriphase PSK) a signal from which the digital demodulated signal I is originated is modulated, the direction in which the digital demodulated signal I moves can be discriminated. Consequently, the automatic delay and amplitude equalizer is improved very much in universal applicability.

Further, with the automatic delay and amplitude equalizer of the present embodiment, since the delay distortion and the amplitude distortion of the IF signal are compensated for at the stage (in the IF band) preceding to the demodulator 13 by providing the first-order inclination delay compensation section 11A and the first-order inclination amplitude compensation section 11B at the preceding stage to the demodulator 13, the compensation sections 11A and 11B can be implemented with simpler constructions than those where such compensation is performed after demodulation of the input signal at the stage (in the base band) following the demodulator 13. Consequently, the constructions just described contribute very much to further reduction in size of the present automatic delay and amplitude equalizer.

It is to be noted that the order of arrangement of the compensation sections 11A and 11B is optional (the compensation section 11B may be provided at the stage preceding to the compensation section 11A). Further, while, in the present embodiment described above, the direction of movement of a signal is discriminated from the digital demodulated signal I and an error voltage (error information) ±E is detected from the digital demodulated signal Q, even if the direction of movement of a signal is discriminated from the digital demodulated signal Q and an error voltage ±E is detected from the digital demodulated signal I conversely to that described above, similar results can be obtained.

Figure 34:
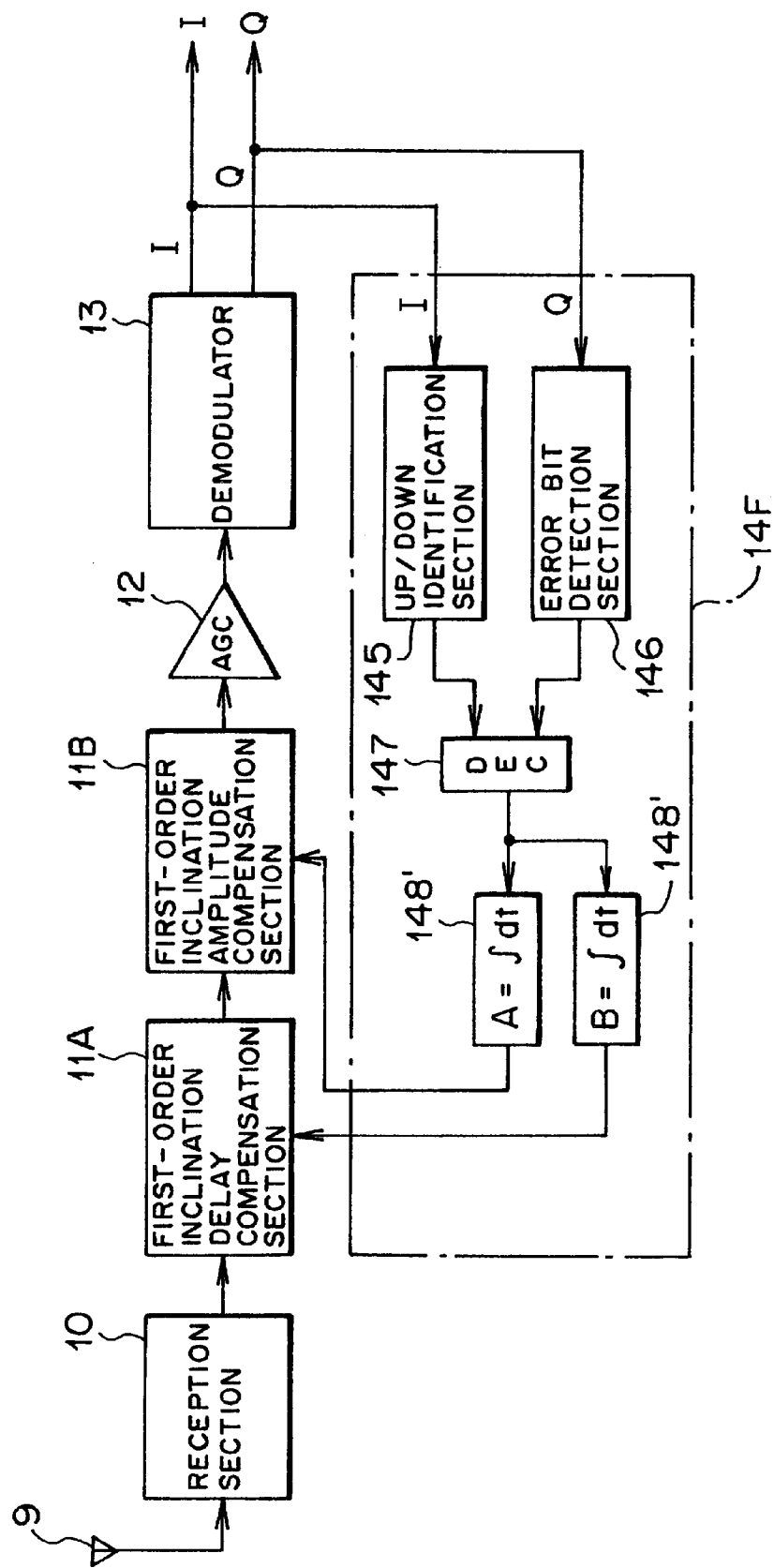
FIG. 34 is a block diagram showing a modification to the automatic delay and amplitude equalizer of FIG. 29.

B-3'. Modification to First Embodiment of Automatic Delay and Amplitude Equalizer FIG. 34 shows in block diagram a modification to the automatic delay and amplitude equalizer of the first embodiment described hereinabove. Referring to FIG. 34, the modified automatic delay and amplitude equalizer shown is different from that shown in FIG. 29 in that it includes a control section 14F in place of the control section 14E.

The control section 14F detects a delay distortion of an input signal only from digital demodulated signals I and Q obtained from the demodulator 13 [in the control section 14E, a delay distortion of an input signal is detected from digital demodulated signals I and Q and an equalized signal $Q_{TRE}$ ($I_{TRE}$)] and produces and outputs a control signal for the first-order inclination delay compensation section 11A and a control signal for the first-order inclination amplitude compensation section 11B. The control section 14F includes, as shown in FIG. 34, an up/down identification section 145, an error bit detection section 146, a decoder (DEC) 147, an integrator (time constant B) 148, and another integrator (time constant B) 148'.

The up/down identification section 145 has a similar construction to the up/down identification section 141 described hereinabove with reference to FIG. 19, and samples one of the digital signals I and Q obtained by the demodulator 13, that is, the signal I, in a data clock period T and compares such sample data of the digital signal I with each other to discriminate the direction in which the signal I moves. The error bit detection section (error information detection section) 146 detects an error voltage (error information) ±E of the signal Q, which is an orthogonal interference component with the signal I, only from part (an error bit) of data of the digital demodulated signal Q.

The decoder 147 produces a control signal for controlling the inclination delay characteristic of the first-order inclination delay compensation section 11A based on the correlation between a result of discrimination obtained by the up/down identification section 145 and error information ±E obtained by the error bit detection section 146. The integrator 148 integrates a control signal obtained by the decoder 147 with the time constant B to average the control signal to remove noise components and so forth included in the control signal and outputs a resulting signal to the first-order inclination delay compensation section 11A. The integrator 148' integrates another control signal obtained similarly by the decoder 147 with the time constant A and outputs a resulting signal to the first-order inclination amplitude compensation section 11B.

Also in this instance, the up/down identification section 145 may otherwise sample, similarly as in the first embodiment, the digital demodulated signal I in a period T/N (N is an integer equal to or greater than 2) equal to 1/N the data clock period to discriminate the direction in which the digital demodulated signal I moves.

In short, the automatic delay and amplitude equalizer shown in FIG. 34 is constructed such that, to the detection systems for the delay distortion and the amplitude distortion, a detection system of a type similar to the detection system (control section 14B) shown in FIG. 26 is applied.

In the control section 14F constructed in such a manner as described above, the direction in which the digital demodulated signal I moves is discriminated by the up/down identification section 145, and error information ±E is detected only from part (an error bit) of data of the digital demodulated signal Q by the error bit detection section 146. Then, from the correlation between the direction in which the signal I moves and the error information ±E of the signal Q, inclination information of the delay distortion and the amplitude distortion of the input signal is detected.

In short, in the automatic delay and amplitude equalizer of the present modification, the error information ±E of the digital demodulated signal Q is detected not by calculating a difference between the digital signal Q obtained by the demodulator 13 and the equalized signal $Q_{TRE}$ obtained by equalization of the digital signal Q by means of the transversal equalizer 16, but only from part (an error bit) of data of the digital demodulated signal Q obtained by the demodulator 13.

Then, the detection signal is converted into a signal corresponding to the inclination information by the decoder 147 and control signals for the compensation sections 11A and 11B are produced by the integrators 148 and 148' and outputted to the compensation sections 11A and 11B, respectively. Consequently, the first-order inclination delay compensation section 11A equalizes and compensates for the delay distortion of the input signal, and the first-order inclination amplitude compensation section 11B equalizes and compensates for the amplitude distortion of the input signal.

As described above, the automatic delay and amplitude equalizer of the present modification is advantageous in that, since the error information ±E of the digital signal Q can be detected only from part (an error bit) of data of the digital demodulated signal Q by the error bit detection section 146, similar advantages to those achieved by the automatic delay and amplitude equalizer described hereinabove with reference to FIG. 29 can be achieved, and besides, the circuit scale and the cost can be further reduced.

It is to be noted that, while, also in the present modification, the direction in which a signal moves is discriminated from the digital demodulated signal I while the error information ±E is detected from the digital demodulated signal Q, alternatively the direction in which a signal moves may be discriminated from the digital demodulated signal Q while the error information ±E is detected from the digital demodulated signal I conversely.

B-4. Second Embodiment of Automatic Delay and Amplitude Equalizer

Figure 35:
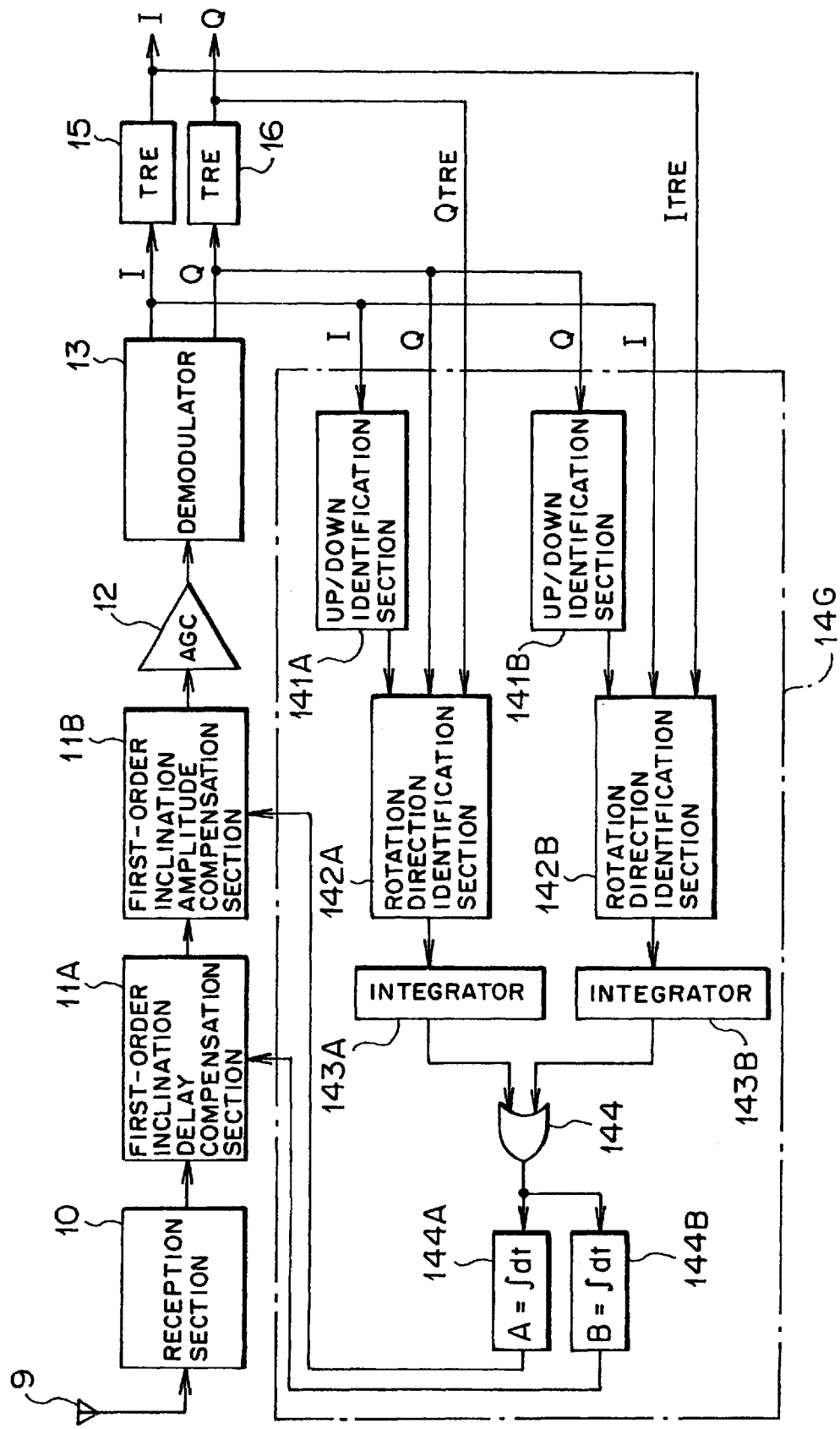
FIG. 35 is a block diagram showing a second embodiment of an automatic delay and amplitude equalizer according to the present invention.

FIG. 35 shows in block diagram a second embodiment of an automatic delay and amplitude equalizer according to the present invention. Referring to FIG. 35, the automatic delay and amplitude equalizer shown is different from that shown in FIG. 29 in that it includes a control section 14G in place of the control section 14E.

The control section 14G detects characteristics (inclination information) of first-order inclination distortions (a delay distortion and an amplitude distortion) of an IF signal (input signal) obtained from the demodulator 13 from digital demodulated signals I and Q of the IF signal and equalized signals $I_{TRE}$ and $Q_{TRE}$ obtained by processing the digital demodulated signals I and Q by means of the transversal equalizers 15 and 16, respectively, and outputs a control signal for the first-order inclination delay compensation section 11A and another control signal for the first-order inclination amplitude compensation section 11B. In this instance, the control section 14G detects the direction of movement of the signal and the error voltage (error information) ±E from each of the digital demodulated signals I and Q.

In particular, the control section 14G discriminates the direction in which one of the digital demodulated signals I and Q, that is, the signal I, moves (the direction of variation of the value of the signal I), detects error information ±E from the other digital demodulated signal Q orthogonal to the signal I, and obtains a detection signal (first correlation signal) corresponding to an inclination of the first-order inclination distortion of the input signal based on the correlation between the error information ±E and the direction of movement of the signal I. Further, the control section 14G discriminates the direction in which the other signal Q moves, detects error information ±E from the signal I orthogonal to the signal Q, and obtains a detection signal (second correlation signal) corresponding to an inclination of the first-order inclination distortion similarly based on the correlation between the error information ±E and the direction of movement of the signal Q. Then, the control section 14G produces a control signal for the compensation section 11A and another control signal for the compensation section 11B from the two detection signals and outputs the control signals.

To this end, the control section 14G includes, as shown in FIG. 35, a pair of up/down identification sections 141A and 141B, a pair of rotation direction identification sections 142A and 142B, a pair of integrators 143A and 143B, and an OR gate 144, which are all similar to those described hereinabove with reference to FIGS. 19 and 27. The control section 14G further includes a further integrator (time constant A) 144A and a still further integrator (time constant B) 144B.

The up/down identification section (first signal direction discrimination section) 141A also in this instance discriminates the direction in which one of the digital demodulated signals I and Q obtained by the demodulator 13, that is, the signal I, moves. The rotation direction identification section 142A detects, from the other signal Q of the digital demodulated signals I and Q which is orthogonal to the signal I, error information ±E which makes an orthogonal interference component with the signal I, and outputs a first correlation signal based on the correlation between the error information ±E of the signal Q and the direction of movement of the signal I obtained by the up/down identification section 141A. The integrator 143A integrates the first correlation signal obtained by the rotation direction identification section 142A.

In contrast, the up/down identification section (second signal direction discrimination section) 141B discriminates the direction in which the other one of the digital demodulated signals I and Q obtained by the demodulator 13, that is, the signal Q, moves. The rotation direction identification section 142B detects, from the signal I of the digital demodulated signals I and Q, error information ±E which makes an orthogonal interference component with the signal Q, and outputs a second correlation signal based on the correlation between the error information ±E of the signal I and the direction of movement of the signal Q obtained by the up/down identification section 141B. The integrator 143B integrates the second correlation signal obtained by the rotation direction identification section 142B.

The OR gate 144 logically ORs the outputs of the integrators 143A and 143B to produce a control signal for the first-order inclination delay compensation section 11A and the first-order inclination amplitude compensation section 11B. The integrator 144A integrates the control signal produced by the OR gate 144 with the time constant A to remove noise components included in the control signal and outputs a resulting signal as a control signal for the first-order inclination amplitude compensation section 11B. The integrator 144B similarly integrates the control signal produced by the OR gate 144 with the time constant B to remove noise components included in the control signal and outputs a resulting signal as a control signal for the first-order inclination delay compensation section 11A.

In short, the OR gate 144 and the integrators 144A and 144B have functions as control signal production sections for individually producing a control signal for the first-order inclination delay compensation section 11A and another control signal for the first-order inclination amplitude compensation section 11B from the correlation signals mentioned above.

It is to be noted that the rotation direction identification sections 142A and 142B described above are individually similar to the rotation direction identification section 142 shown in FIG. 5 and are each constructed, as shown in FIG. 20, including a pair of subtractors (SUB) 142A-1 and 142B-1 and a pair of decoders (DEC) 142A-2 and 142B-2.

In short, the automatic delay and amplitude equalizer shown in FIG. 35 is constructed such that, to the detection systems for the delay distortion and the amplitude distortion, a detection system of a type similar to that of the detection system (control section 14C) shown in FIG. 27 is applied.

Also with the automatic delay and amplitude equalizer shown in FIG. 35 having the construction described above, the inclination delay characteristic of the first-order inclination delay compensation section 11A is controlled in accordance with a control signal from the control section 14G to equalize and compensate for the delay distortion of the IF signal.

In particular, in the control section 14G, the direction in which the signal I of the digital demodulated signals I and Q moves is discriminated by the up/down identification section 141A by sampling the signal I in a data clock period T, and error information ±E which makes an orthogonal interference component with the signal I is detected by the rotation direction identification section 142A from the other signal Q of the digital demodulated signals I and Q which is orthogonal to the signal I.

More particularly, in the rotation direction identification section 142A, the difference between the digital demodulated signal Q and the equalized signal $Q_{TRE}$ obtained by equalization of the digital demodulated signal Q by means of the transversal equalizer 16 is calculated by the subtractor 142A-1 to detect error information ±E of the digital demodulated signal Q.

Then, based on the correlation between the error information ±E of the signal Q and the direction of movement of the signal I, inclination information of the delay distortion of the input signal is detected, and a first correlation signal is outputted from the decoder 142A-2 based on the thus detected inclination information.

Meanwhile, in this instance, in the signal direction discrimination section 141B, the other digital demodulated signal Q of the digital demodulated signals I and Q is sampled in the data clock period T to discriminate the direction in which the signal Q moves, and error information ±E which makes an orthogonal interference component with the signal Q is detected by the rotation direction identification section 142B from the digital demodulated signal I orthogonal to the digital demodulated signal Q.

More particularly, in the rotation direction identification section 142B, the difference between the digital demodulated signal I and the equalized signal $Q_{TRE}$ obtained by equalization of the digital demodulated signal I by means of the transversal equalizer 15 is calculated by the subtractor 142B-1 to detect error information ±E of the digital demodulated signal I.

Then, based on the correlation between the error information ±E of the signal I and the direction of movement of the signal Q, inclination information of the delay distortion of the input signal is detected, and a second correlation signal is outputted from the decoder 142B-2 based on the thus detected inclination information of the delay distortion.

Thereafter, the correlation signals obtained in such a manner as described above are integrated by the integrators 143A and 143B, respectively, and then logically ORed by the OR gate 144 to obtain a control signal for the first-order inclination delay compensation section 11A and another control signal for the first-order inclination amplitude compensation section 11B which correspond to the inclination information of the first-order inclination distortions (delay distortion and amplitude distortion) of the input signal. The control signals thus obtained are outputted to the corresponding compensation sections 11A and 11B.

Consequently, by the first-order inclination delay compensation section 11A and the first-order inclination amplitude compensation section 11B, the delay distortion and the amplitude distortion of the IF signal are compensated for in accordance with the control signals at the preceding stage to the demodulator 13.

In this manner, in the automatic delay and amplitude equalizer according to the second embodiment, since the characteristics (inclination information) of the first-order inclination distortions of the IF signal are detected not only based on the correlation between the direction in which the signal I moves and the error information ±E of the signal Q but also based on the correlation between the direction in which the signal Q moves and the error information ±E of the signal I, the sensitivity and the accuracy in detection of control signals for the compensation sections 11A and 11B can be improved significantly when compared with the automatic delay and amplitude equalizer described hereinabove with reference to FIG. 29. Consequently, similar effects or advantages to those of the automatic delay and amplitude equalizer described hereinabove with reference to FIG. 29 can be achieved. Besides, the performance of the automatic delay and amplitude equalizer exhibits a great degree of improvement.

It is to be noted that, also in the automatic delay and amplitude equalizer of the present second embodiment, in order that it may cope with demodulation of a transmission signal which has been modulated by any modulation system, the digital demodulated signal I may alternatively be sampled by the up/down identification section 141A in a period T/N (N is an integer equal to or greater than 2) which is equal to 1/N the data clock period T while the digital demodulated signal Q is sampled by the up/down identification section 141B in the period T/N which is equal to 1/N the data clock period T to discriminate the directions of movement of the digital demodulates signals I and Q, respectively.

Figure 36:
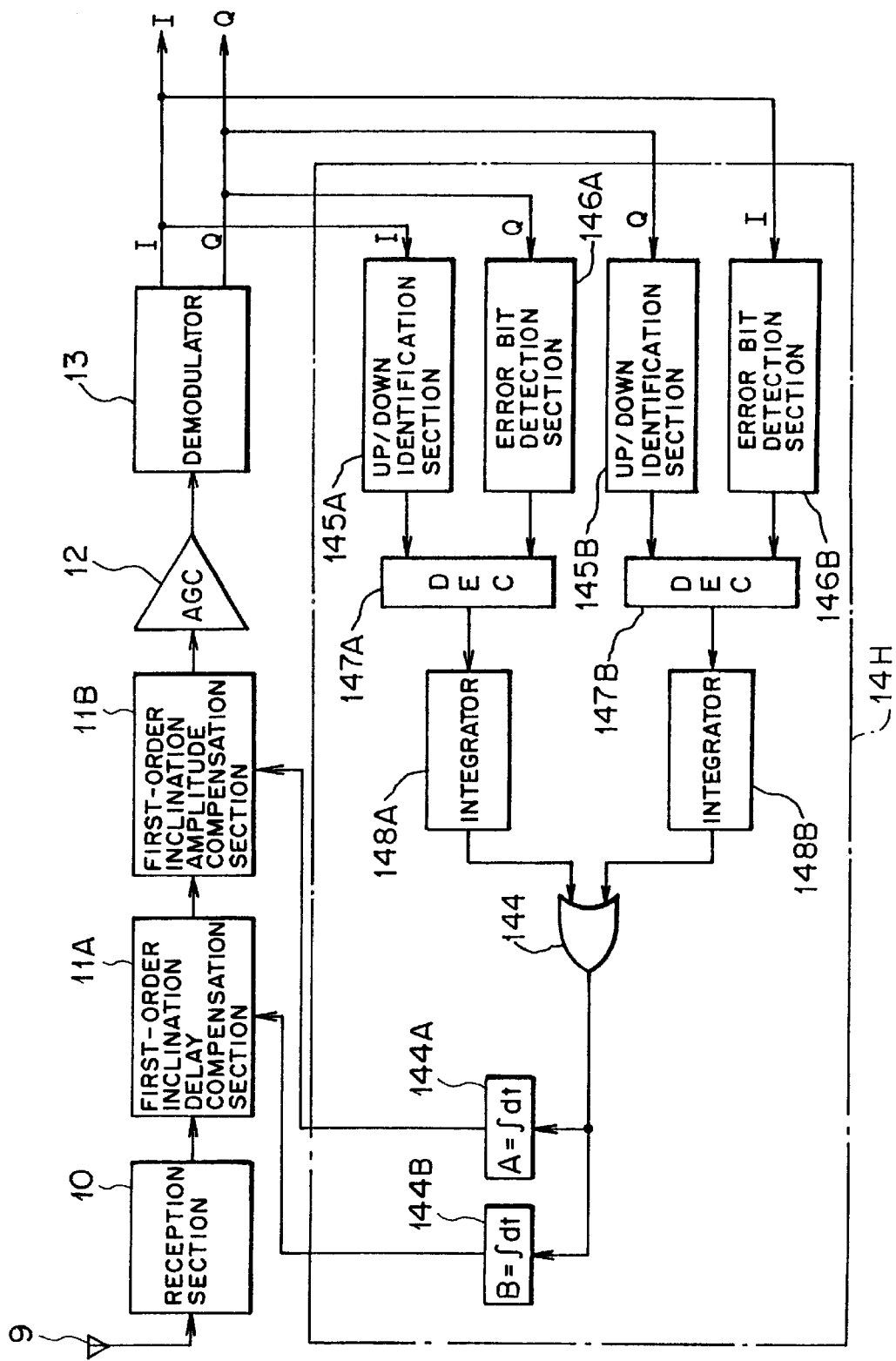
FIG. 36 is a block diagram showing a modification to the automatic delay and amplitude equalizer of FIG. 35.

B-4'. Modification to Second Embodiment of Automatic Delay and Amplitude Equalizer FIG. 36 shows in block diagram a modification to the automatic delay and amplitude equalizer of the second embodiment described above. Referring to FIG. 36, the modified automatic delay and amplitude equalizer shown is different from that shown in FIG. 35 in that it includes, in place of the control section 14G, a different control section 14H which includes an OR gate 144, a pair of up/down identification sections 145A and 145B, a pair of error bit detection sections 146A and 146B, a pair of decoders (DEC) 147A and 147B, and a pair of integrators 148A and 148B, which are all similar to those shown in FIG. 28, and further includes a further integrator (time constant A) 144A and a still further integrator (time constant B) 144B similar to those shown in FIG. 35.

Roughly speaking, the control section 14H is constructed such that the rotation direction identification section 142A of the control section 14G (refer to FIG. 35) is formed from the error bit detection section (first error information detection section) 146A and the decoder (first correlation calculation section) 147A, and the rotation direction identification section 142B is formed from the error bit detection section (second error information detection section) 146B and the decoder (second correlation calculation section) 147B.

Accordingly, also in this instance, a digital demodulated signal I obtained by the demodulator 13 is sampled in a data clock period T by the up/down identification section 145A and sample data obtained by such sampling are compared with each other by the up/down identification section 145A to discriminate the direction in which the signal I moves, and error information ±E of a digital demodulated signal Q is detected from only part (an error bit) of data of the digital demodulated signal Q by the error bit detection section 146A.

Then, based on the correlation between the direction of movement of the signal I and the error information ±E of the signal Q obtained in this manner, a signal corresponding to characteristics (inclination information) of the first-order inclination distortions (delay distortion and amplitude distortion) of the input signal is outputted as a first correlation signal from the decoder 147A.

Further, in this instance, the digital demodulated signal Q obtained by the demodulator 13 is sampled in the data clock period T and sample data obtained by such sampling are compared with each other by the up/down identification section 145B to discriminate the direction in which the signal Q moves. Meanwhile, error information ±E of the digital demodulated signal I is detected from only part (an error bit) of data of the signal I by the error bit identification section 146B.

Then, based on the correlation between the direction of movement of the digital signal Q and the error information ±E of the digital signal I obtained in this manner, a signal corresponding to the characteristics of the first-order inclination distortions of the input signal is outputted as a second correlation signal from the decoder 147B.

Thereafter, the correlation signals outputted from the decoders 147A and 147B are integrated by the integrators 148A and 148B, respectively, and are logically ORed by the OR gate 144. Consequently, if a delay distortion is detected from at least one of the digital demodulated signals I and Q, then a control signal for the first-order inclination delay compensation section 11A and another control signal for the first-order inclination amplitude compensation section 11B are produced by the integrators 144B and 144A and outputted to the corresponding compensation sections 11A and 11B, respectively.

Thereafter, the delay distortion of the input signal is compensated for by the first-order inclination delay compensation section 11A at the preceding stage to the demodulator 13, and the amplitude distortion of the input signal is compensated for by the first-order inclination amplitude compensation section 11B at the preceding stage to the demodulator 13.

As described above, with the automatic delay and amplitude equalizer of the present modification, since the error information ±E of the digital signal Q (or I) can be detected only from part (an error bit) of data of the digital signal Q (or I), similar effects or advantages to those of the automatic delay and amplitude equalizer described hereinabove with reference to FIG. 35 can be achieved. Further, the automatic delay and amplitude equalizer of the modification is advantageous also in that the circuit scale and the cost can be further reduced.

It is to be noted that, also in the present modification, the up/down identification section 141A may otherwise sample the digital demodulated signal I in a period T/N (N is an integer equal to or greater than 2) equal to 1/N the data clock period while the up/down identification section 141B samples the digital demodulated signal Q in the period T/N equal to 1/N the data clock period.

C. Others

While the automatic delay and amplitude equalizers described in sections B-3, B-3', B-4 and B-4' hereinabove use a detection system (control sections 14E to 14H) for first-order inclination distortions (delay distortion and amplitude distortion) commonly for both of the compensations 11A and 11B, such detection systems may be provided individually for the compensation sections 11A and 11B. For example, if the detection system (control sections 14A to 14D) of any of the automatic delay equalizers described hereinabove is used in addition to a detection system of an existing automatic amplitude equalizer, then the accuracy in signal demodulation of the existing automatic amplitude equalizer can be improved remarkably.

Further, while, in the automatic delay and amplitude equalizers described hereinabove, the first-order inclination amplitude compensation section 11B has an inclination amplitude characteristic in the frequency domain so that it may equalize (compensate for) the amplitude distortion of an input signal in the frequency domain, the present invention is not limited to the specific construction, and, for example, a circuit having an inclination amplitude characteristic in the time domain such as a transversal equalizer may be used to equalize the amplitude distortion of an input signal in the time domain.

Further, while, in the automatic delay and amplitude equalizers described hereinabove, the first-order inclination amplitude compensation section 11B is formed for an IF band and provided at the preceding stage (IF band) to the demodulator 13, it may alternatively be formed for a base band and provided at the following stage (base band) to the demodulator 13.

Further, while, in the automatic delay and amplitude equalizers described hereinabove, the amplitude distortion is described as being an amplitude distortion of a first-order inclination type, for example, if a detection system for detecting a second-order inclination amplitude distortion and a compensation section capable of equalizing a second-order inclination amplitude distortion are provided, then also a second-order inclination amplitude distortion of an input signal can be compensated for.

Further, while, in the embodiments described hereinabove, the present invention is applied to a radio communication system, the present invention is not limited to the specific application and can be applied to any communication system irrespective of whether it is a radio communication system or a wire communication system only if such digital demodulated signals I and Q can be obtained.

The present invention is not limited to the embodiment specifically described above, and variations and modifications can be made without departing from the scope of the present invention.

What is claimed is:

1. An automatic delay equalizer for compensating for a delay characteristic of an input signal, comprising:
    an inclination delay equalization section for compensating for the delay characteristic of the input signal in accordance with an inclination delay characteristic; and
    a control section for discriminating a direction of variation of a value of a first signal which is one of a pair of digital demodulated signals of the input signal, detecting error information from a second signal which is another one of the digital demodulated signals and said second signal being orthogonal to the first signal, and outputting a control signal for said inclination delay equalization section based on a correlation between the error information and the direction of variation of the value of the first signal.

2. An automatic delay equalizer as claimed in claim 1, wherein said inclination delay equalization section has the inclination delay characteristic in a frequency domain and compensates for the delay characteristic of the input signal in accordance with the inclination delay characteristic.

3. An automatic delay equalizer as claimed in claim 1, wherein said control section includes a signal direction discrimination section for discriminating the direction of variation of the value of the first signal, an error information detection section for detecting the error information from the second signal which is orthogonal to the first signal, and a correlation calculation section for outputting the control signal for said inclination delay equalization section based on the correlation between the error information obtained by said error information detection section and the direction of variation of the value of the first signal obtained by said signal direction discrimination section.

4. An automatic delay equalizer as claimed in claim 3, wherein said signal direction discrimination section samples the first signal in a data clock period to discriminate the direction of variation of the value of the first signal.

5. An automatic delay equalizer as claimed in claim 3, wherein said signal direction discrimination section samples the first signal in a period equal to 1/N the period of a data clock to discriminate. the direction of variation of the value of the first signal, N being an integer equal to or larger than 2.

6. An automatic delay equalizer as claimed in claim 3, wherein said error information detection section detects the error information from an error bit of the second signal.

7. An automatic delay equalizer as claimed in claim 3, wherein said error information detection section is formed as a difference calculation section which calculates a difference between the second signal of the digital demodulated signals of the input signal and an equalized signal obtained by processing the second signal by means of a transversal equalizer.

8. An automatic delay equalizer as claimed in claim 1, further comprising a demodulator for producing the digital demodulated signals from the input signal, said inclination delay equalization section being provided at a stage preceding to said demodulator.

9. An automatic delay equalizer for compensating for a delay characteristic of an input signal, comprising:
    an inclination delay equalization section for compensating for the delay characteristic of the input signal in accordance with an inclination delay characteristic; and
    a control section for discriminating a direction of variation of a value of a first signal which is one of a pair of digital demodulated signals of the input signal, detecting first error information from a second signal which is another one of the digital demodulated signals and said second signal being orthogonal to the first signal, and producing a first correlation signal based on a correlation between the first error information and the direction of variation of the value of the first signal, for discriminating a direction of variation of a value of the second signal, detecting second error information from the first signal which is orthogonal to the second signal and producing a second correlation signal based on a correlation between the second error information and the direction of variation of the value of the second signal and for producing a control signal for said inclination delay equalization section based on the first correlation signal and the second correlation signal and outputting the control signal.

10. An automatic delay equalizer as claimed in claim 9, wherein said inclination delay equalization section has the inclination delay characteristic in a frequency domain and compensates for the delay characteristic of the input signal in accordance with the inclination delay characteristic.

11. An automatic equalizer as claimed in claim 9, wherein said control section includes a first signal direction discrimination section for discriminating the direction of variation of the value of the first signal, a first error information detection section for detecting the first error information from the second signal which is orthogonal to the first signal, a first correlation calculation section for outputting the first correlation signal based on the correlation between the first error information obtained by said first error information detection section and the direction of variation of the value of the first signal obtained by said first signal direction discrimination section, a second signal direction discrimination section for discriminating the direction of variation of the value of the second signal, a second error information detection section for detecting the second error information from the first signal, a second correlation calculation section for outputting the second correlation signal based on the correlation between the second error information obtained by said second error information detection section and the direction of variation of the value of the second signal obtained by said second signal direction discrimination section, and a control signal production section for producing the control signal for said inclination delay equalization section from the first correlation signal from said first correlation calculation section and the second correlation signal from said second correlation calculation section.

12. An automatic delay equalizer as claimed in claim 11, wherein said first signal direction discrimination section samples the first signal in a data clock period to discriminate the direction of variation of the value of the first signal, and said second signal direction discrimination section samples the second signal in the data clock period to discriminate the direction of variation of the value of the second signal.

13. An automatic delay equalizer as claimed in claim 11, wherein said first signal direction discrimination section samples the first signal in a period equal to 1/N the period of a data clock to discriminate the direction of variation of the value of the first signal, N being an integer equal to or larger than 2, and said second signal direction discrimination section samples the second signal in the period equal to 1/N the period of the data clock to discriminate the direction of variation of the value of the second signal.

14. An automatic delay equalizer as claimed in claim 11, wherein said first error information detection section detects the error information from an error bit of the second signal, and said second error information detection section detects the error information from an error bit of the first signal.

15. An automatic delay equalizer as claimed in claim 11, wherein said first error information detection section is formed as a first difference calculation section which calculates a difference between the second signal of the input signal and an equalized signal obtained by processing the second signal by means of a transversal equalizer, and said second error information detection section is formed as a second difference calculation section which calculates a difference between the first signal and an equalized signal obtained by processing the first signal by means of another transversal equalizer.

16. An automatic delay equalizer as claimed in claim 9, further comprising a demodulator for producing the digital demodulated signals from the input signal, said inclination delay equalization section being provided at a stage preceding to said demodulator.

17. An automatic delay equalization method, comprising:
discriminating a direction of variation of a value of a first signal which is one of a pair of digital demodulated signals of an input signal;
detecting error information from a second signal which is another one of the digital demodulated signals and orthogonal to the first signal; and
compensating the delay characteristic of the input signal based on a correlation between the error information and the direction of variation of the value of the first signal.

18. An automatic delay and amplitude equalizer for compensating for a delay characteristic and an amplitude characteristic of an input signal, comprising:
an inclination delay equalization section for compensating for the delay characteristic of the input signal in accordance with an inclination delay characteristic;
an inclination amplitude equalization section for compensating for the amplitude characteristic of, the input signal in accordance with an inclination amplitude characteristic; and
a control section for discriminating a direction of variation of a value of a first signal which is one of a pair of digital demodulated signals of the input signal, detecting error information from a second signal which is another one of the digital demodulated signals and said second signal being orthogonal to the first signal, and outputting a control signal for said inclination delay equalization section and another control signal for said inclination amplitude equalization section based on a correlation between the error information and the direction of variation of the value of the first signal.

19. An automatic delay and amplitude equalizer as claimed in claim 18, wherein said inclination delay equalization section has the inclination delay characteristic in a frequency domain and compensates for the delay characteristic of the input signal in accordance with the inclination delay characteristic, and said inclination amplitude equalization section has the inclination amplitude characteristic in the frequency domain and compensates for the amplitude characteristic of the input signal in accordance with the inclination amplitude characteristic.

20. An automatic delay and amplitude equalizer as claimed in claim 18, wherein said control section includes a signal direction discrimination section for discriminating the direction of variation of the value of the first signal, an error information detection section for detecting the error information from the second signal which is orthogonal to the first signal, and a correlation calculation section for outputting the control signal for said inclination delay equalization section and the control signal for said inclination amplitude equalization section a based on the correlation between the error information obtained by said error information detection section and the direction of variation of the value of the first signal obtained by said signal direction discrimination section.

21. An automatic delay and amplitude equalizer as claimed in claim 20, wherein said signal direction discrimination section samples the first signal in a data clock period to discriminate the direction of variation of the value of the first signal.

22. An automatic delay and amplitude equalizer as claimed in claim 20, wherein said signal direction discrimination section samples the first signal in a period equal to 1/N the period of a data clock to discriminate the direction of variation of the value of the first signal, N being an integer equal to or larger than 2.

23. An automatic delay and amplitude equalizer as claimed in claim 20, wherein said error information detection section detects the error information from an error bit of the second signal.

24. An automatic delay and amplitude equalizer as claimed in claim 20, wherein said error information detection section is formed as a difference calculation section which calculates a difference between the second signal of the input signal and an equalized signal obtained by processing the second signal by means of a transversal equalizer.

25. An automatic delay and amplitude equalizer as claimed in claim 18, further comprising a demodulator for producing the digital demodulated signals from the input signal, said inclination delay equalization section and said inclination amplitude equalization section being provided at a stage or stages preceding to said demodulator.

26. An automatic delay and amplitude equalizer for compensating for a delay characteristic and an amplitude characteristic of an input signal, comprising:

an inclination delay equalization section for compensating for the delay characteristic of the input signal in accordance with an inclination delay characteristic;

an inclination amplitude equalization section for compensating for the amplitude characteristic of the input signal in accordance with an inclination amplitude characteristic; and a control section for discriminating a direction of variation of a value of a first signal which is one of a pair of digital demodulated signals of the input signal, detecting first error information from a second signal which is another one of the digit demodulated signals and said second signal being orthogonal to the first signal and producing a first correlation signal based on a correlation between the first error information and the direction of variation of the value of the first signal, for discriminating a direction of variation of a value of the second signal, detecting second error information from the first signal which is orthogonal to the second signal and producing a second correlation signal based on a correlation between the second error information and the direction of variation of the value of the second signal, and for producing a control signal for said inclination delay equalization section and another control signal for said inclination amplitude equalization section based on the first correlation signal and the second correlation signal and outputting the control signals.

27. An automatic delay and amplitude equalizer as claimed in claim 26, wherein said inclination delay equalization section has the inclination delay characteristic in a frequency domain and compensates for the delay characteristic of the input signal in accordance with the inclination delay characteristic, and said inclination amplitude equalization section has the inclination amplitude characteristic in the frequency domain and compensates for the amplitude characteristic of the input signal in accordance with the inclination amplitude characteristic.

28. An automatic delay and amplitude equalizer as claimed in claim 26, wherein said control section includes a first signal direction discrimination section for discriminating the direction of variation of the value of the first signal, a first error information detection section for detecting the first error information from the second signal which is orthogonal to the first signal, a first correlation calculation section for outputting the first correlation signal based on the correlation between the first error information obtained by said first error information detection section and the direction of variation of the value of the first signal obtained by said first signal direction discrimination section, a second signal direction discrimination section for discriminating the direction of variation of the value of the second signal, a second error information detection section for detecting the second error information from the first signal, a second correlation calculation section for outputting the second correlation signal based on the correlation between the second error information obtained by said second error information detection section and the direction of variation of the value of the second signal obtained by said second signal direction discrimination section, and a control signal production section for producing the control signal for said inclination delay equalization section and the control signal for said inclination amplitude equalization section from the first correlation signal from said first correlation calculation section and the second correlation signal from said second correlation calculation section.

29. An automatic delay and amplitude equalizer as claimed in claim 28, wherein said first signal direction discrimination section samples the first signal in a data clock period to discriminate the direction of variation of the value of the first signal, and said second signal direction discrimination section samples the second signal in the data clock period to discriminate the direction of variation of the value of the second signal.

30. An automatic delay and amplitude equalizer as claimed in claim 28, wherein said first signal direction discrimination section samples the first signal in a period equal to 1/N the period of a data clock to discriminate the direction of variation of the value of the first signal, N being an integer equal to or larger than 2, and said second signal direction discrimination section samples the second signal in the period equal to 1/N the period of the data clock to discriminate the direction of variation of the value of the second signal.

31. An automatic delay and amplitude equalizer as claimed in claim 28, wherein said first error information detection section detects the error information from an error bit of the second signal, and said second error information detection section detects the error information from an error bit of the first signal.

32. An automatic delay and amplitude equalizer as claimed in claim 28, wherein said first error information detection section is formed as a first difference calculation section which calculates a difference between the second signal of the input signal and an equalized signal obtained by processing the second signal by means of a transversal equalizer, and said second error information detection section is formed as a second difference calculation section which calculates a difference between the first signal and an equalized signal obtained by processing the first signal by means of another transversal equalizer.

33. An automatic delay and amplitude equalizer as claimed in claim 26, further comprising a demodulator for producing the digital demodulated signals from the input signal, said inclination delay equalization section and said inclination amplitude equalization section being provided at a stage or stages preceding to said demodulator.

34. An automatic delay and amplitude equalization method, comprising:

discriminating a direction of variation of a value of a first signal which is one of a pair of digital demodulated signals of an input signal:

detecting error information from a second signal which is another one of the digital demodulated signals and orthogonal to the first signal; and compensating for both of a delay characteristic and an amplitude characteristic of the input signal based on a correlation between the error information and the direction of variation of the value of the first signal.

* * * * *